(12) United States Patent
Rivard et al.

(10) Patent No.: US 12,418,727 B2
(45) Date of Patent: Sep. 16, 2025

(54) SYSTEM AND METHOD FOR GENERATING A DIGITAL IMAGE

(71) Applicant: Duelight LLC, Sunnyvale, CA (US)

(72) Inventors: William Rivard, Menlo Park, CA (US); Adam Feder, Mountain View, CA (US); Brian Kindle, Sunnyvale, CA (US)

(73) Assignee: DUELIGHT LLC, Sunnyvale, CA (US)

(*) Notice: Subject to any disclaimer, the term of this patent is extended or adjusted under 35 U.S.C. 154(b) by 0 days.

(21) Appl. No.: 19/025,941

(22) Filed: Jan. 16, 2025

(65) Prior Publication Data
US 2025/0159360 A1    May 15, 2025

Related U.S. Application Data

(63) Continuation of application No. 19/015,114, filed on Jan. 9, 2025, which is a continuation-in-part of
(Continued)

(51) Int. Cl.
*H04N 23/743* (2023.01)
*H04N 23/56* (2023.01)
(Continued)

(52) U.S. Cl.
CPC .......... *H04N 23/743* (2023.01); *H04N 23/56* (2023.01); *H04N 23/62* (2023.01); *H04N 23/631* (2023.01);
(Continued)

(58) Field of Classification Search
CPC ............. H04N 5/35554; H04N 5/2256; H04N 5/2355; H04N 5/2621; H04N 5/2624;
(Continued)

(56) References Cited

U.S. PATENT DOCUMENTS

| 4,057,809 A | 11/1977 | Nakamoto et al. |
| 4,091,374 A | 5/1978 | Muller et al. |

(Continued)

FOREIGN PATENT DOCUMENTS

| CN | 101290388 A | 10/2008 |
| CN | 101408709 A | 4/2009 |

(Continued)

OTHER PUBLICATIONS

Final Office Action from U.S. Appl. No. 15/913,742, dated Feb. 14, 2022.
(Continued)

*Primary Examiner* — Mekonnen D Dagnew
(74) *Attorney, Agent, or Firm* — Zilka-Kotab, P.C.

(57) ABSTRACT

A system, method, and computer program product for generating a resulting image from a set of images is disclosed. The method comprises receiving an image set that includes a first image of a photographic scene based on a first set of sampling parameters and a second image of the photographic scene based on a second set of sampling parameters, and generating a resulting image based on the first image and the second image according to depth values in a selection depth map. Each distinct depth value in the selection depth map corresponds to a different image in the image set.

44 Claims, 19 Drawing Sheets

Related U.S. Application Data application No. 18/388,158, filed on Nov. 8, 2023, which is a continuation-in-part of application No. 17/868,536, filed on Jul. 19, 2022, now abandoned, which is a continuation of application No. 17/518,473, filed on Nov. 3, 2021, now abandoned, which is a continuation of application No. 16/677,385, filed on Nov. 7, 2019, now Pat. No. 11,394,895, which is a continuation of application No. 16/211,931, filed on Dec. 6, 2018, now Pat. No. 10,491,834, which is a continuation of application No. 15/863,785, filed on Jan. 5, 2018, now Pat. No. 10,178,323, which is a continuation of application No. 15/289,039, filed on Oct. 7, 2016, now Pat. No. 9,894,289, which is a continuation of application No. 14/543,782, filed on Nov. 17, 2014, now Pat. No. 9,509,919.

(51) Int. Cl.
  *H04N 23/62* (2023.01)
  *H04N 23/63* (2023.01)
  *H04N 23/72* (2023.01)
  *H04N 23/74* (2023.01)
  *H04N 23/741* (2023.01)

(52) U.S. Cl.
  CPC ............. *H04N 23/72* (2023.01); *H04N 23/74* (2023.01); *H04N 23/741* (2023.01)

(58) Field of Classification Search
  CPC .. H04N 5/265; H04N 5/3745; H04N 5/37452; H04N 5/37455; H04N 5/378
  See application file for complete search history.

(56) References Cited

U.S. PATENT DOCUMENTS

| | | |
|---|---|---|
| 4,371,928 A | 2/1983 | Barlow et al. |
| 4,425,031 A | 1/1984 | Tamura et al. |
| 4,470,676 A | 9/1984 | Kinoshita et al. |
| 4,638,365 A | 1/1987 | Kato |
| 4,712,136 A | 12/1987 | Tsunekawa et al. |
| 4,720,723 A | 1/1988 | Harunari et al. |
| 4,734,762 A | 3/1988 | Aoki et al. |
| 4,811,086 A | 3/1989 | Hieda |
| 4,821,099 A | 4/1989 | Sakamoto |
| 4,832,518 A | 5/1989 | Moriyama |
| 4,873,561 A | 10/1989 | Wen |
| 4,884,972 A | 12/1989 | Gasper |
| 4,980,773 A | 12/1990 | Suda et al. |
| 5,101,253 A | 3/1992 | Mizutani et al. |
| 5,109,236 A | 4/1992 | Watanabe et al. |
| 5,115,124 A | 5/1992 | Muto et al. |
| 5,126,777 A | 6/1992 | Akashi et al. |
| 5,132,783 A | 7/1992 | Hieda |
| 5,146,316 A | 9/1992 | Suzuki |
| 5,151,796 A | 9/1992 | Ito et al. |
| 5,175,615 A | 12/1992 | Ohara |
| 5,185,668 A | 2/1993 | Ohta |
| 5,200,828 A | 4/1993 | Jang et al. |
| 5,262,870 A | 11/1993 | Nakamura et al. |
| 5,282,024 A | 1/1994 | Takei |
| 5,291,151 A | 3/1994 | Fujiwara et al. |
| 5,317,406 A | 5/1994 | Kobayashi et al. |
| 5,321,528 A | 6/1994 | Nakamura |
| 5,355,234 A | 10/1994 | Kim |
| 5,363,209 A | 11/1994 | Eschbach et al. |
| 5,384,904 A | 1/1995 | Sprague et al. |
| 5,477,070 A | 12/1995 | Nam |
| 5,553,864 A | 9/1996 | Sitrick |
| 5,559,770 A | 9/1996 | Hiroki et al. |
| 5,572,633 A | 11/1996 | Lo et al. |
| 5,579,530 A | 11/1996 | Solomon et al. |
| 5,633,677 A | 5/1997 | Okino et al. |
| 5,650,818 A | 7/1997 | Takano |
| 5,689,437 A | 11/1997 | Nakagawa |
| 5,698,844 A | 12/1997 | Shinohara et al. |
| 5,699,108 A | 12/1997 | Katayama et al. |
| 5,726,670 A | 3/1998 | Tabata et al. |
| 5,734,760 A | 3/1998 | Yoshida |
| 5,737,547 A | 4/1998 | Zuravleff et al. |
| 5,754,705 A | 5/1998 | Okino |
| 5,757,369 A | 5/1998 | Ohsawa et al. |
| 5,764,246 A | 6/1998 | Wataya et al. |
| 5,784,569 A | 7/1998 | Miller et al. |
| 5,790,234 A | 8/1998 | Matsuyama |
| 5,790,692 A | 8/1998 | Price et al. |
| 5,812,799 A | 9/1998 | Zuravleff et al. |
| 5,818,977 A | 10/1998 | Tansley |
| 5,835,639 A | 11/1998 | Honsinger et al. |
| 5,838,463 A | 11/1998 | Gahang |
| 5,859,712 A | 1/1999 | Kim |
| 5,859,921 A | 1/1999 | Suzuki |
| 5,867,215 A | 2/1999 | Kaplan |
| 5,867,735 A | 2/1999 | Zuravleff et al. |
| 5,872,867 A | 2/1999 | Bergen |
| 5,877,715 A | 3/1999 | Gowda et al. |
| 5,889,956 A | 3/1999 | Hauser et al. |
| 5,900,909 A | 5/1999 | Parulski et al. |
| 5,909,594 A | 6/1999 | Ross et al. |
| 5,917,494 A | 6/1999 | Arai et al. |
| 5,949,916 A | 9/1999 | Chun |
| 5,983,261 A | 11/1999 | Riddle |
| 5,986,668 A | 11/1999 | Szeliski et al. |
| 5,987,164 A | 11/1999 | Szeliski et al. |
| 5,987,186 A | 11/1999 | Oida et al. |
| 6,018,599 A | 1/2000 | Kawai |
| 6,026,188 A | 2/2000 | Dionysian |
| 6,038,074 A | 3/2000 | Kitaguchi et al. |
| 6,038,333 A | 3/2000 | Wang |
| 6,041,351 A | 3/2000 | Kho |
| 6,055,326 A | 4/2000 | Chang et al. |
| 6,061,696 A | 5/2000 | Lee et al. |
| 6,085,241 A | 7/2000 | Otis |
| 6,092,137 A | 7/2000 | Huang et al. |
| 6,115,025 A | 9/2000 | Buxton et al. |
| 6,115,065 A | 9/2000 | Yadid-Pecht et al. |
| 6,115,717 A | 9/2000 | Mehrotra et al. |
| 6,137,468 A | 10/2000 | Martinez et al. |
| 6,148,092 A | 11/2000 | Qian |
| 6,184,516 B1 | 2/2001 | Sawada et al. |
| 6,184,940 B1 | 2/2001 | Sano |
| 6,208,349 B1 | 3/2001 | Davidson et al. |
| 6,241,609 B1 | 6/2001 | Rutgers |
| 6,243,430 B1 | 6/2001 | Mathe |
| 6,246,226 B1 | 6/2001 | Kawase et al. |
| 6,262,769 B1 | 7/2001 | Anderson et al. |
| 6,293,284 B1 | 9/2001 | Rigg |
| 6,301,440 B1 | 10/2001 | Bolle et al. |
| 6,326,978 B1 | 12/2001 | Robbins |
| 6,332,033 B1 | 12/2001 | Qian |
| 6,348,697 B1 | 2/2002 | Kitajima |
| 6,365,950 B1 | 4/2002 | Sohn |
| 6,385,169 B1 | 5/2002 | Wang |
| 6,385,580 B1 | 5/2002 | Lyberg et al. |
| 6,442,294 B1 | 8/2002 | Nishizawa et al. |
| 6,453,068 B1 | 9/2002 | Li |
| 6,473,159 B1 | 10/2002 | Wakui et al. |
| 6,498,926 B1 | 12/2002 | Ciccarelli et al. |
| 6,519,001 B1 | 2/2003 | Lee |
| 6,530,639 B1 | 3/2003 | Matsuda |
| 6,532,011 B1 | 3/2003 | Francini et al. |
| 6,539,129 B1 | 3/2003 | Yushiya |
| 6,546,150 B2 | 4/2003 | Inui |
| 6,577,613 B1 | 6/2003 | Ramanathan |
| 6,594,279 B1 | 7/2003 | Nguyen et al. |
| 6,597,399 B2 | 7/2003 | Horii |
| 6,600,160 B2 | 7/2003 | Kobayashi et al. |
| 6,608,622 B1 | 8/2003 | Katayama et al. |
| 6,627,896 B1 | 9/2003 | Hashimoto et al. |
| 6,642,962 B1 | 11/2003 | Lin et al. |
| 6,650,774 B1 | 11/2003 | Szeliski |
| 6,658,457 B2 | 12/2003 | Nishikawa et al. |

(56) References Cited

U.S. PATENT DOCUMENTS

| | | |
|---|---|---|
| 6,662,233 B1 | 12/2003 | Skarpness et al. |
| 6,704,007 B1 | 3/2004 | Clapper |
| 6,704,844 B2 | 3/2004 | Arimilli et al. |
| 6,734,905 B2 | 5/2004 | Fossum et al. |
| 6,735,566 B1 | 5/2004 | Brand |
| 6,744,471 B1 | 6/2004 | Kakinuma et al. |
| 6,748,443 B1 | 6/2004 | Parry et al. |
| 6,757,795 B2 | 6/2004 | Barri et al. |
| 6,760,748 B1 | 7/2004 | Hakim |
| 6,778,948 B1 | 8/2004 | Kanetaka et al. |
| 6,787,778 B2 | 9/2004 | Kobayashi et al. |
| 6,788,338 B1 | 9/2004 | Dinev et al. |
| 6,789,155 B2 | 9/2004 | Jeddeloh |
| 6,810,031 B1 | 10/2004 | Hegde et al. |
| 6,842,265 B1 | 1/2005 | Votipka et al. |
| 6,862,374 B1 | 3/2005 | Nagai et al. |
| 6,864,886 B1 | 3/2005 | Cavallaro et al. |
| 6,885,761 B2 | 4/2005 | Kage |
| 6,906,332 B2 | 6/2005 | Tashiro et al. |
| 6,920,619 B1 | 7/2005 | Milekic |
| 6,944,319 B1 | 9/2005 | Huang et al. |
| 6,950,132 B1 | 9/2005 | Kozuka |
| 6,952,015 B2 | 10/2005 | Kameshima |
| 6,956,226 B2 | 10/2005 | Bennewitz et al. |
| 6,959,157 B2 | 10/2005 | Nakayama |
| 6,961,088 B2 | 11/2005 | Kameshima et al. |
| 6,965,707 B1 | 11/2005 | Kozlowski |
| 6,975,750 B2 | 12/2005 | Yan et al. |
| 6,989,863 B1 | 1/2006 | Takahashi |
| 6,993,769 B2 | 1/2006 | Simonson et al. |
| 6,996,186 B2 | 2/2006 | Ngai et al. |
| 7,027,054 B1 | 4/2006 | Cheiky et al. |
| 7,030,868 B2 | 4/2006 | Clapper |
| 7,030,912 B1 | 4/2006 | Honma |
| 7,030,922 B2 | 4/2006 | Sakuragi |
| 7,046,284 B2 | 5/2006 | Kozlowski et al. |
| 7,076,563 B1 | 7/2006 | Yamanaka et al. |
| 7,084,905 B1 | 8/2006 | Nayar et al. |
| 7,085,590 B2 | 8/2006 | Kennedy et al. |
| 7,088,351 B2 | 8/2006 | Wang |
| 7,095,879 B2 | 8/2006 | Yan et al. |
| 7,098,952 B2 | 8/2006 | Morris et al. |
| 7,113,497 B2 | 9/2006 | Cromer et al. |
| 7,113,648 B1 | 9/2006 | Aihara |
| 7,116,138 B2 | 10/2006 | Lim |
| 7,127,081 B1 | 10/2006 | Erdem |
| 7,133,070 B2 | 11/2006 | Wheeler et al. |
| 7,138,639 B2 | 11/2006 | Kameshima |
| 7,142,697 B2 | 11/2006 | Huang et al. |
| 7,145,966 B2 | 12/2006 | Lai et al. |
| 7,164,423 B1 | 1/2007 | Westen |
| 7,193,199 B2 | 3/2007 | Jang |
| 7,206,449 B2 | 4/2007 | Raskar et al. |
| 7,235,772 B2 | 6/2007 | Ko et al. |
| 7,256,381 B2 | 8/2007 | Asaba |
| 7,256,724 B2 | 8/2007 | Lee |
| 7,265,784 B1 | 9/2007 | Frank |
| 7,319,483 B2 | 1/2008 | Park et al. |
| 7,348,533 B2 | 3/2008 | Ko et al. |
| 7,352,361 B2 | 4/2008 | Yi |
| 7,362,886 B2 | 4/2008 | Rowe et al. |
| 7,379,011 B2 | 5/2008 | Ham et al. |
| 7,381,963 B2 | 6/2008 | Endo et al. |
| 7,382,941 B2 | 6/2008 | Hwang |
| 7,397,020 B2 | 7/2008 | Roh |
| 7,408,443 B2 | 8/2008 | Nam |
| 7,415,152 B2 | 8/2008 | Jiang et al. |
| 7,417,601 B2 | 8/2008 | Brown Elliott |
| 7,417,675 B2 | 8/2008 | Loose |
| 7,421,063 B2 | 9/2008 | Takenaka et al. |
| 7,428,378 B1 | 9/2008 | Warpakowski Furlan |
| 7,433,547 B2 | 10/2008 | Yamamoto |
| 7,443,435 B2 | 10/2008 | Loose |
| 7,443,443 B2 | 10/2008 | Raskar et al. |
| 7,470,911 B2 | 12/2008 | Yagi |
| 7,508,427 B2 | 3/2009 | Choi |
| 7,514,690 B2 | 4/2009 | Endo et al. |
| 7,518,645 B2 | 4/2009 | Farrier |
| 7,522,210 B2 | 4/2009 | Shimada |
| 7,535,486 B2 | 5/2009 | Motomura et al. |
| 7,538,808 B2 | 5/2009 | Lee |
| 7,554,478 B2 | 6/2009 | Lim |
| 7,554,584 B2 | 6/2009 | Lim |
| 7,564,037 B2 | 7/2009 | Tashiro et al. |
| 7,573,037 B1 | 8/2009 | Kameshima et al. |
| 7,587,099 B2 | 9/2009 | Szeliski et al. |
| 7,590,775 B2 | 9/2009 | Gildfind et al. |
| 7,592,599 B2 | 9/2009 | Kameshima |
| 7,595,831 B2 | 9/2009 | Kameshima et al. |
| 7,598,481 B2 | 10/2009 | Hwang et al. |
| 7,599,541 B2 | 10/2009 | Hayashida |
| 7,599,569 B2 | 10/2009 | Smirnov et al. |
| 7,609,860 B2 | 10/2009 | Lee et al. |
| 7,612,819 B2 | 11/2009 | Nam |
| 7,616,243 B2 | 11/2009 | Kozlowski |
| 7,622,698 B2 | 11/2009 | Igaki et al. |
| 7,626,598 B2 | 12/2009 | Manchester |
| 7,633,528 B2 | 12/2009 | Fukushima et al. |
| 7,639,292 B2 | 12/2009 | Kwon et al. |
| 7,646,417 B2 | 1/2010 | Goto et al. |
| 7,646,909 B2 | 1/2010 | Jiang et al. |
| 7,649,557 B2 | 1/2010 | Song et al. |
| 7,652,714 B2 | 1/2010 | Gotanda |
| 7,656,456 B2 | 2/2010 | Zhang |
| 7,660,464 B1 | 2/2010 | Peterson |
| 7,671,908 B2 | 3/2010 | Lee |
| 7,675,562 B2 | 3/2010 | Kim et al. |
| 7,676,170 B2 | 3/2010 | Hata |
| 7,679,542 B2 | 3/2010 | Ham et al. |
| 7,683,304 B2 | 3/2010 | Nam et al. |
| 7,687,755 B2 | 3/2010 | Bae et al. |
| 7,688,357 B2 | 3/2010 | Lee et al. |
| 7,697,049 B1 | 4/2010 | Lavi |
| 7,701,462 B2 | 4/2010 | Hu |
| 7,701,497 B2 | 4/2010 | Fraenkel et al. |
| 7,705,911 B2 | 4/2010 | Kameshima |
| 7,715,598 B2 | 5/2010 | Li et al. |
| 7,724,292 B2 | 5/2010 | Ueno et al. |
| 7,724,735 B2 | 5/2010 | Locatelli et al. |
| 7,730,422 B2 | 6/2010 | Russo |
| 7,734,060 B2 | 6/2010 | Yoo et al. |
| 7,746,397 B2 | 6/2010 | Nam |
| 7,750,281 B2 | 7/2010 | Asaba et al. |
| 7,750,913 B1 | 7/2010 | Parenteau et al. |
| 7,755,531 B2 | 7/2010 | Yeom |
| 7,755,679 B2 | 7/2010 | Rossi et al. |
| 7,760,246 B2 | 7/2010 | Dalton et al. |
| 7,760,250 B2 | 7/2010 | Rossi |
| 7,760,258 B2 | 7/2010 | Huang et al. |
| 7,764,880 B2 | 7/2010 | Hamada |
| 7,768,920 B2 | 8/2010 | Goshen et al. |
| 7,783,126 B2 | 8/2010 | Yamashita et al. |
| 7,796,831 B2 | 9/2010 | Tanaka |
| 7,800,618 B1 | 9/2010 | Westen |
| 7,802,866 B2 | 9/2010 | Kanno et al. |
| 7,813,583 B2 | 10/2010 | Yoo et al. |
| 7,825,974 B2 | 11/2010 | Itano et al. |
| 7,827,490 B2 | 11/2010 | Kapur et al. |
| 7,835,585 B2 | 11/2010 | Cho et al. |
| 7,835,586 B2 | 11/2010 | Porikli |
| 7,842,927 B2 | 11/2010 | Tashiro et al. |
| 7,844,076 B2 | 11/2010 | Corcoran et al. |
| 7,847,259 B2 | 12/2010 | Tashiro et al. |
| 7,852,379 B2 | 12/2010 | Aoki et al. |
| 7,864,229 B2 | 1/2011 | Lee et al. |
| 7,903,115 B2 | 3/2011 | Platzer et al. |
| 7,907,791 B2 | 3/2011 | Kinrot et al. |
| 7,908,410 B2 | 3/2011 | Gildfind et al. |
| 7,911,506 B2 | 3/2011 | Suzuki |
| 7,916,061 B2 | 3/2011 | Chae et al. |
| 7,916,198 B2 | 3/2011 | Yeom |
| 7,919,993 B2 | 4/2011 | Keel et al. |
| 7,923,695 B2 | 4/2011 | Ishii et al. |
| 7,923,696 B2 | 4/2011 | Kameshima |

(56) References Cited

U.S. PATENT DOCUMENTS

| | | | |
|---|---|---|---|
| 7,933,071 B2 | 4/2011 | Seo |
| 7,949,201 B2 | 5/2011 | Suzuki |
| 7,952,077 B2 | 5/2011 | Tashiro et al. |
| 7,952,621 B2 | 5/2011 | Yamauchi |
| 7,953,286 B2 | 5/2011 | Chiang et al. |
| 7,962,030 B2 | 6/2011 | Trevelyan |
| 7,966,661 B2 | 6/2011 | Gunawardena |
| 7,969,480 B2 | 6/2011 | Kim et al. |
| 7,978,182 B2 | 7/2011 | Ording et al. |
| 7,978,237 B2 | 7/2011 | Lee et al. |
| 7,984,177 B2 | 7/2011 | Girardeau, Jr. et al. |
| 7,985,993 B2 | 7/2011 | Lee et al. |
| 7,990,304 B2 | 8/2011 | Lim et al. |
| 7,990,437 B2 | 8/2011 | Kim et al. |
| 7,991,887 B2 | 8/2011 | Sutardja |
| 7,998,782 B2 | 8/2011 | Kim et al. |
| 7,999,340 B2 | 8/2011 | Rossi et al. |
| 7,999,858 B2 | 8/2011 | Nayar et al. |
| 8,004,586 B2 | 8/2011 | Yoo et al. |
| 8,009,905 B2 | 8/2011 | Choe et al. |
| 8,018,525 B2 | 9/2011 | Trevelyan et al. |
| 8,021,912 B2 | 9/2011 | Kim et al. |
| 8,031,243 B2 | 10/2011 | Imai et al. |
| 8,054,350 B2 | 11/2011 | Kyung |
| 8,063,964 B2 | 11/2011 | Kozlowski |
| 8,063,967 B2 | 11/2011 | Itano et al. |
| 8,068,121 B2 | 11/2011 | Williamson et al. |
| 8,081,606 B2 | 12/2011 | Cai et al. |
| 8,107,497 B2 | 1/2012 | Zerillo et al. |
| 8,111,301 B2 | 2/2012 | Kim et al. |
| 8,114,172 B2 | 2/2012 | Givon |
| 8,115,829 B2 | 2/2012 | Ha et al. |
| 8,120,625 B2 | 2/2012 | Hinckley |
| 8,120,670 B2 | 2/2012 | Kwon et al. |
| 8,125,499 B2 | 2/2012 | Yamada |
| 8,125,526 B2 | 2/2012 | Maruyama et al. |
| 8,129,760 B2 | 3/2012 | Hiromatsu |
| 8,134,619 B2 | 3/2012 | Tonkikh |
| 8,135,235 B2 | 3/2012 | Kang et al. |
| 8,139,129 B2 | 3/2012 | Kozlowski |
| 8,144,221 B2 | 3/2012 | Hiromichi et al. |
| 8,144,228 B2 | 3/2012 | Gelfand |
| 8,144,253 B2 | 3/2012 | Su et al. |
| RE43,314 E | 4/2012 | Kozlowski |
| 8,149,310 B2 | 4/2012 | Yin |
| 8,155,391 B1 | 4/2012 | Tang et al. |
| 8,155,397 B2 | 4/2012 | Bigioi et al. |
| 8,159,552 B2 | 4/2012 | Lim et al. |
| 8,170,576 B2 | 5/2012 | Wu |
| 8,175,386 B2 | 5/2012 | Kim |
| 8,179,456 B2 | 5/2012 | Kim et al. |
| 8,189,097 B2 | 5/2012 | Chou et al. |
| 8,189,944 B1 | 5/2012 | Lim |
| 8,193,497 B2 | 6/2012 | Park et al. |
| 8,194,993 B1 | 6/2012 | Chen et al. |
| 8,199,203 B2 | 6/2012 | Sugimoto |
| 8,200,019 B2 | 6/2012 | Zhang et al. |
| 8,208,051 B2 | 6/2012 | Kitani |
| 8,217,964 B2 | 7/2012 | Laine et al. |
| 8,218,070 B2 | 7/2012 | Kameshima |
| 8,218,625 B2 | 7/2012 | Ward et al. |
| 8,224,176 B1 | 7/2012 | Pillman et al. |
| 8,228,560 B2 | 7/2012 | Hooper |
| 8,233,003 B2 | 7/2012 | Obinata |
| 8,237,813 B2 | 8/2012 | Garten |
| 8,247,779 B2 | 8/2012 | Kameshima et al. |
| 8,249,376 B2 | 8/2012 | Kang et al. |
| 8,259,399 B2 | 9/2012 | Seo |
| 8,266,507 B2 | 9/2012 | Getman et al. |
| 8,269,854 B2 | 9/2012 | Jung et al. |
| 8,270,764 B1 | 9/2012 | Agarwala et al. |
| 8,275,213 B2 | 9/2012 | Richardson |
| 8,276,085 B2 | 9/2012 | Sherwani |
| 8,291,446 B2 | 10/2012 | Kennedy |
| 8,294,723 B2 | 10/2012 | Labour et al. |
| 8,294,797 B2 | 10/2012 | Choe et al. |
| 8,295,629 B2 | 10/2012 | Wey et al. |
| 8,300,119 B2 | 10/2012 | Seo |
| 8,300,900 B2 | 10/2012 | Lai et al. |
| 8,310,567 B2 | 11/2012 | Kim et al. |
| 8,314,817 B2 | 11/2012 | Williamson et al. |
| 8,330,811 B2 | 12/2012 | Macguire, Jr. |
| 8,335,021 B2 | 12/2012 | Tanaka et al. |
| 8,339,508 B2 | 12/2012 | Levy |
| 8,345,327 B2 | 1/2013 | Mikami |
| 8,346,923 B2 | 1/2013 | Rowles et al. |
| 8,351,711 B2 | 1/2013 | Takano et al. |
| 8,358,356 B2 | 1/2013 | Kim et al. |
| 8,358,365 B2 | 1/2013 | Tanaka |
| 8,363,122 B2 | 1/2013 | Onozawa |
| 8,363,145 B2 | 1/2013 | Iwamoto |
| 8,363,951 B2 | 1/2013 | Bigioi et al. |
| 8,363,952 B2 | 1/2013 | Bigioi et al. |
| 8,369,586 B2 | 2/2013 | Corcoran et al. |
| 8,369,893 B2 | 2/2013 | Kirch et al. |
| 8,385,678 B2 | 2/2013 | Lim et al. |
| 8,390,690 B2 | 3/2013 | Lim |
| 8,395,539 B2 | 3/2013 | Lim et al. |
| 8,406,482 B1 | 3/2013 | Chien et al. |
| 8,406,557 B2 | 3/2013 | Park et al. |
| 8,411,153 B2 | 4/2013 | Cho |
| 8,412,277 B2 | 4/2013 | Fujiwara |
| 8,421,881 B2 | 4/2013 | Chung et al. |
| 8,441,552 B2 | 5/2013 | Yoshida |
| 8,441,560 B2 | 5/2013 | Yanai |
| 8,446,488 B2 | 5/2013 | Yim |
| 8,446,510 B2 | 5/2013 | Lee et al. |
| 8,451,296 B2 | 5/2013 | Ono |
| 8,462,101 B2 | 6/2013 | Han et al. |
| 8,467,003 B2 | 6/2013 | Yoo et al. |
| 8,471,928 B2 | 6/2013 | Yoo et al. |
| 8,482,447 B2 | 7/2013 | Hwang et al. |
| 8,488,032 B2 | 7/2013 | Keel et al. |
| 8,488,219 B2 | 7/2013 | Mikami |
| 8,493,413 B2 | 7/2013 | Mo |
| 8,497,932 B2 | 7/2013 | Morimoto |
| 8,508,600 B2 | 8/2013 | Ibi |
| 8,514,306 B2 | 8/2013 | Jung et al. |
| 8,515,169 B2 | 8/2013 | Kim et al. |
| 8,520,104 B2 | 8/2013 | Fossum et al. |
| 8,521,883 B1 | 8/2013 | Wartnick et al. |
| RE44,499 E | 9/2013 | Inoue et al. |
| 8,531,465 B2 | 9/2013 | Platzer et al. |
| 8,531,570 B2 | 9/2013 | Sugimura |
| 8,532,395 B2 | 9/2013 | Mitsui |
| 8,543,946 B2 | 9/2013 | Kethireddy |
| 8,547,451 B2 | 10/2013 | Cho et al. |
| 8,547,461 B2 | 10/2013 | Jung et al. |
| 8,548,257 B2 | 10/2013 | Reid et al. |
| 8,558,915 B2 | 10/2013 | Morimoto |
| 8,563,915 B2 | 10/2013 | Takenaka et al. |
| 8,570,415 B2 | 10/2013 | Takeda |
| 8,576,294 B2 | 11/2013 | Kameshima et al. |
| 8,581,935 B2 | 11/2013 | Handa |
| 8,586,903 B2 | 11/2013 | Itzhak et al. |
| 8,587,671 B2 | 11/2013 | Park et al. |
| 8,587,713 B2 | 11/2013 | Park et al. |
| 8,599,280 B2 | 12/2013 | Lipowezky et al. |
| 8,599,282 B2 | 12/2013 | Imai et al. |
| 8,599,300 B2 | 12/2013 | Park et al. |
| 8,605,142 B2 | 12/2013 | Hayashi |
| 8,605,176 B2 | 12/2013 | Jung et al. |
| 8,605,997 B2 | 12/2013 | Lipowezky et al. |
| 8,610,724 B2 | 12/2013 | Garg |
| 8,610,789 B1 | 12/2013 | Nayar et al. |
| 8,610,790 B2 | 12/2013 | Blanquart et al. |
| 8,611,610 B2 | 12/2013 | Park et al. |
| 8,611,656 B2 | 12/2013 | Kim et al. |
| 8,614,750 B2 | 12/2013 | Kim et al. |
| 8,619,728 B2 | 12/2013 | Frank et al. |
| 8,629,915 B2 | 1/2014 | Gwak |
| 8,630,505 B2 | 1/2014 | Kim |
| 8,633,431 B2 | 1/2014 | Kim |
| 8,633,978 B2 | 1/2014 | Yang et al. |

(56) References Cited

U.S. PATENT DOCUMENTS

| | | |
|---|---|---|
| 8,634,011 B2 | 1/2014 | Hur et al. |
| 8,644,644 B2 | 2/2014 | Yadav |
| 8,648,945 B2 | 2/2014 | Ovsiannikov et al. |
| 8,659,339 B2 | 2/2014 | Jung et al. |
| 8,665,350 B2 | 3/2014 | Richardson et al. |
| 8,666,151 B2 | 3/2014 | Kim et al. |
| 8,675,086 B1 | 3/2014 | Linzer |
| 8,675,272 B2 | 3/2014 | Cho et al. |
| 8,675,960 B2 | 3/2014 | Reid et al. |
| 8,681,236 B2 | 3/2014 | Baek |
| 8,681,244 B2 | 3/2014 | Lee et al. |
| 8,681,245 B2 | 3/2014 | Lee |
| 8,682,029 B2 | 3/2014 | Piramuthu |
| 8,687,174 B2 | 4/2014 | Fossum et al. |
| 8,692,851 B2 | 4/2014 | Ording et al. |
| 8,692,917 B2 | 4/2014 | Takeda |
| 8,698,062 B2 | 4/2014 | Yoshida |
| 8,699,822 B2 | 4/2014 | Park et al. |
| 8,711,016 B2 | 4/2014 | Kim et al. |
| 8,711,268 B2 | 4/2014 | Ostrovsky |
| 8,712,160 B2 | 4/2014 | Bigioi et al. |
| 8,712,189 B2 | 4/2014 | Bitouk et al. |
| 8,716,769 B2 | 5/2014 | Ihara et al. |
| 8,717,293 B2 | 5/2014 | Wong et al. |
| 8,717,454 B2 | 5/2014 | Yoshida |
| 8,717,649 B2 | 5/2014 | Kim et al. |
| 8,723,284 B1 | 5/2014 | Hynecek |
| 8,723,997 B2 | 5/2014 | Koh |
| 8,736,721 B2 | 5/2014 | Park et al. |
| 8,749,415 B2 | 6/2014 | Jung et al. |
| 8,749,653 B2 | 6/2014 | Kim |
| 8,754,956 B2 | 6/2014 | Lim et al. |
| 8,754,965 B2 | 6/2014 | Han et al. |
| 8,754,978 B2 | 6/2014 | Hayashi et al. |
| 8,761,245 B2 | 6/2014 | Puri et al. |
| 8,763,056 B2 | 6/2014 | Bagasra |
| 8,764,560 B2 | 7/2014 | Sitrick |
| 8,767,074 B2 | 7/2014 | Kim et al. |
| 8,767,085 B2 | 7/2014 | Park et al. |
| 8,773,544 B2 | 7/2014 | Koh et al. |
| 8,774,553 B1 | 7/2014 | Winn |
| 8,774,554 B1 | 7/2014 | Winn |
| 8,780,420 B1 | 7/2014 | Bluzer et al. |
| 8,783,816 B2 | 7/2014 | Masuda |
| 8,785,870 B2 | 7/2014 | Matsumoto et al. |
| 8,786,725 B2 | 7/2014 | Maruyama et al. |
| 8,786,920 B2 | 7/2014 | Mikami |
| 8,792,020 B2 | 7/2014 | Lee et al. |
| 8,792,679 B2 | 7/2014 | Sengupta et al. |
| 8,793,714 B2 | 7/2014 | Kelsen et al. |
| 8,794,733 B2 | 8/2014 | Kanno et al. |
| 8,797,337 B1 | 8/2014 | Labour et al. |
| 8,797,445 B2 | 8/2014 | Kang |
| 8,803,273 B2 | 8/2014 | Fossum et al. |
| 8,805,091 B1 | 8/2014 | Hensel et al. |
| 8,809,760 B2 | 8/2014 | Takenaka et al. |
| 8,810,676 B2 | 8/2014 | Lim et al. |
| 8,811,757 B2 | 8/2014 | Batur |
| 8,817,048 B2 | 8/2014 | Kerr et al. |
| 8,823,846 B2 | 9/2014 | Blanquart et al. |
| 8,824,747 B2 | 9/2014 | Free |
| 8,830,177 B2 | 9/2014 | Woo |
| 8,830,261 B2 | 9/2014 | Asai |
| 8,830,363 B2 | 9/2014 | Jang |
| 8,836,837 B2 | 9/2014 | Kinugasa |
| 8,849,984 B2 | 9/2014 | Yamagishi |
| 8,852,003 B2 | 10/2014 | Oku |
| 8,854,325 B2 | 10/2014 | Byrd et al. |
| 8,854,421 B2 | 10/2014 | Kasahara |
| 8,861,805 B2 | 10/2014 | Hwang et al. |
| 8,861,847 B2 | 10/2014 | Srinivasan et al. |
| 8,861,886 B2 | 10/2014 | Huo et al. |
| 8,866,060 B2 | 10/2014 | Kwon et al. |
| 8,867,105 B2 | 10/2014 | Mikami |
| 8,872,855 B2 | 10/2014 | Doll |
| 8,872,931 B2 | 10/2014 | Roh et al. |
| 8,872,932 B2 | 10/2014 | Han |
| 8,878,117 B2 | 11/2014 | Ogushi |
| 8,878,963 B2 | 11/2014 | Prabhudesai et al. |
| 8,881,057 B2 | 11/2014 | Mori et al. |
| 8,890,897 B2 | 11/2014 | Homma et al. |
| 8,896,632 B2 | 11/2014 | MacDougall et al. |
| 8,897,501 B2 | 11/2014 | Okada et al. |
| 8,897,504 B2 | 11/2014 | Steinberg et al. |
| 8,902,342 B2 | 12/2014 | Araoka et al. |
| 8,902,411 B2 | 12/2014 | Park et al. |
| 8,908,101 B2 | 12/2014 | Lee et al. |
| 8,908,932 B2 | 12/2014 | Corcoran et al. |
| 8,914,744 B2 | 12/2014 | Spencer et al. |
| 8,915,437 B2 | 12/2014 | Hoshino et al. |
| 8,928,654 B2 | 1/2015 | Givon |
| 8,928,775 B2 | 1/2015 | Lee |
| 8,928,777 B2 | 1/2015 | Park et al. |
| 8,933,960 B2 | 1/2015 | Lindahl et al. |
| 8,934,029 B2 | 1/2015 | Nayar et al. |
| 8,935,767 B2 | 1/2015 | Li et al. |
| 8,937,735 B2 | 1/2015 | Mori |
| 8,942,436 B2 | 1/2015 | Mori et al. |
| 8,947,382 B2 | 2/2015 | Winkler et al. |
| 8,948,584 B2 | 2/2015 | Inoue et al. |
| 8,953,094 B2 | 2/2015 | Baer |
| 8,953,882 B2 | 2/2015 | Lim et al. |
| 8,957,994 B2 | 2/2015 | Jakobson |
| 8,965,390 B2 | 2/2015 | Morrison |
| 8,966,401 B2 | 2/2015 | Kang et al. |
| 8,970,770 B2 | 3/2015 | Nanu et al. |
| 8,976,264 B2 | 3/2015 | Rivard et al. |
| 8,977,073 B2 | 3/2015 | Kwon et al. |
| 8,982,259 B2 | 3/2015 | Yoo et al. |
| 8,988,349 B2 | 3/2015 | Alberth et al. |
| 8,988,548 B2 | 3/2015 | Manabe |
| 8,988,559 B2 | 3/2015 | Chao et al. |
| 8,988,561 B2 | 3/2015 | Yamauchi |
| 9,001,092 B2 | 4/2015 | Kim |
| 9,001,232 B2 | 4/2015 | Tatsumi |
| 9,001,249 B2 | 4/2015 | Iwane |
| 9,003,293 B2 | 4/2015 | Grosz et al. |
| 9,006,630 B2 | 4/2015 | Richardson et al. |
| 9,007,505 B2 | 4/2015 | Ichikawa |
| 9,013,624 B2 | 4/2015 | Bae et al. |
| 9,014,459 B2 | 4/2015 | Xiang et al. |
| 9,015,640 B2 | 4/2015 | de Leon |
| 9,019,410 B2 | 4/2015 | Lim et al. |
| 9,025,047 B2 | 5/2015 | Yoshida |
| 9,025,050 B2 | 5/2015 | Lee |
| 9,030,566 B2 | 5/2015 | Miyasako |
| 9,030,572 B2 | 5/2015 | Iha |
| 9,030,587 B2 | 5/2015 | Suzuki et al. |
| 9,030,590 B2 | 5/2015 | Kim et al. |
| 9,035,309 B2 | 5/2015 | Park et al. |
| 9,036,056 B2 | 5/2015 | Ohtsuka |
| 9,042,673 B2 | 5/2015 | Cho et al. |
| 9,049,363 B2 | 6/2015 | Choi et al. |
| 9,055,003 B2 | 6/2015 | Baratakke et al. |
| 9,055,250 B2 | 6/2015 | Park et al. |
| 9,058,655 B2 | 6/2015 | Doepke et al. |
| 9,070,185 B2 | 6/2015 | Lee et al. |
| 9,070,229 B2 | 6/2015 | Williamson et al. |
| 9,071,237 B2 | 6/2015 | Lee et al. |
| 9,077,900 B2 | 7/2015 | Baek et al. |
| 9,077,943 B2 | 7/2015 | Lim et al. |
| 9,080,914 B2 | 7/2015 | Kinugasa |
| 9,081,257 B2 | 7/2015 | Miyazaki |
| 9,083,887 B2 | 7/2015 | Voronov |
| 9,083,905 B2 | 7/2015 | Wan et al. |
| 9,083,935 B2 | 7/2015 | Demandolx et al. |
| 9,086,494 B2 | 7/2015 | Han et al. |
| 9,098,069 B2 | 8/2015 | Dickinson et al. |
| 9,100,514 B2 | 8/2015 | Gu et al. |
| 9,104,410 B2 | 8/2015 | Wong et al. |
| 9,106,813 B2 | 8/2015 | Fainstain et al. |
| 9,106,888 B2 | 8/2015 | Chou |
| 9,113,086 B2 | 8/2015 | Kim et al. |
| 9,113,114 B2 | 8/2015 | Lee |

(56) References Cited

U.S. PATENT DOCUMENTS

| | | |
|---|---|---|
| 9,118,876 B2 | 8/2015 | Felt |
| 9,123,164 B2 | 9/2015 | Park et al. |
| 9,123,621 B2 | 9/2015 | Watanabe |
| 9,124,811 B2 | 9/2015 | Lee |
| 9,124,814 B2 | 9/2015 | Kim et al. |
| 9,124,829 B2 | 9/2015 | Patel |
| 9,129,550 B2 | 9/2015 | Doll |
| 9,131,172 B2 | 9/2015 | Tsuzuki |
| 9,135,679 B2 | 9/2015 | Choi et al. |
| 9,137,432 B2 | 9/2015 | Ahn et al. |
| 9,137,455 B1 | 9/2015 | Rivard et al. |
| 9,144,714 B2 | 9/2015 | Hollinger |
| 9,148,600 B2 | 9/2015 | Park et al. |
| 9,151,711 B2 | 10/2015 | Cho et al. |
| 9,154,708 B1 | 10/2015 | Rivard et al. |
| 9,158,492 B2 | 10/2015 | Miyata |
| 9,160,936 B1 | 10/2015 | Rivard et al. |
| 9,165,533 B2 | 10/2015 | Paulson |
| 9,167,169 B1 | 10/2015 | Rivard et al. |
| 9,167,174 B1 | 10/2015 | Rivard et al. |
| 9,171,514 B2 | 10/2015 | Kim et al. |
| 9,177,362 B2 | 11/2015 | Restrepo et al. |
| 9,179,062 B1 | 11/2015 | Rivard et al. |
| 9,179,085 B1 | 11/2015 | Rivard et al. |
| 9,185,316 B2 | 11/2015 | Cheon et al. |
| 9,189,069 B2 | 11/2015 | Hinckley |
| 9,191,015 B2 | 11/2015 | Kim et al. |
| 9,191,598 B2 | 11/2015 | Blanquart et al. |
| 9,191,599 B2 | 11/2015 | Park et al. |
| 9,195,880 B1 | 11/2015 | Levoy et al. |
| 9,196,076 B1 | 11/2015 | MacLeod |
| 9,208,548 B1 | 12/2015 | Noble et al. |
| 9,210,330 B2 | 12/2015 | Seo |
| 9,210,342 B2 | 12/2015 | Oh |
| 9,215,389 B2 | 12/2015 | Usui |
| 9,215,405 B2 | 12/2015 | Atkinson |
| 9,215,433 B2 | 12/2015 | Rivard et al. |
| 9,218,662 B1 | 12/2015 | Feder et al. |
| 9,219,825 B2 | 12/2015 | Sheikh Naziruddin et al. |
| 9,223,467 B1 | 12/2015 | Landry |
| 9,225,922 B2 | 12/2015 | Lee et al. |
| 9,230,343 B2 | 1/2016 | Ozawa |
| 9,232,124 B2 | 1/2016 | Song |
| 9,232,164 B2 | 1/2016 | Minowa et al. |
| 9,232,173 B1 | 1/2016 | Duggal et al. |
| 9,237,280 B2 | 1/2016 | Kim et al. |
| 9,239,947 B2 | 1/2016 | Auberger et al. |
| 9,247,160 B2 | 1/2016 | Lee et al. |
| 9,256,974 B1 | 2/2016 | Hines |
| 9,257,462 B2 | 2/2016 | Park et al. |
| 9,258,539 B2 | 2/2016 | Kim |
| 9,261,909 B2 | 2/2016 | Lam |
| 9,263,489 B2 | 2/2016 | Kozlowski |
| 9,264,597 B2 | 2/2016 | Wallner |
| 9,270,232 B2 | 2/2016 | Park et al. |
| 9,270,961 B2 | 2/2016 | Rudoy |
| 9,277,135 B2 | 3/2016 | Ichikawa |
| 9,282,167 B2 | 3/2016 | Jo et al. |
| 9,282,224 B2 | 3/2016 | Komada et al. |
| 9,282,264 B2 | 3/2016 | Park et al. |
| 9,285,729 B2 | 3/2016 | Saito et al. |
| 9,288,461 B2 | 3/2016 | Ahn et al. |
| 9,292,154 B2 | 3/2016 | Ji et al. |
| 9,292,911 B2 | 3/2016 | Paris et al. |
| 9,294,744 B2 | 3/2016 | Takeda |
| 9,298,745 B2 | 3/2016 | Lee et al. |
| 9,300,945 B2 | 3/2016 | Seo |
| 9,307,135 B2 | 4/2016 | Noh et al. |
| 9,310,488 B2 | 4/2016 | Park et al. |
| 9,313,413 B2 | 4/2016 | Cho et al. |
| 9,317,910 B2 | 4/2016 | Jeon et al. |
| 9,324,754 B2 | 4/2016 | Ahn et al. |
| 9,325,301 B2 | 4/2016 | Lee |
| 9,325,314 B2 | 4/2016 | Shin |
| 9,336,574 B2 | 5/2016 | Zhang et al. |
| 9,336,619 B2 | 5/2016 | Kim et al. |
| 9,338,366 B2 | 5/2016 | Seo et al. |
| 9,342,138 B2 | 5/2016 | Ding |
| 9,344,657 B2 | 5/2016 | Kim et al. |
| 9,354,184 B2 | 5/2016 | Dowaki |
| 9,361,319 B2 | 6/2016 | Feder et al. |
| 9,369,144 B2 | 6/2016 | Kim et al. |
| 9,380,231 B2 | 6/2016 | Yang et al. |
| 9,383,202 B2 | 7/2016 | Zhou et al. |
| 9,384,384 B1 | 7/2016 | Tyagi |
| 9,392,160 B2 | 7/2016 | Sfaradi et al. |
| 9,395,237 B2 | 7/2016 | Choi |
| 9,402,067 B2 | 7/2016 | Park et al. |
| 9,406,147 B2 | 8/2016 | Rivard et al. |
| 9,407,675 B1 | 8/2016 | Ludwig et al. |
| 9,413,379 B2 | 8/2016 | Kim et al. |
| 9,417,836 B2 | 8/2016 | Postal et al. |
| 9,418,408 B1 | 8/2016 | Thompson |
| 9,418,425 B2 | 8/2016 | Park et al. |
| 9,420,159 B2 | 8/2016 | Hamada |
| 9,421,462 B2 | 8/2016 | Oku |
| 9,424,798 B2 | 8/2016 | Park |
| 9,426,398 B2 | 8/2016 | Ohshitanai |
| 9,427,174 B2 | 8/2016 | Tuliakov et al. |
| 9,432,574 B2 | 8/2016 | Matsuo |
| 9,438,804 B2 | 9/2016 | Ryu et al. |
| 9,438,809 B2 | 9/2016 | Sheikh et al. |
| 9,438,836 B2 | 9/2016 | Tashiro et al. |
| 9,443,132 B2 | 9/2016 | Linguraru et al. |
| 9,443,898 B2 | 9/2016 | Oh et al. |
| 9,445,029 B2 | 9/2016 | Shimizu |
| 9,448,771 B2 | 9/2016 | Feder et al. |
| 9,451,240 B2 | 9/2016 | You et al. |
| 9,456,144 B2 | 9/2016 | Miyazaki |
| 9,459,781 B2 | 10/2016 | Wilson et al. |
| 9,460,118 B2 | 10/2016 | Feder et al. |
| 9,460,125 B2 | 10/2016 | Feder et al. |
| 9,460,492 B2 | 10/2016 | Takeru |
| 9,462,199 B2 | 10/2016 | Kim et al. |
| 9,467,607 B2 | 10/2016 | Ng et al. |
| 9,478,012 B2 | 10/2016 | Uratani et al. |
| 9,485,483 B2 | 11/2016 | Cho et al. |
| 9,489,927 B2 | 11/2016 | Aizawa |
| 9,495,025 B2 | 11/2016 | Ishikawa et al. |
| 9,507,379 B2 | 11/2016 | Kamei et al. |
| 9,507,445 B2 | 11/2016 | Sutton et al. |
| 9,508,133 B2 | 11/2016 | Kindle et al. |
| 9,509,919 B2 | 11/2016 | Rivard et al. |
| 9,516,217 B2 | 12/2016 | Corcoran et al. |
| 9,516,221 B2 | 12/2016 | Lee |
| 9,531,961 B2 | 12/2016 | Rivard et al. |
| 9,538,111 B2 | 1/2017 | Yang et al. |
| 9,538,112 B2 | 1/2017 | Wada et al. |
| 9,544,505 B2 | 1/2017 | Tsuzuki |
| 9,544,508 B2 | 1/2017 | Cheng et al. |
| 9,544,513 B2 | 1/2017 | Shin et al. |
| 9,549,140 B2 | 1/2017 | Jung et al. |
| 9,552,076 B2 | 1/2017 | Homma et al. |
| 9,554,013 B2 | 1/2017 | Kim et al. |
| 9,560,269 B2 | 1/2017 | Baldwin |
| 9,565,374 B2 | 2/2017 | Kim et al. |
| 9,571,745 B2 | 2/2017 | Mahowald |
| 9,571,760 B2 | 2/2017 | Kang et al. |
| 9,578,211 B2 | 2/2017 | Kong et al. |
| 9,578,260 B2 | 2/2017 | Song et al. |
| 9,578,268 B2 | 2/2017 | Kim et al. |
| 9,591,225 B2 | 3/2017 | Jung et al. |
| 9,594,945 B2 | 3/2017 | Park et al. |
| 9,595,086 B2 | 3/2017 | Kim |
| 9,600,735 B2 | 3/2017 | Nakagome et al. |
| 9,600,741 B1 | 3/2017 | Su et al. |
| 9,608,147 B2 | 3/2017 | Kim et al. |
| 9,609,221 B2 | 3/2017 | Kim et al. |
| 9,609,246 B2 | 3/2017 | Meddeler |
| 9,609,250 B2 | 3/2017 | Lee et al. |
| 9,621,796 B2 | 4/2017 | Muukki et al. |
| 9,628,647 B2 | 4/2017 | Tomono et al. |
| 9,635,279 B2 | 4/2017 | Lee et al. |
| 9,635,333 B2 | 4/2017 | Cho et al. |

(56) References Cited

U.S. PATENT DOCUMENTS

| | | |
|---|---|---|
| 9,639,742 B2 | 5/2017 | Lee et al. |
| 9,641,789 B2 | 5/2017 | Cho et al. |
| 9,646,576 B2 | 5/2017 | Masuko |
| 9,648,221 B2 | 5/2017 | Seo |
| 9,658,643 B2 | 5/2017 | Jeong et al. |
| 9,661,290 B2 | 5/2017 | Moriya |
| 9,661,327 B2 | 5/2017 | Nilsson |
| 9,667,892 B2 | 5/2017 | Sakuragi |
| 9,684,434 B2 | 6/2017 | Lewin et al. |
| 9,686,489 B2 | 6/2017 | Hsu |
| 9,692,996 B2 | 6/2017 | Choi et al. |
| 9,704,250 B1 | 7/2017 | Shah et al. |
| 9,706,074 B2 | 7/2017 | Baek et al. |
| 9,712,773 B2 | 7/2017 | Lim et al. |
| 9,716,880 B2 | 7/2017 | Chen et al. |
| 9,721,375 B1 | 8/2017 | Rivard et al. |
| 9,723,238 B2 | 8/2017 | Lee et al. |
| 9,736,405 B2 | 8/2017 | Kozlowski |
| 9,741,150 B2 | 8/2017 | Feder et al. |
| 9,742,596 B2 | 8/2017 | Goyal et al. |
| 9,749,613 B2 | 8/2017 | Park et al. |
| 9,756,267 B2 | 9/2017 | Dowaki et al. |
| 9,760,764 B2 | 9/2017 | Mishra et al. |
| 9,761,033 B2 | 9/2017 | Flider |
| 9,762,829 B2 | 9/2017 | Choi et al. |
| 9,769,382 B2 | 9/2017 | Kim et al. |
| 9,769,404 B2 | 9/2017 | Ohshitanai |
| 9,769,686 B2 | 9/2017 | Kang et al. |
| 9,773,827 B2 | 9/2017 | Minowa et al. |
| 9,774,347 B2 | 9/2017 | Chae et al. |
| 9,774,781 B2 | 9/2017 | Cho |
| 9,779,287 B2 | 10/2017 | Steinberg et al. |
| 9,779,481 B2 | 10/2017 | Yuasa |
| 9,793,909 B2 | 10/2017 | Kim et al. |
| 9,794,607 B2 | 10/2017 | Joy et al. |
| 9,798,395 B2 | 10/2017 | Ye et al. |
| 9,800,638 B2 | 10/2017 | Munagala et al. |
| 9,800,814 B2 | 10/2017 | Jin et al. |
| 9,806,721 B2 | 10/2017 | Kim et al. |
| 9,807,322 B2 | 10/2017 | Feder et al. |
| 9,813,615 B2 | 11/2017 | Lee et al. |
| 9,819,849 B1 | 11/2017 | Rivard et al. |
| 9,820,705 B2 | 11/2017 | Kim |
| 9,832,382 B2 | 11/2017 | Hasan et al. |
| 9,843,756 B2 | 12/2017 | Wang et al. |
| 9,846,804 B2 | 12/2017 | Lim et al. |
| 9,848,116 B2 | 12/2017 | Shimokawa et al. |
| 9,854,218 B2 | 12/2017 | Yu et al. |
| 9,858,648 B2 | 1/2018 | Li et al. |
| 9,860,448 B2 | 1/2018 | Yoo et al. |
| 9,860,461 B2 | 1/2018 | Feder et al. |
| 9,886,192 B2 | 2/2018 | Masuko |
| 9,886,766 B2 | 2/2018 | Madineni et al. |
| 9,894,289 B2 | 2/2018 | Rivard et al. |
| 9,894,347 B2 | 2/2018 | Yoon et al. |
| 9,898,674 B2 | 2/2018 | Connell, II et al. |
| 9,900,492 B2 | 2/2018 | Seo |
| 9,912,928 B2 | 3/2018 | Rivard et al. |
| 9,918,017 B2 | 3/2018 | Rivard et al. |
| 9,924,147 B2 | 3/2018 | Rivard et al. |
| 9,934,561 B2 | 4/2018 | Feder et al. |
| 9,942,464 B2 | 4/2018 | Voss |
| 9,942,501 B2 | 4/2018 | Jung et al. |
| 9,942,504 B2 | 4/2018 | Nishizawa |
| 9,953,454 B1 | 4/2018 | Rivard et al. |
| 9,959,803 B2 | 5/2018 | Kim et al. |
| 9,961,272 B2 | 5/2018 | Lee et al. |
| 9,973,709 B2 | 5/2018 | You et al. |
| 9,978,431 B2 | 5/2018 | Jung et al. |
| 9,979,910 B2 | 5/2018 | Ikedo |
| 9,986,163 B2 | 5/2018 | Park et al. |
| 9,989,642 B2 | 6/2018 | Kang et al. |
| 9,997,133 B2 | 6/2018 | Kim |
| 9,998,721 B2 | 6/2018 | Rivard et al. |
| 9,998,730 B2 | 6/2018 | Park et al. |
| 9,998,935 B2 | 6/2018 | Rivard et al. |
| 10,007,842 B2 | 6/2018 | Hu |
| 10,015,428 B2 | 7/2018 | Lee et al. |
| 10,025,972 B2 | 7/2018 | Matas et al. |
| 10,027,726 B1 | 7/2018 | Ozog |
| 10,033,917 B1 | 7/2018 | Silverstein et al. |
| 10,038,866 B2 | 7/2018 | Lee et al. |
| 10,043,058 B2 | 8/2018 | Ahmed |
| 10,049,425 B2 | 8/2018 | Cornell |
| 10,055,646 B2 | 8/2018 | Bataller et al. |
| 10,078,198 B2 | 9/2018 | Lee et al. |
| 10,088,866 B2 | 10/2018 | Braun et al. |
| 10,088,989 B2 | 10/2018 | Rivard et al. |
| 10,095,941 B2 | 10/2018 | Kang et al. |
| 10,097,765 B2 | 10/2018 | Sheikh et al. |
| 10,102,829 B2 | 10/2018 | Paulson |
| 10,109,098 B2 | 10/2018 | Feder et al. |
| 10,109,107 B2 | 10/2018 | Knorr et al. |
| 10,110,867 B2 | 10/2018 | Rivard et al. |
| 10,110,870 B2 | 10/2018 | Rivard et al. |
| 10,115,753 B2 | 10/2018 | Baek |
| 10,127,455 B2 | 11/2018 | Han et al. |
| 10,129,476 B1 | 11/2018 | Hushchyn et al. |
| 10,129,514 B2 | 11/2018 | Rivard et al. |
| 10,134,787 B2 | 11/2018 | Moon |
| 10,145,891 B2 | 12/2018 | Cho et al. |
| 10,146,034 B2 | 12/2018 | Choi et al. |
| 10,148,898 B2 | 12/2018 | Dowaki et al. |
| 10,154,214 B2 | 12/2018 | Liim et al. |
| 10,178,300 B2 | 1/2019 | Rivard et al. |
| 10,178,323 B2 | 1/2019 | Rivard et al. |
| 10,182,197 B2 | 1/2019 | Feder et al. |
| 10,186,019 B2 | 1/2019 | Homma et al. |
| 10,194,093 B2 | 1/2019 | Takahashi |
| 10,225,479 B2 | 3/2019 | Shabtay et al. |
| 10,257,426 B2 | 4/2019 | Lee et al. |
| 10,270,958 B2 | 4/2019 | Rivard et al. |
| 10,271,001 B2 | 4/2019 | Uchida et al. |
| 10,277,807 B2 | 4/2019 | Song |
| 10,284,834 B2 | 5/2019 | Rivard et al. |
| 10,291,842 B2 | 5/2019 | Kim et al. |
| 10,346,676 B2 | 7/2019 | Ahmed |
| 10,346,677 B2 | 7/2019 | Steinberg et al. |
| 10,360,716 B1 | 7/2019 | van der Meulen et al. |
| 10,365,820 B2 | 7/2019 | Lee et al. |
| 10,366,526 B2 | 7/2019 | Rivard et al. |
| 10,367,024 B2 | 7/2019 | Nah et al. |
| 10,372,971 B2 | 8/2019 | Rivard et al. |
| 10,375,367 B2 | 8/2019 | Rivard et al. |
| 10,375,369 B2 | 8/2019 | Rivard et al. |
| 10,382,702 B2 | 8/2019 | Rivard et al. |
| 10,387,963 B1 | 8/2019 | Leise et al. |
| 10,396,119 B2 | 8/2019 | Kim et al. |
| 10,404,930 B2 | 9/2019 | Shin et al. |
| 10,410,061 B2 | 9/2019 | Kim et al. |
| 10,410,605 B2 | 9/2019 | Gardenfors et al. |
| 10,469,714 B2 | 11/2019 | Rivard et al. |
| 10,477,077 B2 | 11/2019 | Rivard et al. |
| 10,477,087 B2 | 11/2019 | Rivard et al. |
| 10,477,093 B2 | 11/2019 | Hong et al. |
| 10,491,834 B2 | 11/2019 | Rivard et al. |
| 10,498,978 B2 | 12/2019 | Chou et al. |
| 10,498,982 B2 | 12/2019 | Feder et al. |
| 10,506,463 B2 | 12/2019 | Rivard et al. |
| 10,521,946 B1 | 12/2019 | Roche et al. |
| 10,552,016 B2 | 2/2020 | Cherna et al. |
| 10,552,946 B2 | 2/2020 | Furukawa |
| 10,554,890 B1 | 2/2020 | Le et al. |
| 10,554,943 B2 | 2/2020 | Rivard et al. |
| 10,558,848 B2 | 2/2020 | Rivard et al. |
| 10,586,097 B2 | 3/2020 | Rivard et al. |
| 10,586,369 B1 | 3/2020 | Roche et al. |
| 10,587,864 B2 | 3/2020 | Hayasaka et al. |
| 10,605,922 B2 | 3/2020 | Deane |
| 10,613,585 B2 | 4/2020 | Park |
| 10,621,771 B2 | 4/2020 | Matts et al. |
| 10,623,677 B2 | 4/2020 | Koh et al. |
| 10,627,854 B2 | 4/2020 | Gurr et al. |
| 10,628,666 B2 | 4/2020 | Sareen et al. |

(56) References Cited

U.S. PATENT DOCUMENTS

| | | |
|---|---|---|
| 10,628,729 B2 | 4/2020 | Sareen |
| 10,630,903 B2 | 4/2020 | Srivastava et al. |
| 10,652,478 B2 | 5/2020 | Rivard et al. |
| 10,708,545 B2 | 7/2020 | Rivard et al. |
| 10,742,892 B1 | 8/2020 | Le et al. |
| 10,747,995 B2 | 8/2020 | Huang et al. |
| 10,785,401 B2 | 9/2020 | Rivard et al. |
| 10,802,144 B2 | 10/2020 | Lee et al. |
| 10,810,781 B2 | 10/2020 | Feder et al. |
| 10,832,388 B2 | 11/2020 | Liu et al. |
| 10,834,329 B2 | 11/2020 | Gatt et al. |
| 10,842,466 B2 | 11/2020 | Kang et al. |
| 10,867,405 B2 | 12/2020 | Yoo et al. |
| 10,869,018 B2 | 12/2020 | Kim et al. |
| 10,880,521 B2 | 12/2020 | Rivard et al. |
| 10,887,495 B2 | 1/2021 | Chung et al. |
| 10,904,505 B2 | 1/2021 | Rivard et al. |
| 10,917,571 B2 | 2/2021 | Shanmugam et al. |
| 10,924,688 B2 | 2/2021 | Rivard et al. |
| 10,929,945 B2 | 2/2021 | Lim et al. |
| 10,931,897 B2 | 2/2021 | Feder et al. |
| 10,937,222 B2 | 3/2021 | Rivard et al. |
| 10,955,983 B2 | 3/2021 | Post et al. |
| 11,025,831 B2 | 6/2021 | Rivard et al. |
| 11,113,523 B2 | 9/2021 | Son et al. |
| 11,113,821 B2 | 9/2021 | Rivard et al. |
| 11,113,859 B1 | 9/2021 | Xiao et al. |
| 11,202,047 B2 | 12/2021 | Rivard et al. |
| 11,205,305 B2 | 12/2021 | Sadi et al. |
| 11,252,589 B2 | 2/2022 | Rivard et al. |
| 11,308,626 B2 | 4/2022 | Rivard et al. |
| 11,356,647 B2 | 6/2022 | Rivard |
| 11,363,179 B2 | 6/2022 | Rivard et al. |
| 11,375,085 B2 | 6/2022 | Rivard et al. |
| 11,394,894 B2 | 7/2022 | Rivard et al. |
| 11,394,895 B2 | 7/2022 | Rivard et al. |
| 11,455,829 B2 | 9/2022 | Rivard et al. |
| 11,463,630 B2 | 10/2022 | Rivard et al. |
| 11,477,409 B2 | 10/2022 | Kim |
| 11,620,754 B2 | 4/2023 | Rivard et al. |
| 11,683,448 B2 | 6/2023 | Rivard et al. |
| 11,699,219 B2 | 7/2023 | Rivard et al. |
| 11,729,518 B2 | 8/2023 | Rivard et al. |
| 12,003,853 B2 | 6/2024 | Rivard et al. |
| 12,003,864 B2 | 6/2024 | Rivard et al. |
| 12,143,842 B2 | 11/2024 | Rivard et al. |
| 12,175,632 B2 | 12/2024 | Gao et al. |
| 2001/0009437 A1 | 7/2001 | Klein et al. |
| 2001/0030770 A1 | 10/2001 | Ohashi |
| 2001/0033284 A1 | 10/2001 | Chan |
| 2001/0033336 A1 | 10/2001 | Kameshima et al. |
| 2001/0033675 A1 | 10/2001 | Maurer et al. |
| 2001/0039582 A1 | 11/2001 | McKinnon et al. |
| 2002/0003545 A1 | 1/2002 | Nakamura |
| 2002/0006232 A1 | 1/2002 | Inui |
| 2002/0012450 A1 | 1/2002 | Tsujii |
| 2002/0059432 A1 | 5/2002 | Masuda et al. |
| 2002/0060566 A1 | 5/2002 | Debbins et al. |
| 2002/0063714 A1 | 5/2002 | Haas et al. |
| 2002/0070945 A1 | 6/2002 | Kage |
| 2002/0087300 A1 | 7/2002 | Patwari |
| 2002/0106114 A1 | 8/2002 | Yan et al. |
| 2002/0107750 A1 | 8/2002 | Kanevsky et al. |
| 2002/0113882 A1 | 8/2002 | Pollard et al. |
| 2002/0114296 A1 | 8/2002 | Hardy |
| 2002/0122014 A1 | 9/2002 | Rajasingham |
| 2002/0141256 A1 | 10/2002 | Barri et al. |
| 2002/0146074 A1 | 10/2002 | Ariel et al. |
| 2002/0196472 A1 | 12/2002 | Enomoto |
| 2003/0015645 A1 | 1/2003 | Brickell et al. |
| 2003/0025816 A1 | 2/2003 | Sakuragi |
| 2003/0039211 A1 | 2/2003 | Hvostov et al. |
| 2003/0042425 A1 | 3/2003 | Tashiro et al. |
| 2003/0046477 A1 | 3/2003 | Jeddeloh |
| 2003/0086002 A1 | 5/2003 | Cahill et al. |
| 2003/0090577 A1 | 5/2003 | Shirakawa |
| 2003/0097531 A1 | 5/2003 | Arimilli et al. |
| 2003/0103523 A1 | 6/2003 | Frossard et al. |
| 2003/0133599 A1 | 7/2003 | Tian et al. |
| 2003/0142745 A1 | 7/2003 | Osawa |
| 2003/0148811 A1 | 8/2003 | Sitrick |
| 2003/0152096 A1 | 8/2003 | Chapman |
| 2003/0179911 A1 | 9/2003 | Ho et al. |
| 2003/0184660 A1 | 10/2003 | Skow |
| 2003/0197784 A1 | 10/2003 | Bae |
| 2003/0206654 A1 | 11/2003 | Teng |
| 2003/0210672 A1 | 11/2003 | Cromer et al. |
| 2003/0212792 A1 | 11/2003 | Raymond |
| 2003/0215153 A1 | 11/2003 | Gindele et al. |
| 2003/0218682 A1 | 11/2003 | Lim et al. |
| 2003/0222978 A9 | 12/2003 | Thomason |
| 2003/0223622 A1 | 12/2003 | Simon et al. |
| 2004/0021701 A1 | 2/2004 | Iwema et al. |
| 2004/0027471 A1 | 2/2004 | Koseki et al. |
| 2004/0042807 A1 | 3/2004 | Nakayama |
| 2004/0045006 A1 | 3/2004 | Simonson et al. |
| 2004/0052248 A1 | 3/2004 | Frank et al. |
| 2004/0059783 A1 | 3/2004 | Kazui et al. |
| 2004/0070676 A1 | 4/2004 | Lawther et al. |
| 2004/0071465 A1 | 4/2004 | Smart et al. |
| 2004/0085259 A1 | 5/2004 | Tarlton et al. |
| 2004/0135912 A1 | 7/2004 | Hofflinger et al. |
| 2004/0145674 A1 | 7/2004 | Hoppe et al. |
| 2004/0150622 A1 | 8/2004 | Bohn |
| 2004/0158582 A1 | 8/2004 | Takagi et al. |
| 2004/0178349 A1 | 9/2004 | Kameshima |
| 2004/0181375 A1 | 9/2004 | Szu et al. |
| 2004/0184115 A1 | 9/2004 | Suzuki |
| 2004/0184677 A1 | 9/2004 | Raskar et al. |
| 2004/0201589 A1 | 10/2004 | Ekstrom |
| 2004/0204144 A1 | 10/2004 | Lim |
| 2004/0228528 A1 | 11/2004 | Lao |
| 2004/0234259 A1 | 11/2004 | Muramatsu |
| 2004/0239792 A1 | 12/2004 | Shibutani et al. |
| 2004/0247177 A1 | 12/2004 | Rowe et al. |
| 2004/0252199 A1 | 12/2004 | Cheung et al. |
| 2004/0263510 A1 | 12/2004 | Marschner et al. |
| 2005/0010697 A1 | 1/2005 | Kinawi et al. |
| 2005/0022131 A1 | 1/2005 | Saint-Hilaire et al. |
| 2005/0047333 A1 | 3/2005 | Todd et al. |
| 2005/0068432 A1 | 3/2005 | Kozuka |
| 2005/0088570 A1 | 4/2005 | Seo |
| 2005/0089212 A1 | 4/2005 | Mashitani et al. |
| 2005/0093997 A1 | 5/2005 | Dalton et al. |
| 2005/0104848 A1 | 5/2005 | Yamaguchi et al. |
| 2005/0128438 A1 | 6/2005 | Kang et al. |
| 2005/0134723 A1 | 6/2005 | Lee et al. |
| 2005/0143124 A1 | 6/2005 | Kennedy et al. |
| 2005/0147292 A1 | 7/2005 | Huang et al. |
| 2005/0151853 A1 | 7/2005 | Suh |
| 2005/0154798 A1 | 7/2005 | Nurmi |
| 2005/0155043 A1 | 7/2005 | Schulz et al. |
| 2005/0173646 A1 | 8/2005 | Tashiro et al. |
| 2005/0180657 A1 | 8/2005 | Zhang et al. |
| 2005/0182808 A1 | 8/2005 | Kanai |
| 2005/0196069 A1 | 9/2005 | Yonaha |
| 2005/0218333 A1 | 10/2005 | Kameshima |
| 2005/0237587 A1 | 10/2005 | Nakamura |
| 2005/0237588 A1 | 10/2005 | Gohara et al. |
| 2005/0253945 A1 | 11/2005 | Shinohara |
| 2005/0253946 A1 | 11/2005 | Shinohara |
| 2005/0264688 A1 | 12/2005 | Ouchi |
| 2005/0286559 A1 | 12/2005 | Miernik et al. |
| 2006/0007346 A1 | 1/2006 | Nakamura et al. |
| 2006/0008171 A1 | 1/2006 | Petschnigg et al. |
| 2006/0012689 A1 | 1/2006 | Dalton et al. |
| 2006/0015308 A1 | 1/2006 | Marschner et al. |
| 2006/0017837 A1 | 1/2006 | Sorek et al. |
| 2006/0026535 A1 | 2/2006 | Hotelling et al. |
| 2006/0028987 A1 | 2/2006 | Alexander Gildfind et al. |
| 2006/0029292 A1 | 2/2006 | Hagiwara |
| 2006/0033724 A1 | 2/2006 | Chaudhri et al. |
| 2006/0033760 A1 | 2/2006 | Koh |
| 2006/0038899 A1 | 2/2006 | Tamaru et al. |

(56) References Cited

U.S. PATENT DOCUMENTS

| | | |
|---|---|---|
| 2006/0039630 A1 | 2/2006 | Kotani |
| 2006/0050165 A1 | 3/2006 | Amano |
| 2006/0050335 A1 | 3/2006 | Dorrell et al. |
| 2006/0053371 A1 | 3/2006 | Anderson |
| 2006/0054834 A1 | 3/2006 | Kameshima |
| 2006/0067668 A1 | 3/2006 | Kita |
| 2006/0072810 A1 | 4/2006 | Scharlack et al. |
| 2006/0085541 A1 | 4/2006 | Cuomo et al. |
| 2006/0087702 A1 | 4/2006 | Satoh et al. |
| 2006/0115157 A1 | 6/2006 | Mori et al. |
| 2006/0120571 A1 | 6/2006 | Tu et al. |
| 2006/0133375 A1 | 6/2006 | Napierala |
| 2006/0133695 A1 | 6/2006 | Obinata |
| 2006/0138488 A1 | 6/2006 | Kim |
| 2006/0139460 A1 | 6/2006 | Ozaki |
| 2006/0153127 A1 | 7/2006 | Lee |
| 2006/0177150 A1 | 8/2006 | Uyttendaele et al. |
| 2006/0181614 A1 | 8/2006 | Yen et al. |
| 2006/0188132 A1 | 8/2006 | Shigeta |
| 2006/0192130 A1 | 8/2006 | Yagi |
| 2006/0192785 A1 | 8/2006 | Marschner et al. |
| 2006/0195252 A1 | 8/2006 | Orr et al. |
| 2006/0203100 A1 | 9/2006 | Ajito et al. |
| 2006/0212538 A1 | 9/2006 | Sutardja |
| 2006/0215016 A1 | 9/2006 | Cohen et al. |
| 2006/0222260 A1 | 10/2006 | Sambongi et al. |
| 2006/0225034 A1 | 10/2006 | Peck et al. |
| 2006/0231875 A1 | 10/2006 | Patrick et al. |
| 2006/0245014 A1 | 11/2006 | Haneda |
| 2006/0245639 A1 | 11/2006 | Jiang et al. |
| 2006/0262363 A1 | 11/2006 | Henley |
| 2006/0280343 A1 | 12/2006 | Lee et al. |
| 2007/0002897 A1 | 1/2007 | Goshen et al. |
| 2007/0004451 A1 | 1/2007 | C. Anderson |
| 2007/0019000 A1 | 1/2007 | Motomura et al. |
| 2007/0023798 A1 | 2/2007 | McKee |
| 2007/0025714 A1 | 2/2007 | Shiraki |
| 2007/0025717 A1 | 2/2007 | Raskar et al. |
| 2007/0025720 A1 | 2/2007 | Raskar et al. |
| 2007/0030357 A1 | 2/2007 | Levien et al. |
| 2007/0045433 A1 | 3/2007 | Chapman et al. |
| 2007/0052838 A1 | 3/2007 | Zhang |
| 2007/0060135 A1 | 3/2007 | Lin |
| 2007/0069144 A1 | 3/2007 | Kameshima |
| 2007/0070364 A1 | 3/2007 | Henley |
| 2007/0080299 A1 | 4/2007 | Endo et al. |
| 2007/0092137 A1 | 4/2007 | Zhao et al. |
| 2007/0101067 A1 | 5/2007 | Shafi et al. |
| 2007/0101251 A1 | 5/2007 | Lee et al. |
| 2007/0110305 A1 | 5/2007 | Corcoran et al. |
| 2007/0121182 A1 | 5/2007 | Fukushima et al. |
| 2007/0122034 A1 | 5/2007 | Maor |
| 2007/0133988 A1 | 6/2007 | Kim et al. |
| 2007/0136208 A1 | 6/2007 | Hamashima et al. |
| 2007/0145447 A1 | 6/2007 | Lee et al. |
| 2007/0146529 A1 | 6/2007 | Suzuki |
| 2007/0146538 A1 | 6/2007 | Kakinuma et al. |
| 2007/0165960 A1 | 7/2007 | Yamada |
| 2007/0171210 A1 | 7/2007 | Chaudhri et al. |
| 2007/0182823 A1 | 8/2007 | Maruyama et al. |
| 2007/0182936 A1 | 8/2007 | Suzuki |
| 2007/0189748 A1 | 8/2007 | Drimbarean et al. |
| 2007/0198931 A1 | 8/2007 | Ono et al. |
| 2007/0200663 A1 | 8/2007 | White et al. |
| 2007/0200925 A1 | 8/2007 | Kim |
| 2007/0201853 A1 | 8/2007 | Petschnigg |
| 2007/0206885 A1 | 9/2007 | Wen |
| 2007/0211307 A1 | 9/2007 | Uvarov |
| 2007/0223062 A1 | 9/2007 | Tanaka et al. |
| 2007/0223954 A1 | 9/2007 | Hata |
| 2007/0236515 A1 | 10/2007 | Montague |
| 2007/0236709 A1 | 10/2007 | Mitani |
| 2007/0242900 A1 | 10/2007 | Chen et al. |
| 2007/0244925 A1 | 10/2007 | Albouze |
| 2007/0248342 A1 | 10/2007 | Tamminen et al. |
| 2007/0258008 A1 | 11/2007 | Kameshima et al. |
| 2007/0260979 A1 | 11/2007 | Hertzfeld et al. |
| 2007/0263099 A1 | 11/2007 | Motta et al. |
| 2007/0263106 A1 | 11/2007 | Tanaka et al. |
| 2007/0264000 A1 | 11/2007 | Hsieh et al. |
| 2007/0274331 A1 | 11/2007 | Locatelli et al. |
| 2007/0280505 A1 | 12/2007 | Breed |
| 2007/0291081 A1 | 12/2007 | Kanno et al. |
| 2007/0296820 A1 | 12/2007 | Lonn |
| 2007/0297567 A1 | 12/2007 | Takenaka et al. |
| 2008/0001945 A1 | 1/2008 | Kashito et al. |
| 2008/0001950 A1 | 1/2008 | Lin et al. |
| 2008/0004946 A1 | 1/2008 | Schwarz |
| 2008/0012973 A1 | 1/2008 | Park et al. |
| 2008/0018763 A1 | 1/2008 | Sato |
| 2008/0018911 A1 | 1/2008 | Igaki et al. |
| 2008/0019575 A1 | 1/2008 | Scalise et al. |
| 2008/0019680 A1 | 1/2008 | Kasahara et al. |
| 2008/0025576 A1 | 1/2008 | Li et al. |
| 2008/0030592 A1 | 2/2008 | Border et al. |
| 2008/0037829 A1 | 2/2008 | Givon |
| 2008/0043032 A1 | 2/2008 | Mamona et al. |
| 2008/0043114 A1 | 2/2008 | Sung et al. |
| 2008/0050022 A1 | 2/2008 | Okada et al. |
| 2008/0052945 A1 | 3/2008 | Matas et al. |
| 2008/0076481 A1 | 3/2008 | Iwasaki et al. |
| 2008/0079842 A1 | 4/2008 | Aoki et al. |
| 2008/0092051 A1 | 4/2008 | Sidon et al. |
| 2008/0094419 A1 | 4/2008 | Leigh et al. |
| 2008/0105909 A1 | 5/2008 | Ham et al. |
| 2008/0106636 A1 | 5/2008 | Wernersson |
| 2008/0107411 A1 | 5/2008 | Hope |
| 2008/0112361 A1 | 5/2008 | Wu |
| 2008/0122796 A1 | 5/2008 | Jobs et al. |
| 2008/0122933 A1 | 5/2008 | Murayama |
| 2008/0129848 A1 | 6/2008 | Yamauchi |
| 2008/0151097 A1 | 6/2008 | Chen et al. |
| 2008/0158398 A1 | 7/2008 | Yaffe et al. |
| 2008/0158403 A1 | 7/2008 | Itano et al. |
| 2008/0165144 A1 | 7/2008 | Forstall et al. |
| 2008/0170131 A1 | 7/2008 | Lee et al. |
| 2008/0170158 A1 | 7/2008 | Jung et al. |
| 2008/0170160 A1 | 7/2008 | Lukac |
| 2008/0174570 A1 | 7/2008 | Jobs et al. |
| 2008/0180540 A1 | 7/2008 | Kim et al. |
| 2008/0181597 A1 | 7/2008 | Tamura |
| 2008/0192064 A1 | 8/2008 | Hong et al. |
| 2008/0192131 A1 | 8/2008 | Kim et al. |
| 2008/0192773 A1 | 8/2008 | Ou et al. |
| 2008/0192819 A1 | 8/2008 | Ward et al. |
| 2008/0192991 A1 | 8/2008 | Gremse et al. |
| 2008/0193119 A1 | 8/2008 | Miyazaki |
| 2008/0198219 A1 | 8/2008 | Yoshida et al. |
| 2008/0199172 A1 | 8/2008 | Hamada |
| 2008/0207322 A1 | 8/2008 | Mizrahi |
| 2008/0212591 A1 | 9/2008 | Wu et al. |
| 2008/0218611 A1 | 9/2008 | Parulski et al. |
| 2008/0225057 A1 | 9/2008 | Hertzfeld et al. |
| 2008/0266326 A1 | 10/2008 | Porwal |
| 2008/0269958 A1 | 10/2008 | Filev et al. |
| 2008/0275881 A1 | 11/2008 | Conn et al. |
| 2008/0278603 A1 | 11/2008 | Lee et al. |
| 2008/0297596 A1 | 12/2008 | Inomata et al. |
| 2008/0298794 A1 | 12/2008 | Subbotin et al. |
| 2008/0303813 A1 | 12/2008 | Joung et al. |
| 2008/0307363 A1 | 12/2008 | Jalon et al. |
| 2008/0309788 A1 | 12/2008 | Onozawa |
| 2008/0309810 A1 | 12/2008 | Smith et al. |
| 2008/0310753 A1 | 12/2008 | Edgar |
| 2008/0316226 A1 | 12/2008 | Weibrecht et al. |
| 2008/0317376 A1 | 12/2008 | Kasperkiewicz |
| 2009/0002335 A1 | 1/2009 | Chaudhri |
| 2009/0002391 A1 | 1/2009 | Williamson et al. |
| 2009/0002395 A1 | 1/2009 | Yamada |
| 2009/0002475 A1 | 1/2009 | Jelley et al. |
| 2009/0006626 A1 | 1/2009 | Yamagishi |
| 2009/0009636 A1 | 1/2009 | Endo |
| 2009/0015581 A1 | 1/2009 | Hirohara |
| 2009/0021937 A1 | 1/2009 | Sloan et al. |

(56) References Cited

U.S. PATENT DOCUMENTS

| | | |
|---|---|---|
| 2009/0027516 A1 | 1/2009 | Suzuki |
| 2009/0034460 A1 | 2/2009 | Moratt et al. |
| 2009/0040364 A1 | 2/2009 | Rubner |
| 2009/0041376 A1 | 2/2009 | Carletta et al. |
| 2009/0046928 A1 | 2/2009 | Kwak et al. |
| 2009/0052748 A1 | 2/2009 | Jiang et al. |
| 2009/0058845 A1 | 3/2009 | Fukuda et al. |
| 2009/0058873 A1 | 3/2009 | Brown Elliott et al. |
| 2009/0058882 A1 | 3/2009 | Adachi et al. |
| 2009/0060379 A1 | 3/2009 | Manabe |
| 2009/0066782 A1 | 3/2009 | Choi et al. |
| 2009/0080713 A1 | 3/2009 | Bigioi et al. |
| 2009/0085919 A1 | 4/2009 | Chen et al. |
| 2009/0110274 A1 | 4/2009 | Atanassov et al. |
| 2009/0134433 A1 | 5/2009 | Jung |
| 2009/0141149 A1 | 6/2009 | Zhang et al. |
| 2009/0153245 A1 | 6/2009 | Lee |
| 2009/0160944 A1 | 6/2009 | Trevelyan et al. |
| 2009/0160992 A1 | 6/2009 | Inaba et al. |
| 2009/0166547 A1 | 7/2009 | Endo et al. |
| 2009/0172516 A1 | 7/2009 | Gill |
| 2009/0175551 A1 | 7/2009 | Thorn |
| 2009/0175555 A1 | 7/2009 | Mahowald |
| 2009/0181770 A1 | 7/2009 | Viner et al. |
| 2009/0185659 A1 | 7/2009 | Ishii et al. |
| 2009/0196236 A1 | 8/2009 | Cai et al. |
| 2009/0218476 A1 | 9/2009 | Kameshima et al. |
| 2009/0219387 A1 | 9/2009 | Marman et al. |
| 2009/0230290 A1 | 9/2009 | Tashiro et al. |
| 2009/0230312 A1 | 9/2009 | Tashiro et al. |
| 2009/0231468 A1 | 9/2009 | Yasuda |
| 2009/0237420 A1 | 9/2009 | Lawrenz |
| 2009/0238419 A1 | 9/2009 | Steinberg et al. |
| 2009/0257683 A1 | 10/2009 | Cloud et al. |
| 2009/0262074 A1 | 10/2009 | Nasiri et al. |
| 2009/0262087 A1 | 10/2009 | Kim |
| 2009/0268055 A1 | 10/2009 | Hamilton, Jr. et al. |
| 2009/0278922 A1 | 11/2009 | Tinker et al. |
| 2009/0295941 A1 | 12/2009 | Nakajima et al. |
| 2009/0303373 A1 | 12/2009 | Yamada |
| 2009/0304070 A1 | 12/2009 | Lamy-Bergot et al. |
| 2009/0309035 A1 | 12/2009 | Kameshima |
| 2009/0309985 A1 | 12/2009 | Ibi |
| 2009/0309990 A1 | 12/2009 | Levoy et al. |
| 2009/0309994 A1 | 12/2009 | Inoue |
| 2009/0322903 A1 | 12/2009 | Hashimoto et al. |
| 2009/0323897 A1 | 12/2009 | Kameshima et al. |
| 2010/0007603 A1 | 1/2010 | Kirkup |
| 2010/0007665 A1 | 1/2010 | Smith et al. |
| 2010/0010986 A1 | 1/2010 | Icho et al. |
| 2010/0013842 A1 | 1/2010 | Green et al. |
| 2010/0017545 A1 | 1/2010 | Gildfind et al. |
| 2010/0020822 A1 | 1/2010 | Zerillo et al. |
| 2010/0026836 A1 | 2/2010 | Sugimoto |
| 2010/0034291 A1 | 2/2010 | Cho |
| 2010/0066763 A1 | 3/2010 | Macdougall et al. |
| 2010/0066822 A1 | 3/2010 | Steinberg et al. |
| 2010/0073499 A1 | 3/2010 | Gere |
| 2010/0079491 A1 | 4/2010 | Nonaka |
| 2010/0079494 A1 | 4/2010 | Sung et al. |
| 2010/0079655 A1 | 4/2010 | Eom et al. |
| 2010/0092036 A1 | 4/2010 | Das et al. |
| 2010/0115462 A1 | 5/2010 | Spencer et al. |
| 2010/0115605 A1 | 5/2010 | Beattie et al. |
| 2010/0118038 A1 | 5/2010 | Labour et al. |
| 2010/0118115 A1 | 5/2010 | Takahashi et al. |
| 2010/0118204 A1 | 5/2010 | Proca et al. |
| 2010/0121964 A1 | 5/2010 | Rowles et al. |
| 2010/0123737 A1 | 5/2010 | Williamson et al. |
| 2010/0123805 A1 | 5/2010 | Craig et al. |
| 2010/0123929 A1 | 5/2010 | Yoshimoto |
| 2010/0128145 A1 | 5/2010 | Pitts et al. |
| 2010/0135541 A1 | 6/2010 | Lai et al. |
| 2010/0146446 A1 | 6/2010 | Ahn et al. |
| 2010/0149377 A1 | 6/2010 | Shintani et al. |
| 2010/0157079 A1 | 6/2010 | Atanassov et al. |
| 2010/0157139 A1 | 6/2010 | Velarde et al. |
| 2010/0160049 A1 | 6/2010 | Oku |
| 2010/0165178 A1 | 7/2010 | Chou et al. |
| 2010/0165181 A1 | 7/2010 | Murakami et al. |
| 2010/0172578 A1 | 7/2010 | Reid et al. |
| 2010/0172579 A1 | 7/2010 | Reid et al. |
| 2010/0182465 A1 | 7/2010 | Okita |
| 2010/0183071 A1 | 7/2010 | Segall et al. |
| 2010/0194851 A1 | 8/2010 | Pasupaleti et al. |
| 2010/0194963 A1 | 8/2010 | Terashima |
| 2010/0201831 A1 | 8/2010 | Weinstein |
| 2010/0201846 A1 | 8/2010 | Silverbrook |
| 2010/0208099 A1 | 8/2010 | Nomura |
| 2010/0214320 A1 | 8/2010 | Mo |
| 2010/0215259 A1 | 8/2010 | Scalise et al. |
| 2010/0218113 A1 | 8/2010 | White et al. |
| 2010/0220933 A1 | 9/2010 | Takano et al. |
| 2010/0231747 A1 | 9/2010 | Yim |
| 2010/0231761 A1 | 9/2010 | Yanai |
| 2010/0257239 A1 | 10/2010 | Roberts |
| 2010/0265079 A1 | 10/2010 | Yin |
| 2010/0278452 A1 | 11/2010 | Sarkijarvi et al. |
| 2010/0299630 A1 | 11/2010 | McCutchen et al. |
| 2010/0302278 A1 | 12/2010 | Shaffer et al. |
| 2010/0302407 A1 | 12/2010 | Ayers et al. |
| 2010/0302408 A1 | 12/2010 | Ito |
| 2010/0315656 A1 | 12/2010 | Agata |
| 2010/0317332 A1 | 12/2010 | Bathiche et al. |
| 2010/0321439 A1 | 12/2010 | Kanno et al. |
| 2010/0322074 A1 | 12/2010 | Nakahira |
| 2010/0328442 A1 | 12/2010 | Yang et al. |
| 2010/0328486 A1 | 12/2010 | Steinberg et al. |
| 2010/0329564 A1 | 12/2010 | Hervas et al. |
| 2010/0333044 A1 | 12/2010 | Kethireddy |
| 2011/0012914 A1 | 1/2011 | Nakamura et al. |
| 2011/0013042 A1 | 1/2011 | Itano et al. |
| 2011/0013043 A1 | 1/2011 | Corcoran et al. |
| 2011/0013052 A1 | 1/2011 | Yanai |
| 2011/0019051 A1 | 1/2011 | Yin et al. |
| 2011/0019094 A1 | 1/2011 | Rossignol et al. |
| 2011/0029635 A1 | 2/2011 | Shkurko et al. |
| 2011/0032384 A1 | 2/2011 | Ono |
| 2011/0036986 A1 | 2/2011 | Tashiro et al. |
| 2011/0037712 A1 | 2/2011 | Kim et al. |
| 2011/0037777 A1 | 2/2011 | Lindahl et al. |
| 2011/0057880 A1 | 3/2011 | Kasahara |
| 2011/0058060 A1 | 3/2011 | Bigioi et al. |
| 2011/0058237 A1 | 3/2011 | Mikami |
| 2011/0071911 A1 | 3/2011 | Tung et al. |
| 2011/0074973 A1 | 3/2011 | Hayashi |
| 2011/0085061 A1 | 4/2011 | Kim |
| 2011/0090256 A1 | 4/2011 | Manchester |
| 2011/0090385 A1 | 4/2011 | Aoyama et al. |
| 2011/0095169 A1 | 4/2011 | Takenaka et al. |
| 2011/0096192 A1 | 4/2011 | Niikura |
| 2011/0096375 A1 | 4/2011 | Mikami |
| 2011/0102631 A1 | 5/2011 | Kim et al. |
| 2011/0105229 A1 | 5/2011 | Sitrick |
| 2011/0115893 A1 | 5/2011 | Hayashi |
| 2011/0115971 A1 | 5/2011 | Furuya et al. |
| 2011/0123118 A1 | 5/2011 | Nayar et al. |
| 2011/0131041 A1 | 6/2011 | Cortez et al. |
| 2011/0131331 A1 | 6/2011 | Brunson et al. |
| 2011/0134267 A1 | 6/2011 | Ohya |
| 2011/0134283 A1 | 6/2011 | Ryu |
| 2011/0134297 A1 | 6/2011 | Takeda |
| 2011/0145694 A1 | 6/2011 | Graves et al. |
| 2011/0150332 A1 | 6/2011 | Sibiryakov et al. |
| 2011/0150357 A1 | 6/2011 | Prentice |
| 2011/0157412 A1 | 6/2011 | Yoshida |
| 2011/0158473 A1 | 6/2011 | Sun et al. |
| 2011/0167382 A1 | 7/2011 | van Os |
| 2011/0185296 A1 | 7/2011 | Lanier et al. |
| 2011/0187749 A1 | 8/2011 | Dehmann et al. |
| 2011/0193982 A1 | 8/2011 | Kook et al. |
| 2011/0194618 A1 | 8/2011 | Gish et al. |
| 2011/0199519 A1 | 8/2011 | Yamauchi |
| 2011/0205395 A1 | 8/2011 | Levy |

(56) References Cited

U.S. PATENT DOCUMENTS

| | | |
|---|---|---|
| 2011/0205411 A1 | 8/2011 | Voronov |
| 2011/0212717 A1 | 9/2011 | Rhoads et al. |
| 2011/0221758 A1 | 9/2011 | Livingston |
| 2011/0221911 A1 | 9/2011 | Kang |
| 2011/0221935 A1 | 9/2011 | Kameshima |
| 2011/0227923 A1 | 9/2011 | Mariani et al. |
| 2011/0242334 A1 | 10/2011 | Wilburn et al. |
| 2011/0249086 A1 | 10/2011 | Guo et al. |
| 2011/0254792 A1 | 10/2011 | Waters et al. |
| 2011/0254860 A1 | 10/2011 | Zontrop et al. |
| 2011/0256886 A1 | 10/2011 | Velusamy |
| 2011/0261075 A1 | 10/2011 | Tanaka |
| 2011/0279698 A1 | 11/2011 | Yoshikawa |
| 2011/0279699 A1 | 11/2011 | Matsui |
| 2011/0280541 A1 | 11/2011 | Lee |
| 2011/0283346 A1 | 11/2011 | Li et al. |
| 2011/0286658 A1 | 11/2011 | Mitsui |
| 2011/0292242 A1 | 12/2011 | Imai |
| 2011/0298828 A1 | 12/2011 | Suzuki |
| 2011/0298982 A1 | 12/2011 | Kobayashi |
| 2011/0299741 A1 | 12/2011 | Zhang et al. |
| 2011/0304613 A1 | 12/2011 | Thoresson |
| 2011/0304752 A1 | 12/2011 | Lee et al. |
| 2011/0310094 A1 | 12/2011 | Park et al. |
| 2011/0311150 A1 | 12/2011 | Okamoto |
| 2011/0312376 A1 | 12/2011 | Woo et al. |
| 2011/0316859 A1 | 12/2011 | Nikula et al. |
| 2011/0316888 A1 | 12/2011 | Sachs et al. |
| 2011/0317005 A1 | 12/2011 | Atkinson |
| 2011/0317917 A1 | 12/2011 | Free |
| 2012/0001943 A1 | 1/2012 | Ishidera |
| 2012/0002082 A1 | 1/2012 | Johnson et al. |
| 2012/0002089 A1 | 1/2012 | Wang et al. |
| 2012/0007859 A1 | 1/2012 | Lee et al. |
| 2012/0007908 A1 | 1/2012 | Masuda |
| 2012/0008011 A1 | 1/2012 | Garcia Manchado |
| 2012/0026359 A1 | 2/2012 | Fukushima et al. |
| 2012/0033118 A1 | 2/2012 | Lee et al. |
| 2012/0033262 A1 | 2/2012 | Sakurai |
| 2012/0036051 A1 | 2/2012 | Sachson |
| 2012/0038635 A1 | 2/2012 | Stamate et al. |
| 2012/0044266 A1 | 2/2012 | Mori |
| 2012/0044543 A1 | 2/2012 | Mikami |
| 2012/0056889 A1 | 3/2012 | Carter et al. |
| 2012/0057051 A1 | 3/2012 | Ito et al. |
| 2012/0057064 A1 | 3/2012 | Gardiner et al. |
| 2012/0057786 A1 | 3/2012 | Yano |
| 2012/0066355 A1 | 3/2012 | Tiwari et al. |
| 2012/0068051 A1 | 3/2012 | Ahn et al. |
| 2012/0069213 A1 | 3/2012 | Jannard et al. |
| 2012/0075285 A1 | 3/2012 | Oyagi et al. |
| 2012/0075492 A1 | 3/2012 | Nanu et al. |
| 2012/0081382 A1 | 4/2012 | Lindahl et al. |
| 2012/0104267 A1 | 5/2012 | Matsumoto et al. |
| 2012/0105579 A1 | 5/2012 | Jeon et al. |
| 2012/0105584 A1 | 5/2012 | Gallagher et al. |
| 2012/0113092 A1 | 5/2012 | Bar-Zeev et al. |
| 2012/0113106 A1 | 5/2012 | Choi et al. |
| 2012/0117499 A1 | 5/2012 | Mori et al. |
| 2012/0120304 A1 | 5/2012 | Corcoran et al. |
| 2012/0127072 A1 | 5/2012 | Kim |
| 2012/0127333 A1 | 5/2012 | Maruyama et al. |
| 2012/0133745 A1 | 5/2012 | Takizawa |
| 2012/0139904 A1 | 6/2012 | Lee et al. |
| 2012/0144347 A1 | 6/2012 | Jo et al. |
| 2012/0154276 A1 | 6/2012 | Shin et al. |
| 2012/0154541 A1 | 6/2012 | Scott |
| 2012/0154627 A1 | 6/2012 | Rivard et al. |
| 2012/0154628 A1 | 6/2012 | Horiuchi |
| 2012/0159372 A1 | 6/2012 | Stallings et al. |
| 2012/0162251 A1 | 6/2012 | Minamino et al. |
| 2012/0162263 A1 | 6/2012 | Griffin et al. |
| 2012/0162465 A1 | 6/2012 | Culbert et al. |
| 2012/0172088 A1 | 7/2012 | Kirch et al. |
| 2012/0173889 A1 | 7/2012 | Wong et al. |
| 2012/0176413 A1 | 7/2012 | Kulik et al. |
| 2012/0176474 A1 | 7/2012 | Border |
| 2012/0176477 A1 | 7/2012 | Givon |
| 2012/0177352 A1 | 7/2012 | Pillman et al. |
| 2012/0182394 A1 | 7/2012 | Bae et al. |
| 2012/0188386 A1 | 7/2012 | Kulkarni et al. |
| 2012/0188392 A1 | 7/2012 | Smith |
| 2012/0194545 A1 | 8/2012 | Shibata et al. |
| 2012/0194905 A1 | 8/2012 | Ushio et al. |
| 2012/0200731 A1 | 8/2012 | Park et al. |
| 2012/0206488 A1 | 8/2012 | Wong et al. |
| 2012/0206506 A1 | 8/2012 | Kim et al. |
| 2012/0206582 A1 | 8/2012 | DiCarlo et al. |
| 2012/0210275 A1 | 8/2012 | Park et al. |
| 2012/0212661 A1 | 8/2012 | Yamaguchi et al. |
| 2012/0213407 A1 | 8/2012 | Haikin et al. |
| 2012/0218290 A1 | 8/2012 | Waschbuesch et al. |
| 2012/0224042 A1 | 9/2012 | Saijo |
| 2012/0224788 A1 | 9/2012 | Jia et al. |
| 2012/0226800 A1 | 9/2012 | Baratakke et al. |
| 2012/0229370 A1 | 9/2012 | Stroffolino et al. |
| 2012/0242683 A1 | 9/2012 | Asai |
| 2012/0242844 A1 | 9/2012 | Walker et al. |
| 2012/0242886 A1 | 9/2012 | Kawarada |
| 2012/0250082 A1 | 10/2012 | Mori |
| 2012/0250952 A1 | 10/2012 | Kveton et al. |
| 2012/0254808 A1 | 10/2012 | Gildfind |
| 2012/0256959 A1 | 10/2012 | Ye et al. |
| 2012/0262450 A1 | 10/2012 | Aiba |
| 2012/0262600 A1 | 10/2012 | Velarde et al. |
| 2012/0273651 A1 | 11/2012 | Willassen |
| 2012/0274661 A1 | 11/2012 | Ye et al. |
| 2012/0274806 A1 | 11/2012 | Mori |
| 2012/0277914 A1 | 11/2012 | Crow et al. |
| 2012/0278727 A1 | 11/2012 | Ananthakrishnan et al. |
| 2012/0287223 A1 | 11/2012 | Zhang et al. |
| 2012/0293556 A1 | 11/2012 | Kim et al. |
| 2012/0294533 A1 | 11/2012 | Ikenoue |
| 2012/0299964 A1 | 11/2012 | Homma et al. |
| 2012/0307096 A1 | 12/2012 | Ford et al. |
| 2012/0307097 A1 | 12/2012 | Araoka et al. |
| 2012/0307100 A1 | 12/2012 | Iwane |
| 2012/0314100 A1 | 12/2012 | Frank |
| 2012/0314124 A1 | 12/2012 | Kaizu et al. |
| 2012/0324400 A1 | 12/2012 | Caliendo, Jr. et al. |
| 2013/0001402 A1 | 1/2013 | Ogushi |
| 2013/0001429 A1 | 1/2013 | Dowaki et al. |
| 2013/0002932 A1 | 1/2013 | Guenter et al. |
| 2013/0006953 A1 | 1/2013 | Epshtein et al. |
| 2013/0010075 A1 | 1/2013 | Gallagher et al. |
| 2013/0010138 A1 | 1/2013 | Bigioi et al. |
| 2013/0011039 A1 | 1/2013 | Kadir et al. |
| 2013/0016122 A1 | 1/2013 | Bhatt et al. |
| 2013/0016222 A1 | 1/2013 | Jiang et al. |
| 2013/0019196 A1 | 1/2013 | Bhatt |
| 2013/0021358 A1 | 1/2013 | Nordlund et al. |
| 2013/0021377 A1 | 1/2013 | Doll |
| 2013/0021447 A1 | 1/2013 | Brisedoux et al. |
| 2013/0026349 A1 | 1/2013 | Kinugasa |
| 2013/0027580 A1 | 1/2013 | Olsen et al. |
| 2013/0038634 A1 | 2/2013 | Yamada et al. |
| 2013/0044237 A1 | 2/2013 | Ikizyan et al. |
| 2013/0050460 A1 | 2/2013 | Steinberg et al. |
| 2013/0050520 A1 | 2/2013 | Takeuchi |
| 2013/0050551 A1 | 2/2013 | Ichikawa |
| 2013/0057713 A1 | 3/2013 | Khawand |
| 2013/0058436 A1 | 3/2013 | Kim et al. |
| 2013/0063571 A1 | 3/2013 | Ishii |
| 2013/0063633 A1 | 3/2013 | Hayashi et al. |
| 2013/0067093 A1 | 3/2013 | Moreno et al. |
| 2013/0069988 A1 | 3/2013 | Kamei et al. |
| 2013/0069989 A1 | 3/2013 | Nagata et al. |
| 2013/0070111 A1 | 3/2013 | Ohtsuka |
| 2013/0070145 A1 | 3/2013 | Matsuyama |
| 2013/0101219 A1 | 4/2013 | Bosworth et al. |
| 2013/0101220 A1 | 4/2013 | Bosworth et al. |
| 2013/0107062 A1 | 5/2013 | Okazaki |
| 2013/0108123 A1 | 5/2013 | Hwang et al. |
| 2013/0111337 A1 | 5/2013 | Deng et al. |

(56) References Cited

U.S. PATENT DOCUMENTS

| | | |
|---|---|---|
| 2013/0111369 A1 | 5/2013 | Pasquero et al. |
| 2013/0114853 A1 | 5/2013 | Sengupta et al. |
| 2013/0114894 A1 | 5/2013 | Yadav et al. |
| 2013/0120011 A1 | 5/2013 | Yamazaki et al. |
| 2013/0120256 A1 | 5/2013 | Ishidera et al. |
| 2013/0120607 A1 | 5/2013 | Manabe |
| 2013/0129142 A1 | 5/2013 | Miranda-Steiner |
| 2013/0129209 A1 | 5/2013 | Reid et al. |
| 2013/0132903 A1 | 5/2013 | Krishnaswamy |
| 2013/0135447 A1 | 5/2013 | Kim |
| 2013/0140435 A1 | 6/2013 | Kikuchi |
| 2013/0141456 A1 | 6/2013 | Sokolov et al. |
| 2013/0141464 A1 | 6/2013 | Hunt et al. |
| 2013/0147979 A1 | 6/2013 | McMahon et al. |
| 2013/0148013 A1 | 6/2013 | Shiohara |
| 2013/0154978 A1 | 6/2013 | Kim et al. |
| 2013/0162542 A1 | 6/2013 | Badali et al. |
| 2013/0162848 A1 | 6/2013 | Miyasako |
| 2013/0162874 A1 | 6/2013 | Hashimoto et al. |
| 2013/0176222 A1 | 7/2013 | Tanaka |
| 2013/0176442 A1 | 7/2013 | Shuster et al. |
| 2013/0176458 A1 | 7/2013 | Van Dalen et al. |
| 2013/0179308 A1 | 7/2013 | Agustin et al. |
| 2013/0179831 A1 | 7/2013 | Izaki |
| 2013/0187934 A1 | 7/2013 | Kim et al. |
| 2013/0188069 A1 | 7/2013 | Sendik et al. |
| 2013/0188886 A1 | 7/2013 | Petrou et al. |
| 2013/0194963 A1 | 8/2013 | Hampel |
| 2013/0196653 A1 | 8/2013 | Morrison |
| 2013/0201217 A1 | 8/2013 | Morinaga et al. |
| 2013/0205244 A1 | 8/2013 | Decker et al. |
| 2013/0215113 A1 | 8/2013 | Corazza et al. |
| 2013/0222231 A1 | 8/2013 | Gardenfors et al. |
| 2013/0222275 A1 | 8/2013 | Byrd et al. |
| 2013/0222516 A1 | 8/2013 | Do et al. |
| 2013/0222646 A1 | 8/2013 | Tsubota et al. |
| 2013/0223530 A1 | 8/2013 | Demos |
| 2013/0227469 A1 | 8/2013 | Park |
| 2013/0228673 A1 | 9/2013 | Hashimoto et al. |
| 2013/0235068 A1 | 9/2013 | Ubillos et al. |
| 2013/0235069 A1 | 9/2013 | Ubillos et al. |
| 2013/0235071 A1 | 9/2013 | Ubillos et al. |
| 2013/0235081 A1 | 9/2013 | Ishibashi |
| 2013/0239057 A1 | 9/2013 | Ubillos et al. |
| 2013/0239154 A1 | 9/2013 | Bagasra |
| 2013/0240710 A1 | 9/2013 | Choi |
| 2013/0241442 A1 | 9/2013 | Trattler |
| 2013/0243271 A1 | 9/2013 | Kawahara et al. |
| 2013/0251202 A1 | 9/2013 | Auberger et al. |
| 2013/0257877 A1 | 10/2013 | Davis |
| 2013/0258040 A1 | 10/2013 | Kaytaz et al. |
| 2013/0258044 A1 | 10/2013 | Betts-Lacroix |
| 2013/0258118 A1 | 10/2013 | Felt |
| 2013/0262258 A1 | 10/2013 | Jennings |
| 2013/0262486 A1 | 10/2013 | O'Dell et al. |
| 2013/0271622 A1 | 10/2013 | Tatsumi |
| 2013/0271631 A1 | 10/2013 | Tatsuzawa et al. |
| 2013/0277534 A1 | 10/2013 | Watanabe |
| 2013/0278482 A1 | 10/2013 | Hsu |
| 2013/0278798 A1 | 10/2013 | Hattori |
| 2013/0278819 A1 | 10/2013 | Liaw |
| 2013/0278979 A1 | 10/2013 | Mikami |
| 2013/0279584 A1 | 10/2013 | Demos |
| 2013/0286876 A1 | 10/2013 | Moratt et al. |
| 2013/0287265 A1 | 10/2013 | Nepomniachtchi et al. |
| 2013/0293502 A1 | 11/2013 | Kitatani |
| 2013/0293744 A1 | 11/2013 | Attar et al. |
| 2013/0294688 A1 | 11/2013 | Auberger et al. |
| 2013/0301729 A1 | 11/2013 | Demos |
| 2013/0301885 A1 | 11/2013 | Mori et al. |
| 2013/0303247 A1 | 11/2013 | Wu et al. |
| 2013/0307999 A1 | 11/2013 | Motta |
| 2013/0314576 A1 | 11/2013 | Suzuki et al. |
| 2013/0321671 A1 | 12/2013 | Cote et al. |
| 2013/0326422 A1 | 12/2013 | Kang et al. |
| 2013/0328864 A1 | 12/2013 | Lee et al. |
| 2013/0328935 A1 | 12/2013 | Tu |
| 2013/0329015 A1 | 12/2013 | Pulli et al. |
| 2013/0335317 A1 | 12/2013 | Liu et al. |
| 2013/0335596 A1 | 12/2013 | Demandolx et al. |
| 2013/0336600 A1 | 12/2013 | Bitouk et al. |
| 2013/0342526 A1 | 12/2013 | Ng et al. |
| 2013/0342739 A1 | 12/2013 | Yanowitz et al. |
| 2013/0342740 A1 | 12/2013 | Govindarao |
| 2014/0001340 A1 | 1/2014 | Takenaka et al. |
| 2014/0002606 A1 | 1/2014 | Blayvas et al. |
| 2014/0002718 A1 | 1/2014 | Spielberg |
| 2014/0009636 A1 | 1/2014 | Lee et al. |
| 2014/0009664 A1 | 1/2014 | Kinugasa |
| 2014/0016001 A1 | 1/2014 | Ichikawa |
| 2014/0028894 A1 | 1/2014 | Lee et al. |
| 2014/0036118 A1 | 2/2014 | Dowaki et al. |
| 2014/0036121 A1 | 2/2014 | Minowa et al. |
| 2014/0043628 A1 | 2/2014 | Kishino et al. |
| 2014/0055494 A1 | 2/2014 | Mikawa |
| 2014/0055638 A1 | 2/2014 | Son et al. |
| 2014/0063287 A1 | 3/2014 | Yamada |
| 2014/0063301 A1 | 3/2014 | Solhusvik |
| 2014/0063611 A1 | 3/2014 | Raymond et al. |
| 2014/0070965 A1 | 3/2014 | Letsu-Dake |
| 2014/0075286 A1 | 3/2014 | Harada |
| 2014/0075372 A1 | 3/2014 | Wu et al. |
| 2014/0078171 A1 | 3/2014 | Miyatake et al. |
| 2014/0079279 A1 | 3/2014 | Pulli et al. |
| 2014/0085339 A1 | 3/2014 | Brady et al. |
| 2014/0085422 A1 | 3/2014 | Aronsson et al. |
| 2014/0085430 A1 | 3/2014 | Komori et al. |
| 2014/0085508 A1 | 3/2014 | Ichikawa |
| 2014/0096064 A1 | 4/2014 | Suzuki |
| 2014/0098118 A1 | 4/2014 | Liu et al. |
| 2014/0098248 A1 | 4/2014 | Okazaki |
| 2014/0098259 A1 | 4/2014 | Song et al. |
| 2014/0111548 A1 | 4/2014 | Shin |
| 2014/0111657 A1 | 4/2014 | Weatherford et al. |
| 2014/0112299 A1 | 4/2014 | Frank et al. |
| 2014/0118256 A1 | 5/2014 | Sonoda et al. |
| 2014/0118579 A1 | 5/2014 | Kim et al. |
| 2014/0119290 A1 | 5/2014 | Grewal et al. |
| 2014/0125856 A1 | 5/2014 | Kim et al. |
| 2014/0129966 A1 | 5/2014 | Kolesnikov et al. |
| 2014/0132735 A1 | 5/2014 | Lee et al. |
| 2014/0140630 A1 | 5/2014 | Hwang et al. |
| 2014/0146210 A1 | 5/2014 | Lee et al. |
| 2014/0153900 A1 | 6/2014 | Tanaka |
| 2014/0160333 A1 | 6/2014 | Takeda |
| 2014/0161351 A1 | 6/2014 | Yagnik |
| 2014/0168271 A1 | 6/2014 | Yu et al. |
| 2014/0168468 A1 | 6/2014 | Levoy et al. |
| 2014/0176458 A1 | 6/2014 | Matsuda |
| 2014/0176750 A1 | 6/2014 | Pajak et al. |
| 2014/0176757 A1 | 6/2014 | Rivard et al. |
| 2014/0176759 A1 | 6/2014 | Goto |
| 2014/0176774 A1 | 6/2014 | Morimoto |
| 2014/0177008 A1 | 6/2014 | Raymond et al. |
| 2014/0181089 A1 | 6/2014 | Desmond et al. |
| 2014/0184865 A1 | 7/2014 | Muto et al. |
| 2014/0184894 A1 | 7/2014 | Motta |
| 2014/0186050 A1 | 7/2014 | Oshima et al. |
| 2014/0189181 A1 | 7/2014 | Cheng et al. |
| 2014/0192216 A1 | 7/2014 | Matsumoto |
| 2014/0192267 A1 | 7/2014 | Biswas et al. |
| 2014/0193088 A1 | 7/2014 | Capata et al. |
| 2014/0197302 A1 | 7/2014 | Araoka et al. |
| 2014/0198242 A1 | 7/2014 | Weng et al. |
| 2014/0204084 A1 | 7/2014 | Corazza et al. |
| 2014/0208208 A1 | 7/2014 | Chevallier et al. |
| 2014/0210754 A1 | 7/2014 | Ryu et al. |
| 2014/0210847 A1 | 7/2014 | Knibbeler et al. |
| 2014/0211852 A1 | 7/2014 | Demos |
| 2014/0215365 A1 | 7/2014 | Hiraga et al. |
| 2014/0219517 A1 | 8/2014 | Mishra et al. |
| 2014/0219526 A1 | 8/2014 | Linguraru et al. |
| 2014/0232449 A1 | 8/2014 | Shin |
| 2014/0240453 A1 | 8/2014 | Kim et al. |

(56) References Cited

U.S. PATENT DOCUMENTS

| | | |
|---|---|---|
| 2014/0240543 A1 | 8/2014 | Kim et al. |
| 2014/0244858 A1 | 8/2014 | Okazaki |
| 2014/0247342 A1 | 9/2014 | Ellenby et al. |
| 2014/0247870 A1 | 9/2014 | Mertens |
| 2014/0247979 A1 | 9/2014 | Roffet et al. |
| 2014/0253752 A1 | 9/2014 | Kawano et al. |
| 2014/0258674 A1 | 9/2014 | Kim et al. |
| 2014/0267833 A1 | 9/2014 | Chen et al. |
| 2014/0267869 A1 | 9/2014 | Sawa |
| 2014/0269550 A1 | 9/2014 | Webb |
| 2014/0270543 A1 | 9/2014 | Zhang et al. |
| 2014/0279181 A1 | 9/2014 | Wills |
| 2014/0283113 A1 | 9/2014 | Hanna |
| 2014/0289360 A1 | 9/2014 | Mahkovec et al. |
| 2014/0298323 A1 | 10/2014 | Stolberg et al. |
| 2014/0300795 A1 | 10/2014 | Bilcu et al. |
| 2014/0301642 A1 | 10/2014 | Muninder |
| 2014/0306899 A1 | 10/2014 | Hicks |
| 2014/0307001 A1 | 10/2014 | Aizawa |
| 2014/0307117 A1 | 10/2014 | Feng et al. |
| 2014/0307126 A1 | 10/2014 | Son et al. |
| 2014/0310788 A1 | 10/2014 | Ricci |
| 2014/0317295 A1 | 10/2014 | Martini |
| 2014/0320720 A1 | 10/2014 | Ohshitanai |
| 2014/0337791 A1 | 11/2014 | Agnetta et al. |
| 2014/0340428 A1 | 11/2014 | Shibayama |
| 2014/0351687 A1 | 11/2014 | Hall |
| 2014/0354781 A1 | 12/2014 | Matsuyama |
| 2014/0359517 A1 | 12/2014 | Elings et al. |
| 2014/0359656 A1 | 12/2014 | Banica et al. |
| 2014/0362117 A1 | 12/2014 | Paulson |
| 2014/0364241 A1 | 12/2014 | Oku |
| 2014/0365977 A1 | 12/2014 | Elyada et al. |
| 2014/0372914 A1 | 12/2014 | Byrd et al. |
| 2014/0373123 A1 | 12/2014 | Kang |
| 2014/0375837 A1 | 12/2014 | Ichihara |
| 2014/0375854 A1 | 12/2014 | Mandelli |
| 2015/0005637 A1 | 1/2015 | Stegman et al. |
| 2015/0015740 A1 | 1/2015 | Cho et al. |
| 2015/0015774 A1 | 1/2015 | Sugie |
| 2015/0016693 A1 | 1/2015 | Gattuso |
| 2015/0016735 A1 | 1/2015 | Kikuchi |
| 2015/0025359 A1 | 1/2015 | Fenchel et al. |
| 2015/0026101 A1 | 1/2015 | Lin et al. |
| 2015/0029226 A1 | 1/2015 | Feder et al. |
| 2015/0030242 A1 | 1/2015 | Shen |
| 2015/0030246 A1 | 1/2015 | Wilensky et al. |
| 2015/0035991 A1 | 2/2015 | Sachs et al. |
| 2015/0042669 A1 | 2/2015 | Van Nostrand et al. |
| 2015/0042743 A1 | 2/2015 | Cullen |
| 2015/0049119 A1 | 2/2015 | Homma et al. |
| 2015/0054966 A1 | 2/2015 | Wang |
| 2015/0055835 A1 | 2/2015 | Ozawa |
| 2015/0060646 A1 | 3/2015 | Choi et al. |
| 2015/0062038 A1 | 3/2015 | Taniuchi |
| 2015/0062044 A1 | 3/2015 | Chen et al. |
| 2015/0063694 A1 | 3/2015 | Shroff et al. |
| 2015/0067600 A1 | 3/2015 | Steinberg et al. |
| 2015/0070458 A1 | 3/2015 | Kim et al. |
| 2015/0077326 A1 | 3/2015 | Kramer et al. |
| 2015/0077581 A1 | 3/2015 | Baltz et al. |
| 2015/0077603 A1 | 3/2015 | Matsuzawa et al. |
| 2015/0078661 A1 | 3/2015 | Granados et al. |
| 2015/0084885 A1 | 3/2015 | Kawamoto |
| 2015/0085184 A1 | 3/2015 | Vidal et al. |
| 2015/0091945 A1 | 4/2015 | Uratani et al. |
| 2015/0092019 A1 | 4/2015 | Asano et al. |
| 2015/0092077 A1 | 4/2015 | Feder et al. |
| 2015/0092852 A1 | 4/2015 | Demos |
| 2015/0093044 A1 | 4/2015 | Feder et al. |
| 2015/0095775 A1 | 4/2015 | Lewis et al. |
| 2015/0098014 A1 | 4/2015 | Raskar et al. |
| 2015/0098651 A1 | 4/2015 | Rivard et al. |
| 2015/0103192 A1 | 4/2015 | Venkatraman et al. |
| 2015/0109505 A1 | 4/2015 | Sakuragi |
| 2015/0113368 A1 | 4/2015 | Flider |
| 2015/0113370 A1 | 4/2015 | Flider |
| 2015/0113371 A1 | 4/2015 | Flider |
| 2015/0116365 A1 | 4/2015 | Ding |
| 2015/0116523 A1 | 4/2015 | Sinha et al. |
| 2015/0117786 A1 | 4/2015 | James et al. |
| 2015/0127775 A1 | 5/2015 | Munagala et al. |
| 2015/0130907 A1 | 5/2015 | Kim et al. |
| 2015/0130978 A1 | 5/2015 | Tashiro et al. |
| 2015/0138366 A1 | 5/2015 | Keelan et al. |
| 2015/0142182 A1 | 5/2015 | Kimura et al. |
| 2015/0146079 A1 | 5/2015 | Kim |
| 2015/0146979 A1 | 5/2015 | Paliy et al. |
| 2015/0169166 A1 | 6/2015 | Kim et al. |
| 2015/0169940 A1 | 6/2015 | Kang et al. |
| 2015/0172573 A1 | 6/2015 | Wang et al. |
| 2015/0178977 A1 | 6/2015 | Kontkanen |
| 2015/0189161 A1 | 7/2015 | Chun et al. |
| 2015/0193912 A1 | 7/2015 | Yuasa |
| 2015/0195330 A1 | 7/2015 | Lee |
| 2015/0195469 A1 | 7/2015 | Kim |
| 2015/0199022 A1 | 7/2015 | Gottesman et al. |
| 2015/0205236 A1 | 7/2015 | Saito et al. |
| 2015/0207920 A1 | 7/2015 | Choi et al. |
| 2015/0213784 A1 | 7/2015 | Jafarzadeh et al. |
| 2015/0215526 A1 | 7/2015 | Jafarzadeh et al. |
| 2015/0215532 A1 | 7/2015 | Jafarzadeh et al. |
| 2015/0222809 A1 | 8/2015 | Osuka et al. |
| 2015/0222836 A1 | 8/2015 | Wada et al. |
| 2015/0229819 A1 | 8/2015 | Rivard et al. |
| 2015/0229898 A1 | 8/2015 | Rivard et al. |
| 2015/0235073 A1 | 8/2015 | Hua et al. |
| 2015/0244980 A1 | 8/2015 | Matthews |
| 2015/0249795 A1 | 9/2015 | Cho et al. |
| 2015/0249810 A1 | 9/2015 | Sasaki |
| 2015/0254502 A1 | 9/2015 | Lim et al. |
| 2015/0256752 A1 | 9/2015 | Ninan et al. |
| 2015/0264273 A1 | 9/2015 | Feder et al. |
| 2015/0269423 A1 | 9/2015 | Nakagome et al. |
| 2015/0278853 A1 | 10/2015 | McLaughlin et al. |
| 2015/0278999 A1 | 10/2015 | Summers et al. |
| 2015/0279113 A1 | 10/2015 | Knorr et al. |
| 2015/0281606 A1 | 10/2015 | Livneh et al. |
| 2015/0287189 A1 | 10/2015 | Hirai et al. |
| 2015/0288870 A1 | 10/2015 | Nagaraja et al. |
| 2015/0296145 A1 | 10/2015 | Hwang et al. |
| 2015/0302587 A1 | 10/2015 | Hirano et al. |
| 2015/0304478 A1 | 10/2015 | Kim et al. |
| 2015/0310261 A1 | 10/2015 | Lee et al. |
| 2015/0312397 A1 | 10/2015 | Chiang |
| 2015/0312492 A1 | 10/2015 | Kim |
| 2015/0324983 A1 | 11/2015 | Takasugi et al. |
| 2015/0334318 A1 | 11/2015 | Georgiev et al. |
| 2015/0339002 A1 | 11/2015 | Arnold et al. |
| 2015/0339006 A1 | 11/2015 | Chaland et al. |
| 2015/0341536 A1 | 11/2015 | Huang et al. |
| 2015/0341593 A1 | 11/2015 | Zhang et al. |
| 2015/0350516 A1 | 12/2015 | Rivard et al. |
| 2015/0350562 A1 | 12/2015 | Hubel et al. |
| 2015/0363915 A1 | 12/2015 | Li et al. |
| 2015/0363922 A1 | 12/2015 | Elliott et al. |
| 2015/0370399 A1 | 12/2015 | Kim et al. |
| 2015/0373414 A1 | 12/2015 | Kinoshita |
| 2015/0379690 A1 | 12/2015 | Stepanov et al. |
| 2016/0006949 A1 | 1/2016 | Kim et al. |
| 2016/0006987 A1 | 1/2016 | Li et al. |
| 2016/0014312 A1 | 1/2016 | Nikkanen et al. |
| 2016/0014421 A1 | 1/2016 | Cote et al. |
| 2016/0026658 A1 | 1/2016 | Krishnaraj et al. |
| 2016/0027150 A1 | 1/2016 | Lee et al. |
| 2016/0028948 A1 | 1/2016 | Omori et al. |
| 2016/0028960 A1 | 1/2016 | Ko et al. |
| 2016/0034166 A1 | 2/2016 | Wilson et al. |
| 2016/0034167 A1 | 2/2016 | Wilson et al. |
| 2016/0037101 A1 | 2/2016 | Shim et al. |
| 2016/0044258 A1 | 2/2016 | Kim et al. |
| 2016/0044293 A1 | 2/2016 | Rivard et al. |
| 2016/0050377 A1 | 2/2016 | Hizi et al. |
| 2016/0054851 A1 | 2/2016 | Kim et al. |

(56) References Cited

U.S. PATENT DOCUMENTS

| | | |
|---|---|---|
| 2016/0057348 A1 | 2/2016 | Liang et al. |
| 2016/0062515 A1 | 3/2016 | Bae et al. |
| 2016/0062615 A1 | 3/2016 | Price et al. |
| 2016/0062645 A1 | 3/2016 | Masuko |
| 2016/0065926 A1 | 3/2016 | Nonaka et al. |
| 2016/0070963 A1 | 3/2016 | Chakraborty et al. |
| 2016/0071241 A1 | 3/2016 | Karunamuni et al. |
| 2016/0071289 A1 | 3/2016 | Kobayashi et al. |
| 2016/0086318 A1 | 3/2016 | Hannuksela et al. |
| 2016/0092472 A1 | 3/2016 | Feder et al. |
| 2016/0093273 A1 | 3/2016 | Wang et al. |
| 2016/0110168 A1 | 4/2016 | Feder et al. |
| 2016/0119525 A1 | 4/2016 | Wolf |
| 2016/0132130 A1 | 5/2016 | Lu |
| 2016/0133037 A1 | 5/2016 | Vemulapalli et al. |
| 2016/0139774 A1 | 5/2016 | Rivard et al. |
| 2016/0140702 A1 | 5/2016 | Kindle et al. |
| 2016/0142610 A1 | 5/2016 | Rivard et al. |
| 2016/0143040 A1 | 5/2016 | Rivard et al. |
| 2016/0148551 A1 | 5/2016 | Jian |
| 2016/0148648 A1 | 5/2016 | Dimson et al. |
| 2016/0150147 A1 | 5/2016 | Shioya |
| 2016/0150175 A1 | 5/2016 | Hynecek |
| 2016/0154994 A1 | 6/2016 | Kim et al. |
| 2016/0157587 A1 | 6/2016 | Yamanashi et al. |
| 2016/0163289 A1 | 6/2016 | Masuko |
| 2016/0165135 A1 | 6/2016 | Lee et al. |
| 2016/0170608 A1 | 6/2016 | Zambetti et al. |
| 2016/0173782 A1 | 6/2016 | Dimson et al. |
| 2016/0179387 A1 | 6/2016 | Gaur et al. |
| 2016/0180567 A1 | 6/2016 | Lee |
| 2016/0182874 A1 | 6/2016 | Richards et al. |
| 2016/0191973 A1 | 6/2016 | Joy et al. |
| 2016/0196042 A1 | 7/2016 | Laute et al. |
| 2016/0202866 A1 | 7/2016 | Zambetti et al. |
| 2016/0202872 A1 | 7/2016 | Jang et al. |
| 2016/0210716 A1 | 7/2016 | Ghosh et al. |
| 2016/0219211 A1 | 7/2016 | Katayama |
| 2016/0231883 A1 | 8/2016 | Zambetti et al. |
| 2016/0232419 A1 | 8/2016 | Bai et al. |
| 2016/0240168 A1 | 8/2016 | Keal et al. |
| 2016/0248968 A1 | 8/2016 | Baldwin |
| 2016/0269624 A1 | 9/2016 | Jeong et al. |
| 2016/0274622 A1 | 9/2016 | Braun et al. |
| 2016/0274768 A1 | 9/2016 | Tian et al. |
| 2016/0275650 A1 | 9/2016 | Case et al. |
| 2016/0277656 A1 | 9/2016 | Tsunoda |
| 2016/0284065 A1 | 9/2016 | Cohen |
| 2016/0292905 A1 | 10/2016 | Nehmadi et al. |
| 2016/0313781 A1 | 10/2016 | Jeon et al. |
| 2016/0315830 A1 | 10/2016 | Cote et al. |
| 2016/0316154 A1 | 10/2016 | Elmfors et al. |
| 2016/0316156 A1 | 10/2016 | Ohshitanai |
| 2016/0323518 A1 | 11/2016 | Rivard et al. |
| 2016/0330383 A1 | 11/2016 | Oyama |
| 2016/0342863 A1 | 11/2016 | Kwon et al. |
| 2016/0344927 A1 | 11/2016 | Brasket et al. |
| 2016/0350587 A1 | 12/2016 | Bataller et al. |
| 2016/0352996 A1 | 12/2016 | Qian et al. |
| 2016/0353017 A1 | 12/2016 | Kim et al. |
| 2016/0357420 A1 | 12/2016 | Wilson et al. |
| 2016/0366331 A1 | 12/2016 | Barron et al. |
| 2016/0371824 A1 | 12/2016 | Feder et al. |
| 2016/0373362 A1 | 12/2016 | Cheng et al. |
| 2016/0373653 A1 | 12/2016 | Park et al. |
| 2016/0381304 A9 | 12/2016 | Feder et al. |
| 2016/0381348 A1 | 12/2016 | Hayasaka et al. |
| 2017/0006322 A1 | 1/2017 | Dury et al. |
| 2017/0011745 A1 | 1/2017 | Navaratnam |
| 2017/0019617 A1 | 1/2017 | Dowaki et al. |
| 2017/0026562 A1 | 1/2017 | Rivard et al. |
| 2017/0032181 A1 | 2/2017 | Hu |
| 2017/0034403 A1 | 2/2017 | Seo et al. |
| 2017/0039750 A1 | 2/2017 | Tong et al. |
| 2017/0048442 A1 | 2/2017 | Cote et al. |
| 2017/0048449 A1 | 2/2017 | Chen et al. |
| 2017/0052604 A1 | 2/2017 | Hunt et al. |
| 2017/0054966 A1 | 2/2017 | Zhou et al. |
| 2017/0055101 A1 | 2/2017 | Studerus et al. |
| 2017/0061234 A1 | 3/2017 | Lim et al. |
| 2017/0061236 A1 | 3/2017 | Pope |
| 2017/0061567 A1 | 3/2017 | Lim et al. |
| 2017/0061669 A1 | 3/2017 | Hirano et al. |
| 2017/0064192 A1 | 3/2017 | Mori |
| 2017/0064204 A1 | 3/2017 | Sapiro et al. |
| 2017/0064227 A1 | 3/2017 | Lin et al. |
| 2017/0064276 A1 | 3/2017 | Rivard et al. |
| 2017/0068846 A1 | 3/2017 | Linguraru et al. |
| 2017/0070690 A1 | 3/2017 | Feder et al. |
| 2017/0076430 A1 | 3/2017 | Xu |
| 2017/0085785 A1 | 3/2017 | Corcoran et al. |
| 2017/0109807 A1 | 4/2017 | Krishnan et al. |
| 2017/0109931 A1 | 4/2017 | Knorr et al. |
| 2017/0115749 A1 | 4/2017 | Li |
| 2017/0118394 A1 | 4/2017 | Van Hoeckel et al. |
| 2017/0134634 A1 | 5/2017 | Jin et al. |
| 2017/0140214 A1 | 5/2017 | Matas et al. |
| 2017/0150080 A1 | 5/2017 | Nishizawa |
| 2017/0150118 A1 | 5/2017 | Pacheco et al. |
| 2017/0154211 A1 | 6/2017 | Shaburov et al. |
| 2017/0154457 A1 | 6/2017 | Theobald et al. |
| 2017/0169303 A1 | 6/2017 | Connell, II et al. |
| 2017/0187938 A1 | 6/2017 | Ichihara |
| 2017/0187953 A1 | 6/2017 | Graham et al. |
| 2017/0201677 A1 | 7/2017 | Otani |
| 2017/0201692 A1 | 7/2017 | Wu |
| 2017/0208292 A1 | 7/2017 | Smits |
| 2017/0213076 A1 | 7/2017 | Francisco et al. |
| 2017/0228583 A1 | 8/2017 | Lee et al. |
| 2017/0236253 A1 | 8/2017 | Restrepo et al. |
| 2017/0237786 A1 | 8/2017 | Crowe et al. |
| 2017/0237925 A1 | 8/2017 | Uchida et al. |
| 2017/0256086 A1 | 9/2017 | Park et al. |
| 2017/0262695 A1 | 9/2017 | Ahmed |
| 2017/0274768 A1 | 9/2017 | Hök et al. |
| 2017/0277941 A1 | 9/2017 | Smith |
| 2017/0278292 A1 | 9/2017 | Feder et al. |
| 2017/0280069 A1 | 9/2017 | Smith |
| 2017/0285743 A1 | 10/2017 | Yu et al. |
| 2017/0286752 A1 | 10/2017 | Gusarov et al. |
| 2017/0300778 A1 | 10/2017 | Sato |
| 2017/0302903 A1 | 10/2017 | Ng et al. |
| 2017/0323149 A1 | 11/2017 | Harary et al. |
| 2017/0337440 A1 | 11/2017 | Green et al. |
| 2017/0337657 A1 | 11/2017 | Cornell |
| 2017/0343887 A1 | 11/2017 | Hoshino |
| 2017/0364752 A1 | 12/2017 | Zhou et al. |
| 2017/0372108 A1 | 12/2017 | Corcoran et al. |
| 2017/0374336 A1 | 12/2017 | Rivard et al. |
| 2018/0005420 A1 | 1/2018 | Bondich et al. |
| 2018/0007240 A1 | 1/2018 | Rivard et al. |
| 2018/0020156 A1 | 1/2018 | Zobel |
| 2018/0024661 A1 | 1/2018 | Lin et al. |
| 2018/0025218 A1 | 1/2018 | Steinberg et al. |
| 2018/0025244 A1 | 1/2018 | Bohl et al. |
| 2018/0061126 A1 | 3/2018 | Huang et al. |
| 2018/0063019 A1 | 3/2018 | Martin |
| 2018/0063409 A1 | 3/2018 | Rivard et al. |
| 2018/0063411 A1 | 3/2018 | Rivard et al. |
| 2018/0067633 A1 | 3/2018 | Wilson et al. |
| 2018/0070069 A1 | 3/2018 | Rivard et al. |
| 2018/0074495 A1 | 3/2018 | Myers et al. |
| 2018/0075637 A1 | 3/2018 | Henry et al. |
| 2018/0077367 A1 | 3/2018 | Feder et al. |
| 2018/0088775 A1 | 3/2018 | Ye et al. |
| 2018/0109771 A1 | 4/2018 | Rivard et al. |
| 2018/0114025 A1 | 4/2018 | Cui et al. |
| 2018/0114351 A1 | 4/2018 | Rivard et al. |
| 2018/0114352 A1 | 4/2018 | Rivard et al. |
| 2018/0115702 A1 | 4/2018 | Brauer et al. |
| 2018/0121716 A1 | 5/2018 | Sun et al. |
| 2018/0130182 A1 | 5/2018 | Bhatt et al. |
| 2018/0131855 A1 | 5/2018 | Rivard et al. |
| 2018/0137375 A1 | 5/2018 | Takemura et al. |

(56) References Cited

U.S. PATENT DOCUMENTS

| | | |
|---|---|---|
| 2018/0137678 A1 | 5/2018 | Kaehler |
| 2018/0160092 A1 | 6/2018 | Rivard et al. |
| 2018/0165862 A1 | 6/2018 | Sawaki |
| 2018/0183986 A1 | 6/2018 | Smith et al. |
| 2018/0183989 A1 | 6/2018 | Rivard et al. |
| 2018/0197281 A1 | 7/2018 | Feder et al. |
| 2018/0204052 A1 | 7/2018 | Li et al. |
| 2018/0211101 A1 | 7/2018 | Ahmed |
| 2018/0253881 A1 | 9/2018 | Edwards et al. |
| 2018/0262934 A1 | 9/2018 | Rivard et al. |
| 2018/0288311 A1 | 10/2018 | Baghert et al. |
| 2018/0295292 A1 | 10/2018 | Lee et al. |
| 2018/0341383 A1 | 11/2018 | Sully |
| 2018/0342091 A1 | 11/2018 | Seibert et al. |
| 2018/0352241 A1 | 12/2018 | Gatt et al. |
| 2018/0367774 A1 | 12/2018 | Barron et al. |
| 2019/0005632 A1 | 1/2019 | Huang |
| 2019/0012525 A1 | 1/2019 | Wang et al. |
| 2019/0026010 A1 | 1/2019 | Rivard et al. |
| 2019/0031145 A1 | 1/2019 | Trelin |
| 2019/0035047 A1 | 1/2019 | Lim et al. |
| 2019/0035135 A1 | 1/2019 | Feder et al. |
| 2019/0037192 A1 | 1/2019 | Rivard et al. |
| 2019/0039570 A1 | 2/2019 | Foster et al. |
| 2019/0042833 A1 | 2/2019 | Gernoth et al. |
| 2019/0043176 A1 | 2/2019 | Li et al. |
| 2019/0045165 A1 | 2/2019 | Rivard et al. |
| 2019/0057554 A1 | 2/2019 | Knorr et al. |
| 2019/0080119 A1 | 3/2019 | Wang et al. |
| 2019/0102279 A1 | 4/2019 | Awan et al. |
| 2019/0108387 A1 | 4/2019 | Rivard et al. |
| 2019/0108388 A1 | 4/2019 | Rivard et al. |
| 2019/0109974 A1 | 4/2019 | Rivard et al. |
| 2019/0116306 A1 | 4/2019 | Rivard et al. |
| 2019/0122378 A1 | 4/2019 | Aswin |
| 2019/0124280 A1 | 4/2019 | Feder et al. |
| 2019/0149706 A1 | 5/2019 | Rivard et al. |
| 2019/0174028 A1 | 6/2019 | Rivard et al. |
| 2019/0179594 A1 | 6/2019 | Alameh et al. |
| 2019/0188857 A1 | 6/2019 | Rivard et al. |
| 2019/0197297 A1 | 6/2019 | Rivard et al. |
| 2019/0197330 A1 | 6/2019 | Mahmoud et al. |
| 2019/0208172 A1 | 7/2019 | Rivard et al. |
| 2019/0215440 A1 | 7/2019 | Rivard et al. |
| 2019/0222769 A1 | 7/2019 | Srivastava et al. |
| 2019/0222807 A1 | 7/2019 | Rivard et al. |
| 2019/0244010 A1 | 8/2019 | Kim et al. |
| 2019/0251682 A1 | 8/2019 | Feder et al. |
| 2019/0263415 A1 | 8/2019 | Gong |
| 2019/0285881 A1 | 9/2019 | Ilic et al. |
| 2019/0335151 A1 | 10/2019 | Rivard et al. |
| 2019/0342534 A1 | 11/2019 | Rivard et al. |
| 2019/0347843 A1 | 11/2019 | Rivard et al. |
| 2019/0349510 A1 | 11/2019 | Rivard et al. |
| 2019/0379863 A1 | 12/2019 | Rivard et al. |
| 2019/0385311 A1 | 12/2019 | Rivard et al. |
| 2020/0029008 A1 | 1/2020 | Rivard et al. |
| 2020/0057654 A1 | 2/2020 | Yang |
| 2020/0059575 A1 | 2/2020 | Rivard et al. |
| 2020/0059582 A1 | 2/2020 | Rivard et al. |
| 2020/0059806 A1 | 2/2020 | Rivard et al. |
| 2020/0067715 A1 | 2/2020 | Yi et al. |
| 2020/0077013 A1 | 3/2020 | Rivard et al. |
| 2020/0084398 A1 | 3/2020 | Feder et al. |
| 2020/0092596 A1 | 3/2020 | Moore, Jr. et al. |
| 2020/0106956 A1 | 4/2020 | Kimball et al. |
| 2020/0118315 A1 | 4/2020 | Ranzinger |
| 2020/0126283 A1 | 4/2020 | van Vuuren et al. |
| 2020/0154089 A1 | 5/2020 | Rivard et al. |
| 2020/0193144 A1 | 6/2020 | Rivard et al. |
| 2020/0242774 A1 | 7/2020 | Park et al. |
| 2020/0249763 A1 | 8/2020 | Moritani |
| 2020/0259991 A1 | 8/2020 | Rivard et al. |
| 2020/0267299 A1 | 8/2020 | Le et al. |
| 2020/0351432 A1 | 11/2020 | Rivard et al. |
| 2021/0001810 A1 | 1/2021 | Rivard et al. |
| 2021/0037178 A1 | 2/2021 | Rivard et al. |
| 2021/0049984 A1 | 2/2021 | Cain |
| 2021/0074051 A1 | 3/2021 | Feder et al. |
| 2021/0110554 A1 | 4/2021 | Rivard et al. |
| 2021/0152779 A1 | 5/2021 | Rivard et al. |
| 2021/0274142 A1 | 9/2021 | Rivard et al. |
| 2021/0314507 A1 | 10/2021 | Feder et al. |
| 2021/0319613 A1 | 10/2021 | Rivard et al. |
| 2021/0337104 A1 | 10/2021 | Rivard et al. |
| 2021/0360141 A1 | 11/2021 | Rivard et al. |
| 2021/0382969 A1 | 12/2021 | Park |
| 2022/0107550 A1 | 4/2022 | Yeh et al. |
| 2022/0210313 A1 | 6/2022 | Rivard et al. |
| 2022/0210386 A1 | 6/2022 | Rivard et al. |
| 2022/0215504 A1 | 7/2022 | Moens |
| 2022/0224820 A1 | 7/2022 | Liu et al. |
| 2022/0239866 A1 | 7/2022 | Rivard et al. |
| 2022/0272553 A1 | 8/2022 | Rivard et al. |
| 2022/0291758 A1 | 9/2022 | Wang et al. |
| 2022/0343476 A1 | 10/2022 | Feder et al. |
| 2022/0343509 A1 | 10/2022 | Rivard et al. |
| 2022/0343678 A1 | 10/2022 | Rivard et al. |
| 2022/0345613 A1 | 10/2022 | Rivard et al. |
| 2022/0353712 A1 | 11/2022 | Rivard et al. |
| 2022/0368793 A1 | 11/2022 | Xu et al. |
| 2023/0005294 A1 | 1/2023 | Rivard et al. |
| 2023/0008242 A1 | 1/2023 | Rivard et al. |
| 2023/0047124 A1 | 2/2023 | Rivard et al. |
| 2023/0050695 A1 | 2/2023 | Rivard et al. |
| 2023/0052018 A1 | 2/2023 | Rivard et al. |
| 2023/0060489 A1 | 3/2023 | Rivard et al. |
| 2023/0061404 A1 | 3/2023 | Feder et al. |
| 2023/0079783 A1 | 3/2023 | Rivard et al. |
| 2023/0081630 A1 | 3/2023 | Rivard et al. |
| 2023/0093132 A1 | 3/2023 | Rivard et al. |
| 2023/0154097 A1 | 5/2023 | Feder et al. |
| 2023/0156344 A1 | 5/2023 | Rivard et al. |
| 2023/0156350 A1 | 5/2023 | Feder et al. |
| 2023/0188676 A1 | 6/2023 | Rivard et al. |
| 2023/0325080 A1 | 10/2023 | Huo et al. |
| 2023/0351608 A1 | 11/2023 | Rivard et al. |
| 2024/0064419 A1 | 2/2024 | Rivard et al. |
| 2024/0073543 A1 | 2/2024 | Rivard et al. |
| 2025/0030945 A1 | 1/2025 | Rivard et al. |
| 2025/0053287 A1 | 2/2025 | Rivard et al. |
| 2025/0056130 A1 | 2/2025 | Rivard et al. |
| 2025/0056131 A1 | 2/2025 | Rivard et al. |
| 2025/0063246 A1 | 2/2025 | Rivard et al. |
| 2025/0071430 A1 | 2/2025 | Rivard et al. |
| 2025/0086765 A1 | 3/2025 | Feder et al. |

FOREIGN PATENT DOCUMENTS

| | | |
|---|---|---|
| CN | 101547306 A | 9/2009 |
| CN | 102053453 A | 5/2011 |
| CN | 102165783 A | 8/2011 |
| CN | 102521814 A | 6/2012 |
| CN | 102608036 A | 7/2012 |
| CN | 103152519 A | 6/2013 |
| CN | 103581556 A | 2/2014 |
| CN | 103813098 A | 5/2014 |
| CN | 104040292 A | 9/2014 |
| CN | 204316606 U | 5/2015 |
| CN | 105026955 A | 11/2015 |
| DE | 102011107844 A1 | 1/2013 |
| EP | 1549080 A1 | 6/2005 |
| EP | 2169946 A2 | 3/2010 |
| EP | 2346079 A1 | 7/2011 |
| EP | 2565843 A2 | 3/2013 |
| EP | 2731326 A2 | 5/2014 |
| EP | 2879375 A1 | 6/2015 |
| EP | 3105713 A1 | 12/2016 |
| GB | 2486878 A | 7/2012 |
| GB | 2487943 A | 8/2012 |
| JP | H09-200617 A | 7/1997 |

(56) References Cited

FOREIGN PATENT DOCUMENTS

| | | | |
|---|---|---|---|
| JP | 2000278532 A | 10/2000 |
| JP | 2000308068 A | 11/2000 |
| JP | 2001245213 A | 9/2001 |
| JP | 2002112008 A | 4/2002 |
| JP | 2003101886 A | 4/2003 |
| JP | 2003299067 A | 10/2003 |
| JP | 2004247983 A | 9/2004 |
| JP | 2004248061 A | 9/2004 |
| JP | 2004326119 A | 11/2004 |
| JP | 2004328532 A | 11/2004 |
| JP | 2006080752 A | 3/2006 |
| JP | 2006121612 A | 5/2006 |
| JP | 2006311311 A | 11/2006 |
| JP | 2007035028 A | 2/2007 |
| JP | 2007228099 A | 9/2007 |
| JP | 2008162498 A | 7/2008 |
| JP | 2008177738 A | 7/2008 |
| JP | 2008187615 A | 8/2008 |
| JP | 2008236726 A | 10/2008 |
| JP | 2009267923 A | 11/2009 |
| JP | 2009303010 A | 12/2009 |
| JP | 2010016416 A | 1/2010 |
| JP | 2010512049 A | 4/2010 |
| JP | 2010136224 A | 6/2010 |
| JP | 2010157925 A | 7/2010 |
| JP | 2010166281 A | 7/2010 |
| JP | 2010239317 A | 10/2010 |
| JP | 4649623 B2 | 3/2011 |
| JP | 2011097141 A | 5/2011 |
| JP | 2011101180 A | 5/2011 |
| JP | 2011120087 A | 6/2011 |
| JP | 2011120094 A | 6/2011 |
| JP | 2011146957 A | 7/2011 |
| JP | 2012080196 A | 4/2012 |
| JP | 2012119840 A | 6/2012 |
| JP | 2012156885 A | 8/2012 |
| JP | 2012195660 A | 10/2012 |
| JP | 2012213137 A | 11/2012 |
| JP | 2013026734 A | 2/2013 |
| JP | 2013055610 A | 3/2013 |
| JP | 2013066142 A | 4/2013 |
| JP | 2013093875 A | 5/2013 |
| JP | 2013120254 A | 6/2013 |
| JP | 2013207327 A | 10/2013 |
| JP | 2013219708 A | 10/2013 |
| JP | 2013258444 A | 12/2013 |
| JP | 2013258510 A | 12/2013 |
| JP | 2014057256 A | 3/2014 |
| JP | 2014140246 A | 7/2014 |
| JP | 2014140247 A | 7/2014 |
| JP | 2014142836 A | 8/2014 |
| JP | 2014155033 A | 8/2014 |
| JP | 2016019196 A | 2/2016 |
| JP | 2016066015 A | 4/2016 |
| JP | 6333095 B2 | 5/2018 |
| KR | 20100094200 | 8/2010 |
| KR | 20150130186 A | 11/2015 |
| KR | 20160127606 A | 11/2016 |
| TW | 201630406 A | 8/2016 |
| WO | 9746001 A1 | 12/1997 |
| WO | 0237830 A2 | 5/2002 |
| WO | 2004064391 A1 | 7/2004 |
| WO | 2008010559 A1 | 1/2008 |
| WO | 2009074938 A2 | 6/2009 |
| WO | 2009074938 A3 | 8/2009 |
| WO | 2013184256 A1 | 12/2013 |
| WO | 2014094199 A1 | 6/2014 |
| WO | 2014172059 A2 | 10/2014 |
| WO | 2015120873 A1 | 8/2015 |
| WO | 2015123455 A1 | 8/2015 |
| WO | 2015173565 A1 | 11/2015 |
| WO | 2016073643 A1 | 5/2016 |
| WO | 2018044314 A1 | 3/2018 |
| WO | 2021003261 A1 | 1/2021 |

OTHER PUBLICATIONS

Feder et al., U.S. Appl. No. 17/865,299, filed Jul. 14, 2022.
Non-Final Office Action from U.S. Appl. No. 17/865,299, dated Feb. 22, 2024.
Final Office Action from U.S. Appl. No. 17/865,299, dated Sep. 12, 2024.
Rivard et al., U.S. Appl. No. 13/999,343, filed Feb. 11, 2014.
Notice of Allowance for U.S. Appl. No. 13/999,343, dated Jul. 17, 2015.
Rivard et al., U.S. Appl. No. 14/887,211, filed Oct. 19, 2015.
Non-Final Office Action from U.S. Appl. No. 14/887,211, dated Feb. 18, 2016.
Final Office Action from U.S. Appl. No. 14/887,211, dated Sep. 23, 2016.
Non-Final Office Action from U.S. Appl. No. 14/887,211, dated Jan. 17, 2017.
Notice of Allowance from U.S. Appl. No. 14/887,211, dated May 1, 2017.
Notice of Allowance from U.S. Appl. No. 14/887,211, dated Sep. 13, 2017.
Rivard et al., U.S. Appl. No. 15/808,753, filed Nov. 9, 2017.
Non-Final Office Action from U.S. Appl. No. 15/808,753, dated Feb. 23, 2018.
Notice of Allowance from U.S. Appl. No. 15/808,753, dated Jul. 10, 2018.
Rivard et al., U.S. Appl. No. 16/147,149, filed Sep. 28, 2018.
Notice of Allowance from U.S. Appl. No. 16/147,149, dated Jan. 14, 2019.
Rivard et al., U.S. Appl. No. 16/296,038, filed Mar. 7, 2019.
Notice of Allowance from U.S. Appl. No. 16/296,038, dated Apr. 12, 2019.
Rivard et al., U.S. Appl. No. 16/518,811, filed Jul. 22, 2019.
Notice of Allowance from U.S. Appl. No. 16/518,811, dated Sep. 25, 2019.
Rivard et al., U.S. Appl. No. 16/744,735, filed Jan. 16, 2020.
Notice of Allowance from U.S. Appl. No. 16/744,735, dated Aug. 18, 2021.
Rivard et al., U.S. Appl. No. 17/518,436, filed Nov. 3, 2021.
Non-Final Office Action from U.S. Appl. No. 17/518,436, dated Jul. 11, 2022.
Notice of Allowance from U.S. Appl. No. 17/518,436, dated Mar. 28, 2023.
Rivard et al., U.S. Appl. No. 18/213,198, filed Jun. 22, 2023.
Non-Final Office Action from U.S. Appl. No. 18/213,198, dated Feb. 1, 2024.
Feder et al., U.S. Appl. No. 13/999,678, filed Mar. 14, 2014.
Non-Final Office Action from U.S. Appl. No. 13/999,678, dated Aug. 12, 2015.
Final Office Action from U.S. Appl. No. 13/999,678, dated Mar. 28, 2016.
Non-Final Office Action from U.S. Appl. No. 13/999,678, dated Dec. 20, 2016.
Notice of Allowance from U.S. Appl. No. 13/999,678, dated Jun. 29, 2017.
Feder et al., U.S. Appl. No. 15/354,935, filed Nov. 17, 2016.
Non-Final Office Action from U.S. Appl. No. 15/354,935, dated Feb. 8, 2017.
Notice of Allowance from U.S. Appl. No. 15/354,935, dated Aug. 23, 2017.
Supplemental Notice of Allowance from U.S. Appl. No. 15/354,935, dated Dec. 1, 2017.
Feder et al., U.S. Appl. No. 15/814,238, filed Nov. 15, 2017.
Non-Final Office Action from U.S. Appl. No. 15/814,238, dated Feb. 8, 2018.
Notice of Allowance for U.S. Appl. No. 15/814,238 dated Oct. 4, 2018.
Corrected Notice of Allowance for U.S. Appl. No. 15/814,238 dated Nov. 13, 2018.
Feder et al., U.S. Appl. No. 16/217,848, filed Dec. 12, 2018.
Notice of Allowance from U.S. Appl. No. 16/217,848, dated Jul. 31, 2019.

(56) References Cited

OTHER PUBLICATIONS

Corrected Notice of Allowance from U.S. Appl. No. 16/217,848, dated Sep. 24, 2019.
Corrected Notice of Allowance from U.S. Appl. No. 16/217,848, dated Oct. 31, 2019.
Feder et al., U.S. Appl. No. 16/684,389, filed Nov. 14, 2019.
Notice of Allowance from U.S. Appl. No. 16/684,389, dated Oct. 29, 2020.
Corrected Notice of Allowance from U.S. Appl. No. 16/684,389, dated Nov. 27, 2020.
Corrected Notice of Allowance from U.S. Appl. No. 16/684,389, dated Dec. 23, 2020.
Feder et al., U.S. Appl. No. 17/171,800, filed Feb. 9, 2021.
Kadir et al., "Non-parametric Estimation of Probability Distributions from Sampled Signals," Robotics Research Laboratory, Department of Engineering Science, University of Oxford, Jul. 4, 2005, pp. 1-22.
International Preliminary Examination Report from PCT Application No. PCT/US2018/066293, dated Jul. 2, 2020.
Sherrier et al., "Regionally Adaptive Histogram Equalization of the Chest," IEEE Transactions on Medical Imaging, vol. MI-6, No. 1, Mar. 1987, pp. 1-7.
International Search Report and Written Opinion from PCT Application No. PCT/US 19/13847, dated Apr. 12, 2019.
International Preliminary Examination Report from PCT Application No. PCT/US2019/13847, dated Jul. 30, 2020.
Office Action from Indian Patent Application No. 202027034317, dated Apr. 21, 2022.
Non-Final Office Action from U.S. Appl. No. 16/507,862, dated May 20, 2020.
Final Office Action from U.S. Appl. No. 16/507,862, dated Oct. 13, 2020.
Advisory Action from U.S. Appl. No. 16/507,862, dated Dec. 21, 2020.
Non-Final Office Action from U.S. Appl. No. 16/507,862, dated Feb. 5, 2021.
Notice of Allowance from U.S. Appl. No. 16/507,862, dated May 19, 2021.
Extended European Search Report from European Application No. 20835135.3, dated Jun. 14, 2023.
Canon, "Canon EOS 7D Mark II," Canon User Manual, 2014, 548 pages.
Canon, "Canon EOS 1200D," Canon User Manual, 2014, 342 pages.
Canon, "Canon PowerShot G1 X Mark II," Canon User Manual, 2014, 240 pages.
Canon, "Canon Powershot G7 X," Canon User Manual, 2014, 202 pages.
Canon, "Canon PowerShot S200," Canon User Manual, 2013, 183 pages.
Canon, "Canon PowerShot SX60 HS," Canon User Manual, 2014, 203 pages.
Canon, "Canon PowerShot SX520 HS," Canon User Manual, 2014, 139 pages.
Micron, "1/3.2-Inch 2-Megapixel SOC Digital Image Sensor Features," Micron Technology, MT9D111, 2012, 186 pages.
Google, "Google Search timeline Page," Google, 2018, 1 page.
Examination Report from Indian Application No. 202227003071, dated Jul. 1, 2022.
Examination Report from Canadian Application No. 3,144,478, dated Jan. 28, 2023.
Notice of Reasons for Refusal from Japanese Application No. 2021-576343, dated Jan. 31, 2023.
Ingle et al., "Samsung Proposes SEFET Sensor, Pixart Flips Color Filter and Microlens," Image Sensors World, Dec. 30, 2010, 7 pages.
Examination Report from Indian Application No. 202027030380, dated May 30, 2022.
Rivard et al., U.S. Appl. No. 17/696,717, filed Mar. 16, 2022.
Notice of Allowance from U.S. Appl. No. 17/696,717, dated Dec. 5, 2022.
Rivard et al., U.S. Appl. No. 18/121,579, filed Mar. 14, 2023.
Rivard et al., U.S. Appl. No. 18/646,581, filed Apr. 25, 2024.
Rivard et al., U.S. Appl. No. 18/930,881, filed Oct. 29, 2024.
Non-Final Office Action for U.S. Appl. No. 18/930,881, dated Dec. 23, 2024.
Notice of Allowance from U.S. Appl. No. 18/930,881, dated Feb. 4, 2025.
Rivard et al., U.S. Appl. No. 19/025,744, filed Jan. 16, 2025.
Rivard et al., U.S. Appl. No. 18/930,887, filed Oct. 29, 2024.
Notice of Allowance from U.S. Appl. No. 18/930,887, dated Dec. 20, 2024.
Rivard et al., U.S. Appl. No. 19/025,772, filed Jan. 16, 2025.
Rivard et al., U.S. Appl. No. 19/025,969, filed Jan. 16, 2025.
Rivard et al., U.S. Appl. No. 18/932,436, filed Oct. 30, 2024.
Non-Final Office Action for U.S. Appl. No. 18/932,436, dated Dec. 27, 2024.
Rivard et al., U.S. Appl. No. 19/025,856, filed Jan. 16, 2025.
Rivard et al., U.S. Appl. No. 18/930,891, filed Oct. 29, 2024.
Non-Final Office Action from U.S. Appl. No. 18/930,891, filed Jan. 30, 2025.
Rivard et al., U.S. Appl. No. 19/025,870, filed Jan. 16, 2025.
Feder et al., U.S. Appl. No. 18/957,506, filed Nov. 22, 2024.
Non-Final Office Action from U.S. Appl. No. 18/957,506, dated Jan. 17, 2025.
Feder et al., U.S. Appl. No. 19/025,885, filed Jan. 16, 2025.
Rivard et al., U.S. Appl. No. 16/244,982, filed Jan. 10, 2019.
Non-Final Office Action from U.S. Appl. No. 16/244,982, dated Apr. 1, 2020.
Final Office Action from U.S. Appl. No. 16/244,982, dated Nov. 27, 2020.
Corrected Notice of Allowance from U.S. Appl. No. 16/505,278, dated Oct. 22, 2020.
Corrected Notice of Allowance from U.S. Appl. No. 16/505,278, dated Nov. 18, 2020.
Corrected Notice of Allowance from U.S. Appl. No. 16/505,278, dated Dec. 24, 2020.
Rivard et al., U.S. Appl. No. 17/144,915, filed Jan. 8, 2021.
Non-Final Office Action for U.S. Appl. No. 17/144,915, dated Aug. 13, 2021.
Notice of Allowance from U.S. Appl. No. 17/144,915, dated Feb. 10, 2022.
Rivard et al., U.S. Appl. No. 17/749,919, filed May 20, 2022.
Non-Final Office Action for U.S. Appl. No. 17/749,919, dated Feb. 16, 2023.
Final Office Action for U.S. Appl. No. 17/749,919, dated Sep. 11, 2023.
Rivard et al., U.S. Appl. No. 14/823,993, filed Aug. 11, 2015.
Non-Final Office Action from U.S. Appl. No. 14/823,993, dated Jul. 28, 2016.
Final Office Action from U.S. Appl. No. 14/823,993, dated Feb. 10, 2017.
Non-Final Office Action from U.S. Appl. No. 14/823,993, dated Jul. 14, 2017.
Notice of Allowance from U.S. Appl. No. 14/823,993, dated Oct. 31, 2017.
Corrected Notice of Allowance from U.S. Appl. No. 14/823,993, dated Dec. 27, 2017.
Corrected Notice of Allowance from U.S. Appl. No. 14/823,993, dated Jan. 4, 2018.
Corrected Notice of Allowance from U.S. Appl. No. 14/823,993, dated Feb. 8, 2018.
Rivard et al., U.S. Appl. No. 15/891,251, filed Feb. 7, 2018.
Non-Final Office Action for U.S. Appl. No. 15/891,251, dated May 31, 2018.
Final Office Action for U.S. Appl. No. 15/891,251, dated Nov. 29, 2018.
Notice of Allowance from U.S. Appl. No. 15/891,251, dated May 7, 2019.
Corrected Notice of Allowance from U.S. Appl. No. 15/891,251, dated Jul. 3, 2019.

(56) References Cited

OTHER PUBLICATIONS

Non-Final Office Action for U.S. Appl. No. 16/519,244, dated Sep. 23, 2019.
Notice of Allowance from U.S. Appl. No. 16/519,244, dated Jan. 14, 2020.
Corrected Notice of Allowance from U.S. Appl. No. 16/519,244, dated Feb. 20, 2020.
Corrected Notice of Allowance from U.S. Appl. No. 16/519,244, dated Apr. 9, 2020.
Rivard et al., U.S. Appl. No. 16/857,016, filed Apr. 23, 2020.
Non-Final Office Action for U.S. Appl. No. 16/857,016, dated Aug. 5, 2020.
Notice of Allowance from U.S. Appl. No. 16/857,016, dated Jan. 27, 2021.
Corrected Notice of Allowance from U.S. Appl. No. 16/857,016, dated Feb. 16, 2021.
Corrected Notice of Allowance from U.S. Appl. No. 16/857,016, dated Apr. 13, 2021.
Rivard et al., U.S. Appl. No. 17/321,166, filed May 14, 2021.
Non-Final Office Action for U.S. Appl. No. 17/321,166, dated Apr. 25, 2022.
Final Office Action for U.S. Appl. No. 17/321,166, dated Dec. 9, 2022.
Notice of Allowance from U.S. Appl. No. 17/321,166, dated Jun. 5, 2023.
Notice of Allowance from U.S. Appl. No. 17/321,166, dated Sep. 20, 2023.
Rivard et al., U.S. Appl. No. 16/519,244, filed Jul. 23, 2019.
Feder et al., U.S. Appl. No. 14/843,896, filed Sep. 2, 2015.
Non-Final Office Action from U.S. Appl. No. 14/843,896, dated Jan. 14, 2016.
Notice of Allowance from U.S. Appl. No. 14/843,896, dated Jun. 9, 2016.
Feder et al., U.S. Appl. No. 15/253,721, filed Aug. 31, 2016.
Non-Final Office Action from U.S. Appl. No. 15/253,721, dated Jun. 9, 2017.
Final Office Action from U.S. Appl. No. 15/253,721, dated Nov. 3, 2017.
Notice of Allowance from U.S. Appl. No. 15/253,721, dated Jan. 4, 2018.
Feder et al., U.S. Appl. No. 15/913,742, filed Mar. 6, 2018.
Non-Final Office Action from U.S. Appl. No. 15/913,742, dated Jul. 31, 2019.
Final Office Action from U.S. Appl. No. 15/913,742, dated Nov. 21, 2019.
Non-Final Office Action from U.S. Appl. No. 15/913,742, dated Jun. 18, 2020.
Final Office Action from U.S. Appl. No. 15/913,742, dated Dec. 16, 2020.
Non-Final Office Action from U.S. Appl. No. 15/913,742, dated Jun. 9, 2021.
Non-Final Office Action from U.S. Appl. No. 16/244,982, dated May 13, 2021.
Final Office Action from U.S. Appl. No. 16/244,982, dated Dec. 20, 2021.
Non-Final Office Action from U.S. Appl. No. 16/244,982, dated Jun. 24, 2022.
Final Office Action from U.S. Appl. No. 16/244,982, dated Feb. 14, 2023.
Non-Final Office Action from U.S. Appl. No. 16/244,982, dated Aug. 3, 2023.
Rivard et al., U.S. Appl. No. 18/388,158, filed Nov. 8, 2023.
Rivard et al., U.S. Appl. No. 19/015,114, filed Jan. 9, 2025.
Rivard et al., U.S. Appl. No. 18/935,319, filed Nov. 1, 2024.
Non-Final Office Action for U.S. Appl. No. 18/935,319, dated Dec. 12, 2024.
Rivard et al., U.S. Appl. No. 19/025,910, filed Jan. 16, 2025.
Extended European Search Report from European Application No. 15891394.7 dated Jun. 19, 2018.
International Preliminary Examination Report from PCT Application No. PCT/US2017/39946, dated Jan. 10, 2019.
International Search Report and Written Opinion from International Application No. PCT/US 18/54014, dated Dec. 26, 2018.
Office Action from Chinese Patent Application No. 201580079444.1, dated Aug. 1, 2019.
Examination Report from European Application No. 15 856 814.7, dated Aug. 20, 2019.
Examination Report from European Application No. 15 857 675.1, dated Aug. 23, 2019.
Examination Report from European Application No. 15 856 710.7, dated Sep. 9, 2019.
Examination Report from European Application No. 15 857 386.5, dated Sep. 17, 2019.
Examination Report from European Application No. 15 857 748.6, dated Sep. 26, 2019.
Office Action from Japanese Patent Application No. 2017-544279, dated Oct. 23, 2019.
Office Action from Japanese Patent Application No. 2017-544280, dated Oct. 29, 2019.
Office Action from Japanese Patent Application No. 2017-544283, dated Oct. 29, 2019.
Office Action from Japanese Patent Application No. 2017-544547, dated Nov. 5, 2019.
Office Action from Japanese Patent Application No. 2017-544281, dated Nov. 26, 2019.
Extended European Search Report from European Application No. 16915389.7, dated Dec. 2, 2019.
Office Action from Japanese Patent Application No. 2017-544284, dated Dec. 10, 2019.
Office Action from Japanese Patent Application No. 2017-544282, dated Jan. 7, 2020.
Office Action from Chinese Patent Application No. 201780053926.9, dated Jan. 16, 2020.
Extended European Search Report from European Application No. 17821236.1, dated Jan. 24, 2020.
Petschnigg et al., "Digital Photography with Flash and No-Flash Image Pairs," ACM Transactions of Graphics, vol. 23, Aug. 2004, pp. 664-672.
International Preliminary Examination Report from PCT Application No. PCT/US2018/054014, dated Apr. 16, 2020.
Office Action from Chinese Patent Application No. 201680088945.0, dated May 21, 2020.
Office Action from Japanese Patent Application No. 2017-544284, dated Aug. 18, 2020.
International Search Report and Written Opinion from PCT Application No. PCT/US2020/040478, dated Sep. 25, 2020.
Summons to Attend Oral Proceedings from European Application No. 15 856 710.7, dated Sep. 18, 2020.
Office Action from Japanese Patent Application No. 2017-544281, dated Oct. 27, 2020.
Office Action from Chinese Patent Application No. 201780053926.9, dated Oct. 13, 2020.
Office Action from Japanese Patent Application No. 2017-544280, dated Jun. 30, 2020.
Second Office Action from Chinese Patent Application No. 201680088945.0, dated Dec. 17, 2020.
Office Action from Japanese Patent Application No. 2017-544282, dated Jan. 5, 2021.
Office Action from Japanese Patent Application No. 2017-544283, dated Jan. 12, 2021.
Decision to Refuse from European Application No. 15856710.7, dated Mar. 15, 2021.
Examination Report from Indian Application No. 201827049041, dated Mar. 19, 2021.
Decision to Refuse from European Application No. 15856212.4, dated Mar. 22, 2021.
Examination Report from European Application No. 16915389.7, dated Feb. 25, 2021.
Examination Report from European Application No. 15857386.5, dated Feb. 8, 2021.
Decision for Rejection and Decision of Dismissal of Amendment for Japanese Application No. 2017-544280, dated May 25, 2021.

(56) References Cited

OTHER PUBLICATIONS

Extended European Search Report from European Application No. 18864431.4, dated Jun. 1, 2021.
Kaufman et al., "Content-Aware Automatic Photo Enhancemen," Computer Graphics Forum, vol. 31, No. 8, 2012, pp. 2528-2540.
Battiato et al., "Automatic Image Enhancement by Content Dependent Exposure Correction," EURASIP Journal on Applied Signal Processing, 2004, pp. 1849-1860.
Mangiat et al., "Automatic scene relighting for video conferencing," IEEE 16th Annual International Conference on Image Processing (ICIP), Nov. 2009, pp. 2781-2784.
Weyrich et al., "Analysis of human faces using a measurement-based skin reflectance model," ACM Transactions on Graphics, vol. 25, No. 3, 2006, pp. 1013-1024.
Extended European Search Report from European Application No. 21169039.1, dated Jun. 16, 2021.
Office Action from Japanese Patent Application No. 2017-544284, dated Jul. 13, 2021.
Office Action from Japanese Patent Application No. 2017-544284, dated Jul. 3, 2021.
Office Action from Chinese Patent Application No. 202010904659.5, dated Jul. 28, 2021.
Extended European Search Report from European Application No. 21175832.1, dated Aug. 27, 2021.
Examination Report from Indian Application No. 201927010939, dated Jun. 9, 2021.
Summons to Attend Oral Proceedings from European Application No. 15856267.8, dated Sep. 3, 2021.
Photoshop, "Photoshop Help/Levels adjustment," Photoshop Help, retrieved on Aug. 20, 2021 from https://web.archive.org/web/20141018232619/http://helpx.adobe.com:80/photoshop/using/levels-adjustment.html, 3 pages.
Notice of Allowance from U.S. Appl. No. 15/663,005, dated Oct. 29, 2020.
Sogaard et al., "Video Quality Assessment and Machine Learning: Performance and Interpretability," In Proceedings of IEEE QoMEX, 2015, 7 pages.
Aghazadeh et al., "Novelty Detection from an Ego-Centric Perspective," IEEE Conference on Computer Vision and Pattern Recognition, 2011, pp. 3297-3304.
Bouguet, J., "Pyramidal Implementation of the Affine Lucas Kanade Feature Tracker Description of the algorithm," Intel Corporation, 2001, 10 pages, retrieved from http://robots.stanford.edu/cs223b04/algo_affine_tracking.pdf.
Doherty et al., "Investigating Keyframe Selection Methods in the Novel Domain of Passively Captured Visual Lifelogs," ACM International Conference on Image and Video Retrieval, Jul. 2008, 10 pages.
Gokalp et al., "Scene Classification Using Bag-of-Regions Representations," IEEE Computer Society Conference on Computer Vision and Pattern Recognition, Jun. 2007, 9 pages.
Gygli et al., "Creating Summaries from User Videos," European Conference on Computer Vision, 2014, pp. 505-520.
Horn et al., "Determining Optical Flow," Artificial Intelligence, Aug. 1981, pp. 185-203.
Jain et al., "Displacement Measurement and Is Application in Interframe Image Coding," IEEE Transactions on Communications, vol. COM-29, No. 12, Dec. 1981, pp. 1799-1808.
Khosla et al., "Large-Scale Video Summarization using Web-Image Priors," IEEE Conference on Computer Vision and Pattern Recognition, 2013, 8 pages, retrieved from https://people.csail.mit.edu/khosla/papers/cvpr2013_khosla.pdf.
Lee et al., "Discovering Important People and Objecls for Egocentric Video Summarization," IEEE Conference on Computer Vision and Pattern Recognition (CVPR), 2012, 8 pages, retrieved from https://vision.cs.utexas.edu/projects/egocentric/egocentric_cvpr2012.pdf.
Ling et al., "Method for Fast Shot Boundary Detection Based on SVM," Congress on Image and Signal Processing, 2008, pp. 445-449.
Liu et al., "Brief and High-Interest Video Summary Generation: Evaluating the AT&T Labs Rushes Summarizations," Proceedings of the 2nd ACM TRECVid Video Summarization Workshop, Oct. 2008, pp. 21-25.
Lu et al., "Fast Video Shot Boundary Detection Based on SVD and Pattern Matching," IEEE Transactions on Image Processing, vol. 22, Dec. 2013, pp. 5136-5145.
Lu et al., "Story-Driven Summarization for Egocentric Video," IEEE Conference on Computer Vision and Pattern Recognition, 2013, pp. 2714-2721.
Lucas et al., "An Iterative Image Registration Technique with an Application to Stereo Vision," Proceedings of DARPA Image Understanding Workshop, Apr. 1981, pp. 121-130.
Lupatini et al., "Scene Break Detection: A Comparison," Proceedings Eighth International Workshop on Research Issues in Data Engineering, Feb. 1998, 8 pages, retrieved from https://ieeexplore.ieee.org/document/658276.
Ma et al., "A Generic Framework of User Attention Model and its Application in Video Summarization," IEEE Transactions on Multimedia, vol. 7, Oct. 2005, pp. 907-919.
Marat et al., "Video Summarization using a Visual Attention Mode," European Signal Processing Conference, Sep. 2007, pp. 1784-1788.
Marpe et al., "The H.264/MPEG4 Advanced Video Coding Standard and its Applications," IEEE Communications Magazine, Aug. 2006, pp. 134-143.
Mertens et al., "Exposure Fusion," Pacific Conference on Computer Graphics and Applications (PG '07), 2007, 9 pages, retrieved from https://mericam.github.io/exposure_fusion/index.html.
Ngo et al., "On Clustering and Retrieval of Video Shots through Temporal Slices Analysis," IEEE Transactions on Multimedia, vol. 4, No. 4, Dec. 2002, pp. 446-458.
Sheikh et al., "Blind Quality Assessment of JPEG2000 Compressed Images," IEEE Asilomar Conference on Signals, Systems and Computers, Nov. 2002, 4 pages, retrieved from https://ece.uwaterloo.ca/~z70wang/publications/asilomar02.html.
Swain et al., "Indexing via Color Histograms," Proceedings Third International Conference on Computer Vision, Dec. 1990, pp. 390-393.
Wan et al., "A New Approach to Image Retrieval with Hierarchical Color Clustering," IEEE Transactions on Circuits and Systems for Video Technology, vol. 8, No. 5, Sep. 1998, pp. 628-643.
Wang, Z., "Objective Image Quality Assessment: Facing The Real-World Challenges," Electronic Imaging, Image Quality and System Performance, Feb. 2016, 6 pages.
Wang et al., "Reduced and No Reference Visual Quality Assessment," IEEE Signal Processing Magazine, Special Issue on Multimedia Quality Assessment, vol. 29, Nov. 2011, pp. 29-40.
International Search Report and Written Opinion from PCT Application No. PCT/US18/61547, dated Jan. 25, 2019.
International Preliminary Examination Report from PCT Application No. PCT/US18/61547, dated May 28, 2020.
Extended European Search Report from European Application No. 18878357.5, dated May 31, 2021.
Wolf, W, "Key Frame Selection by Motion Analysis," IEEE International Conference on Acoustics, Speech, and Signal Processing Conference, May 1996, pp. 1228-1231.
Zhu et al., "A New Diamond Search Algorithm for Fast Block-Matching Motion Estimation," IEEE Transactions on Image Processing, vol. 9, No. 2, Feb. 2000, pp. 287-290.
T-Mobile, "T-Mobile Sets Your Music Free," T-Mobile Webpage, Newsroom, Jun. 19, 2014, 5 pages retrieved from https://www.t-mobile.com/news/press/t-mobile-sets-your-music-free.
T-Mobile, "T-Mobile Brings iPhone 6 & iPhone 6 Plus to its Data Strong Network," T-Mobile Webpage, Newsroom, Sep. 8, 2014, 6 pages, retrieved from https://www.t-mobile.com/news/press/apple-devices.
Gatt et al., U.S. Appl. No. 15/978,122, filed May 12, 2018.
Non-Final Office Action from U.S. Appl. No. 15/978,122, dated Sep. 16, 2019.
Final Office Action from U.S. Appl. No. 15/978,122, dated Mar. 2, 2020.
Notice of Allowance from U.S. Appl. No. 15/978,122, dated Aug. 18, 2020.

(56) References Cited

OTHER PUBLICATIONS

Easy Flex, Two Examples of Layout Animations, Apr. 11, 2010, pp. 1-11, http://evtimmy.com/2010/04/two-examples-of-layout-animations/.
Tidwell, J., "Animated Transition," from Designing Interfaces, O'Reilly Media, Inc., Dec. 2010, pp. 127-129.
International Search Report and Written Opinion from PCT Application No. PCT/US17/57704, dated Nov. 16, 2017.
Extended European Search Report from European Application No. 17863122.2, dated Dec. 2, 2019.
European Search Report from European Application No. 17863122.2, dated Dec. 10, 2020.
Examination Report from Indian Application No. 201927013698, dated Jun. 9, 2021.
Examination Report from European Application No. 17863122.2, dated Aug. 4, 2021.
XP055828762, Google display tablet "iPad mini 2", device pictures, 2014, 5 pages.
Office Action from Chinese Patent Application No. 201780064462.1, dated Nov. 2, 2022.
Second Office Action from Chinese Patent Application No. 201780064462.1, dated Jun. 14, 2023.
International Search Report and Written Opinion from PCT Application No. PCT/US2018/066293, dated Mar. 15, 2019.
Yoon et al., "Image Contrast Enhancement based Sub-histogram Equalization Technique without Over-equalization Noise," World Academy of Science, Engineering and Technology, vol. 50, 2009, 7 pages.
Photoshop, "Photoshop Help/Levels adjustment," Photoshop Help, 2014, retrieved on Aug. 20, 2021 from https://web.archive.org/web/20141018232619/http://helpx.adobe.com:80/photoshop/using/levels-adjustment.html, 3 pages.
Office Action from Japanese Patent Application No. 2020-121537, dated Oct. 19, 2021.
Extended European Search Report from European Application No. 21196442.4, dated Dec. 13, 2021.
Huo et al., "Robust Automatic White Balance algorithm using Gray Color Points in Images," IEEE Transactions on Consumer Electronics, vol. 52, No. 2, May 2006, pp. 541-546.
Examination Report from European Application No. 15857386.5, dated Dec. 12, 2021.
Final Office Action from Japanese Patent Application No. 2017-544282, dated Mar. 1, 2022.
Notice of Final Rejection from Japanese Patent Application No. 2017-544282, dated Mar. 1, 2022.
Examination Report from Indian Application No. 201927010939, dated Mar. 25, 2022.
Examination Report from Indian Application No. 202027018945, dated Mar. 17, 2022.
Office Action from Japanese Patent Application No. 2021-076679, dated Aug. 2, 2022.
Office Action from Japanese Patent Application No. 2021-079285, dated Aug. 2, 2022.
Office Action from Japanese Patent Application No. 2021-096499, dated Sep. 6, 2022.
Office Action from Japanese Patent Application No. 2021-154653, dated Sep. 13, 2022.
Office Action from Chinese Patent Application No. 202110773625.1, dated Nov. 2, 2022.
Summons to Attend Oral Proceedings from European Application No. 16 915 389.7, dated Oct. 21, 2022.
Office Action from Australian Patent Application No. 2020299585, dated Nov. 24, 2022.
Srivastava et al., U.S. Appl. No. 15/870,689, filed Jan. 12, 2018.
Non-Final Office Action from U.S. Appl. No. 15/870,689, dated Mar. 17, 2019.
Final Office Action from U.S. Appl. No. 15/870,689, dated Sep. 5, 2019.
Advisory Action from U.S. Appl. No. 15/870,689, dated Nov. 14, 2019.
Notice of Allowance from U.S. Appl. No. 15/870,689, dated Dec. 17, 2019.
Examination Report from European Application No. 15 857 386.5, dated Jan. 3, 2023.
Decision for Rejection from Japanese Patent Application No. 2021-154653, dated May 23, 2023.
Second Office Action from Chinese Patent Application No. 202110773625.1, dated May 7, 2023.
Examination Report from European Application No. 18864431.4, dated Apr. 21, 2023.
Decision for Rejection from Japanese Patent Application No. 2021-076679, dated Jun. 6, 2023.
Wang et al., "A High Dynamic Range CMOS APS Image Sensor," Semantic Scholar, 2001, pp. 1-4, retrived from https://www.semanticscholar.org/paper/A-High-Dynamic-Range-CMOS-APS-Image-Sensor-Wang/a824e97836438887089a3c62f4d9be77d47c9067.
Bock et al., "A Wide-VGA CMOS Image Sensor with Global Shutter and Extended Dynamic Range," International Image Sensor Society, 2005, pp. 222-225, retrieved from https://www.imagesensors.org/Past%20Workshops/2005%20Workshop/2005%20Papers/56%20Bock%20et%20al.pdf>.
Micron, "⅓-Inch, Wide-VGA CMOS Digital Image Sensor," Micron Technology, 2006, 15 pages, retrieved from https://media.digikey.com/pdf/Data%20Sheets/Micron%20Technology%20Inc%20PDFs/MT9V022.pdf.
Neo Film School, "A Final Nail in the Coffin of Film Cinematography!" Neo Film School Blog, Mar. 7, 2011, 4 pages, retrieved from https://neofilmschool.wordpress.com/2011/03/07/a-final-nail-in-the-coffin-of-film-cinematography/.
CMOSIS, "CMOSIS Outlining Low Noise/High Dynamic Image Sensor Concept," Photonics Online, Nov. 29, 2010, 1 page, retrieved from https://www.photonicsonline.com/doc/cmosis-outlining-low-noisehigh-dynamic-image-0001?VNETCOOKIE=NO.
Koifman et al., "Image Sensors World," Blog, Dec. 30, 2010, 62 pages, retrieved from http://image-sensors-world.blogspot.com/2010/.
Office Action from Chinese Patent Application No. 202111599811.4, dated Feb. 23, 2024, 7 pages.
Aksoy et al., "A Dataset of Flash and Ambient Illumination Pairs from the Crowd," ECCV, 2018, pp. 1-16.
Cornell, B., U.S. Appl. No. 15/162,326, filed May 23, 2016.
Non-Final Office Action from U.S. Appl. No. 15/162,326, dated Sep. 27, 2017.
Notice of Allowance from U.S. Appl. No. 15/162,326, dated Jan. 29, 2018.
Notice of Allowance from U.S. Appl. No. 15/162,326, dated Apr. 11, 2018.
Adnan et al., "Efficient Kernal Fusion Techniques for Massive Video Data Analysis on GPGPUs," arXiv, Sep. 15, 2015, 10 pages, retieved from https://arxiv.org/abs/1509.04394.
Liu et al., "An Efficient SAR Processor Based on GPU via CUDA," 2nd International Congress on Image and Signal Processing, Oct. 17, 2009, pp. 1-5.
Sung, Hsiang-Wei et al., "OpenCV Optimization on Heterogeneous Multi-Core Systems for Gesture Recognition Applications," IEEE 45th International Conference on Parallel Processing Workshops (ICPPW), Aug. 16, 2016, pp. 59-65.
U.S. Appl. No. 14/178,305, filed Feb. 12, 2014.
Final Office Action from U.S. Appl. No. 14/178,305, dated May 18, 2015.
Non-Final Office Action from U.S. Appl. No. 14/178,305, dated Aug. 11, 2014.
Le et al., U.S. Appl. No. 16/278,581, filed Feb. 18, 2019.
Zhen et al., U.S. Appl. No. 16/277,630, filed Feb. 15, 2019.
Le et al., U.S. Appl. No. 16/278,543, filed Feb. 18, 2019.
Notice of Allowance from U.S. Appl. No. 16/278,543, dated Apr. 3, 2020.
Lim et al., U.S. Appl. No. 15/663,005, filed Jul. 28, 2017.
First Action Interview Pilot Program Pre-Interview Communication from U.S. Appl. No. 15/663,005, dated May 28, 2020.
Non-Final Office Action from U.S. Appl. No. 16/215,351, dated Jan. 24, 2019.

(56) References Cited

OTHER PUBLICATIONS

Notice of Allowance from U.S. Appl. No. 16/215,351, dated Apr. 1, 2019.
Rivard et al., U.S. Appl. No. 16/290,763, filed Mar. 1, 2019.
Non-Final Office Action for U.S. Appl. No. 16/290,763, dated Jun. 26, 2019.
Notice of Allowance from U.S. Appl. No. 16/290,763, dated Oct. 10, 2019.
Rivard et al., U.S. Appl. No. 16/796,497, filed Feb. 20, 2020.
Non-Final Office Action for U.S. Appl. No. 16/796,497, dated Dec. 8, 2021.
Notice of Allowance from U.S. Appl. No. 16/796,497, dated May 26, 2022.
Rivard et al., U.S. Appl. No. 17/694,458, filed Mar. 14, 2022.
Notice of Allowance from U.S. Appl. No. 17/694,458, dated Mar. 1, 2023.
Rivard et al., U.S. Appl. No. 17/745,668, filed May 16, 2022.
Non-Final Office Action for U.S. Appl. No. 17/745,668, dated Jun. 8, 2023.
Rivard et al., U.S. Appl. No. 16/221,289, filed Dec. 14, 2018.
Non-Final Office Action from U.S. Appl. No. 16/221,289, dated May 15, 2020.
Final Office Action from U.S. Appl. No. 16/221,289, dated Nov. 24, 2020.
Notice of Allowance from U.S. Appl. No. 16/221,289, dated May 12, 2021.
Supplemental Notice of Allowance from U.S. Appl. No. 16/221,289, dated Jul. 16, 2021.
Rivard et al., U.S. Appl. No. 16/552,649, filed Aug. 27, 2019.
Non-Final Office Action from U.S. Appl. No. 16/552,649, dated Jun. 18, 2021.
Notice of Allowance from U.S. Appl. No. 16/552,649, dated Dec. 17, 2021.
Rivard et al., U.S. Appl. No. 16/206,241, filed Nov. 30, 2018.
Non-Final Office Action from U.S. Appl. No. 16/206,241, dated Jun. 20, 2019.
Non-Final Office Action from U.S. Appl. No. 16/206,241, dated Sep. 26, 2019.
Notice of Allowance from U.S. Appl. No. 16/206,241, dated Mar. 5, 2020.
Rivard et al., U.S. Appl. No. 16/547,358, filed Aug. 21, 2019.
Non-Final Office Action from U.S. Appl. No. 16/547,358, dated Mar. 23, 2020.
Notice of Allowance from U.S. Appl. No. 16/547,358, dated Aug. 31, 2020.
Rivard et al., U.S. Appl. No. 17/108,867, filed Dec. 1, 2020.
Non-Final Office Action from U.S. Appl. No. 17/108,867, dated Aug. 20, 2021.
Final Office Action from U.S. Appl. No. 17/108,867, dated Jan. 28, 2022.
Advisory Action from U.S. Appl. No. 17/108,867, dated Jul. 18, 2022.
Rivard et al., U.S. Appl. No. 17/543,519, filed Dec. 6, 2021.
Notice of Allowance from U.S. Appl. No. 17/543,519, dated Oct. 19, 2022.
Notice of Allowance from U.S. Appl. No. 17/543,519, dated Feb. 8, 2023.
Supplemental Notice of Allowance from U.S. Appl. No. 17/543,519, dated Apr. 26, 2023.
Rivard et al., U.S. Appl. No. 17/875,263, filed Jul. 27, 2022.
Non-Final Office Action from U.S. Appl. No. 17/875,263, dated Mar. 27, 2023.
Final Office Action from U.S. Appl. No. 17/875,263, dated Sep. 7, 2023.
Rivard et al., U.S. Appl. No. 17/969,593, filed Oct. 19, 2022.
Non-Final Office Action from U.S. Appl. No. 17/969,593, dated May 17, 2023.
Rivard et al., U.S. Appl. No. 16/460,807, filed Jul. 2, 2019.
Non-Final Office Action for U.S. Appl. No. 16/460,807, dated Aug. 20, 2020.
Final Office Action for U.S. Appl. No. 16/460,807, dated Mar. 1, 2021.
Non-Final Office Action from U.S. Appl. No. 16/460,807, dated Aug. 30, 2021.
Final Office Action for U.S. Appl. No. 16/460,807, dated Mar. 2, 2022.
Rivard et al., U.S. Appl. No. 17/874,086, filed Jul. 26, 2022.
Non-Final Office Action from U.S. Appl. No. 17/874,086, dated Feb. 2, 2023.
Final Office Action from U.S. Appl. No. 17/874,086, dated Aug. 21, 2023.
Feder et al., U.S. Appl. No. 16/395,792, filed Apr. 26, 2019.
Non-Final Office Action from U.S. Appl. No. 16/395,792, dated Aug. 26, 2020.
Rivard et al., U.S. Appl. No. 17/868,536, filed Jul. 19, 2022.
Notice of Allowance from U.S. Appl. No. 17/868,536, dated Sep. 29, 2023.
Rivard et al., U.S. Appl. No. 14/534,079, filed Nov. 5, 2014.
Non-Final Office Action from U.S. Appl. No. 14/534,079, dated Jan. 29, 2015.
Notice of Allowance from U.S. Appl. No. 14/534,079, dated May 11, 2015.
Corrected Notice of Allowance from U.S. Appl. No. 14/534,079, dated Aug. 19, 2015.
Rivard et al., U.S. Appl. No. 14/534,089, filed Nov. 5, 2014.
Non-Final Office Action from U.S. Appl. No. 14/534,089, dated Feb. 25, 2015.
Notice of Allowance from U.S. Appl. No. 14/534,089, dated Jun. 23, 2015.
Corrected Notice of Allowance from U.S. Appl. No. 14/534,089, dated Aug. 25, 2015.
Corrected Notice of Allowance from U.S. Appl. No. 14/534,089, dated Sep. 23, 2015.
Rivard et al., U.S. Appl. No. 14/535,274, filed Nov. 6, 2014.
Non-Final Office Action from U.S. Appl. No. 14/535,274, dated Feb. 3, 2015.
Notice of Allowance from U.S. Appl. No. 14/535,274, dated May 26, 2015.
Corrected Notice of Allowance from U.S. Appl. No. 14/535,274, dated Aug. 25, 2015.
Rivard et al., U.S. Appl. No. 14/535,279, filed Nov. 6, 2014.
Non-Final Office Action from U.S. Appl. No. 14/535,279, dated Feb. 5, 2015.
Notice of Allowance from U.S. Appl. No. 14/535,279, dated Aug. 31, 2015.
Rivard et al., U.S. Appl. No. 14/535,282, filed Nov. 6, 2014.
Non-Final Office Action from U.S. Appl. No. 14/535,282, dated Jan. 30, 2015.
Notice of Allowance from U.S. Appl. No. 14/535,282, dated Jun. 23, 2015.
Corrected Notice of Allowance from U.S. Appl. No. 14/535,282, dated Sep. 18, 2015.
Corrected Notice of Allowance from U.S. Appl. No. 14/535,282, dated Oct. 7, 2015.
Rivard et al., U.S. Appl. No. 14/536,524, filed Nov. 7, 2014.
Non-Final Office Action from U.S. Appl. No. 14/536,524, dated Mar. 3, 2015.
Notice of Allowance from U.S. Appl. No. 14/536,524, dated Jun. 29, 2015.
Supplemental Notice of Allowance from U.S. Appl. No. 14/536,524, dated Aug. 19, 2015.
Supplemental Notice of Allowance from U.S. Appl. No. 14/536,524, dated Sep. 18, 2015.
Feder et al., U.S. Appl. No. 14/535,285, filed Nov. 6, 2014.
Non-Final Office Action from U.S. Appl. No. 14/535,285, dated Feb. 3, 2015.
Notice of Allowance from U.S. Appl. No. 14/535,285, dated Jul. 31, 2015.
Notice of Allowance from U.S. Appl. No. 14/535,285, dated Oct. 15, 2015.
Corrected Notice of Allowance from U.S. Appl. No. 14/535,285, dated Nov. 16, 2015.
Kindle et al., U.S. Appl. No. 14/547,074, filed Nov. 18, 2014.

(56) References Cited

OTHER PUBLICATIONS

Non-Final Office Action from U.S. Appl. No. 14/547,074, dated Feb. 26, 2016.
Notice of Allowance from U.S. Appl. No. 14/547,074, dated Aug. 19, 2016.
Supplemental Notice of Allowance from U.S. Appl. No. 14/547,074, dated Oct. 31, 2016.
Rivard et al., U.S. Appl. No. 14/547,077, filed Nov. 18, 2014.
Non-Final Office Action from U.S. Appl. No. 14/547,077, dated Dec. 9, 2016.
Final Office Action from U.S. Appl. No. 14/547,077, dated May 12, 2017.
Non-Final Office Action from U.S. Appl. No. 14/547,077, dated Dec. 28, 2017.
Notice of Allowance from U.S. Appl. No. 14/547,077, dated Jun. 1, 2018.
Rivard et al., U.S. Appl. No. 16/116,715, filed Aug. 29, 2018.
Non-Final Office Action from U.S. Appl. No. 16/116,715, dated Feb. 18, 2020.
Final Office Action from U.S. Appl. No. 16/116,715, dated Sep. 28, 2020.
Non-Final Office Action from U.S. Appl. No. 16/116,715, dated Jul. 12, 2021.
Final Office Action from U.S. Appl. No. 16/116,715, dated Mar. 7, 2022.
Rivard et al., U.S. Appl. No. 17/874,102, filed Jul. 26, 2022.
Non-Final Office Action from U.S. Appl. No. 17/874,102, dated Jan. 23, 2023.
Final Office Action from U.S. Appl. No. 17/874,102, dated Jul. 20, 2023.
Non-Final Office Action for U.S. Appl. No. 17/171,800, dated Aug. 18, 2022.
Notice of Allowance from U.S. Appl. No. 17/171,800, dated May 26, 2023.
Non-Final Office Action for U.S. Appl. No. 17/171,800, dated Oct. 4, 2023.
Feder et al., U.S. Appl. No. 14/340,557, filed Jul. 24, 2014.
Non-Final Office Action from U.S. Appl. No. 14/340,557, dated Jan. 21, 2016.
Final Office Action from U.S. Appl. No. 14/340,557, dated Sep. 16, 2016.
Notice of Allowance from U.S. Appl. No. 14/340,557, dated Mar. 3, 2017.
Corrected Notice of Allowance from U.S. Appl. No. 14/340,557, dated Jul. 27, 2017.
Feder et al., U.S. Appl. No. 15/622,520, filed Jun. 14, 2017.
Non-Final Office Action from U.S. Appl. No. 15/622,520, dated Jan. 10, 2018.
Notice of Allowance from U.S. Appl. No. 15/622,520, dated Jul. 18, 2018.
Feder et al., U.S. Appl. No. 16/147,206, filed Sep. 28, 2018.
Non-Final Office Action from U.S. Appl. No. 16/147,206, dated Oct. 18, 2019.
Notice of Allowance from U.S. Appl. No. 16/147,206, dated Jun. 19, 2020.
Corrected Notice of Allowance from U.S. Appl. No. 16/147,206, dated Aug. 27, 2020.
Feder et al., U.S. Appl. No. 17/023,159, filed Sep. 16, 2020.
Non-Final Office Action from U.S. Appl. No. 17/023,159, dated Sep. 2, 2021.
Final Office Action from U.S. Appl. No. 17/023,159, dated Apr. 15, 2022.
Feder et al., U.S. Appl. No. 17/945,922, filed Sep. 15, 2022.
Non-Final Office Action from U.S. Appl. No. 17/945,922, dated Mar. 31, 2023.
Rivard et al., U.S. Appl. No. 16/662,965, filed Oct. 24, 2019.
Final Office Action from U.S. Appl. No. 17/945,922, dated Sep. 19, 2023.
Rivard et al., U.S. Appl. No. 15/201,283, filed Jul. 1, 2016.
Non-Final Office Action from U.S. Appl. No. 15/201,283, dated Dec. 7, 2016.
Notice of Allowance from U.S. Appl. No. 15/201,283, dated Mar. 23, 2017.
Notice of Allowance from U.S. Appl. No. 15/201,283, dated Jul. 19, 2017.
Rivard et al., U.S. Appl. No. 15/636,324, filed Jun. 28, 2017.
Non-Final Office Action for U.S. Appl. No. 15/636,324, dated Oct. 18, 2018.
Final Office Action for U.S. Appl. No. 15/636,324, dated Mar. 22, 2019.
Non-Final Office Action for U.S. Appl. No. 15/636,324, dated Apr. 18, 2019.
Notice of Allowance from U.S. Appl. No. 15/636,324, dated Jul. 2, 2019.
Corrected Notice of Allowance from U.S. Appl. No. 15/636,324, dated Aug. 20, 2019.
Corrected Notice of Allowance from U.S. Appl. No. 15/636,324, dated Sep. 5, 2019.
Rivard et al., U.S. Appl. No. 16/271,604, filed Feb. 8, 2019.
Non-Final Office Action from U.S. Appl. No. 16/271,604, dated Apr. 5, 2019.
Notice of Allowance from U.S. Appl. No. 16/271,604, dated Jul. 2, 2019.
Corrected Notice of Allowance from U.S. Appl. No. 16/271,604, dated Aug. 8, 2019.
Corrected Notice of Allowance from U.S. Appl. No. 16/271,604, dated Sep. 19, 2019.
Non-Final Office Action for U.S. Appl. No. 16/662,965, dated Mar. 22, 2021.
Final Office Action for U.S. Appl. No. 16/662,965, dated Sep. 3, 2021.
Notice of Allowance from U.S. Appl. No. 16/662,965, dated Mar. 1, 2022.
Rivard et al., U.S. Appl. No. 17/835,823, filed Jun. 8, 2022.
Non-Final Office Action for U.S. Appl. No. 17/835,823, dated Apr. 18, 2023.
Final Office Action for U.S. Appl. No. 17/835,823, dated Nov. 14, 2023.
Rivard et al., U.S. Appl. No. 15/254,964, filed Apr. 3, 2019.
Non-Final Office Action from U.S. Appl. No. 15/254,964, dated Jan. 3, 2018.
Final Office Action for U.S. Appl. No. 15/254,964 dated Jul. 24, 2018.
Notice of Allowance for U.S. Appl. No. 15/254,964, dated Dec. 21, 2018.
Supplemental Notice of Allowance for U.S. Appl. No. 15/254,964, dated Feb. 1, 2019.
Supplemental Notice of Allowance for U.S. Appl. No. 15/254,964, dated Mar. 11, 2019.
Feder et al., U.S. Appl. No. 14/503,210, filed Sep. 30, 2014.
Restriction Requirement from U.S. Appl. No. 14/503,210, dated Oct. 16, 2015.
Non-Final Office Action from U.S. Appl. No. 14/503,210, dated Jan. 12, 2016.
Notice of Allowance from U.S. Appl. No. 14/503,210, dated May 31, 2016.
Feder et al., U.S. Appl. No. 14/503,224, filed Sep. 30, 2014.
Non-Final Office Action from U.S. Appl. No. 14/503,224, dated Sep. 2, 2015.
Notice of Allowance from U.S. Appl. No. 14/503,224, dated Feb. 3, 2016.
Rivard et al., U.S. Appl. No. 13/573,252, filed Sep. 4, 2012.
Restriction Requirement from U.S. Appl. No. 13/573,252, dated Apr. 21, 2014.
Non-Final Office Action from U.S. Appl. No. 13/573,252, dated Jul. 10, 2014.
Notice of Allowance from U.S. Appl. No. 13/573,252, dated Oct. 22, 2014.
Rivard et al., U.S. Appl. No. 14/568,045, filed Dec. 11, 2014.
Restriction Requirement from U.S. Appl. No. 14/568,045, dated Jan. 15, 2015.

(56) References Cited

OTHER PUBLICATIONS

Non-Final Office Action from U.S. Appl. No. 14/568,045, dated Mar. 24, 2015.
Final Office Action from U.S. Appl. No. 14/568,045, dated Sep. 18, 2015.
Notice of Allowance from U.S. Appl. No. 14/568,045, dated Apr. 26, 2016.
Notice of Allowance from U.S. Appl. No. 14/568,045, dated Jan. 12, 2016.
Corrected Notice of Allowance from U.S. Appl. No. 14/568,045, dated Feb. 19, 2016.
Corrected Notice of Allowance from U.S. Appl. No. 14/568,045, dated Jun. 30, 2016.
Feder et al., U.S. Appl. No. 14/517,731, filed Oct. 17, 2014.
Non-Final Office Action from U.S. Appl. No. 14/517,731, dated Oct. 6, 2015.
Notice of Allowance from U.S. Appl. No. 14/517,731, dated May 19, 2016.
Rivard et al., U.S. Appl. No. 14/534,068, filed Nov. 5, 2014.
Non-Final Office Action from U.S. Appl. No. 14/534,068, dated Feb. 17, 2015.
Notice of Allowance from U.S. Appl. No. 14/534,068, dated Jul. 29, 2015.
Corrected Notice of Allowance from U.S. Appl. No. 14/534,068, dated Sep. 22, 2015.
Rivard et al., U.S. Appl. No. 14/543,782, filed Nov. 17, 2014.
Non-Final Office Action from U.S. Appl. No. 14/543,782, dated Dec. 3, 2015.
Notice of Allowance from U.S. Appl. No. 14/543,782, dated Jul. 7, 2016.
Rivard et al., U.S. Appl. No. 15/289,039, filed Oct. 7, 2016.
Non-Final Office Action from U.S. Appl. No. 15/289,039, dated May 11, 2017.
Notice of Allowance from U.S. Appl. No. 15/289,039, dated Oct. 12, 2017.
Rivard et al., U.S. Appl. No. 15/863,785, filed Jan. 5, 2018.
Non-Final Office Action from U.S. Appl. No. 15/863,785, dated Apr. 11, 2018.
Notice of Allowance from U.S. Appl. No. 15/863,785, dated Sep. 11, 2018.
Rivard et al., U.S. Appl. No. 16/211,931, filed Dec. 6, 2018.
Non-Final Office Action from U.S. Appl. No. 16/211,931, dated Apr. 5, 2019.
Notice of Allowance from U.S. Appl. No. 16/211,931, dated Aug. 2, 2019.
Rivard et al., U.S. Appl. No. 16/677,385, filed Nov. 7, 2019.
Non-Final Office Action from U.S. Appl. No. 16/677,385, dated Jan. 8, 2021.
Final Office Action from U.S. Appl. No. 16/677,385, dated Sep. 17, 2021.
Notice of Allowance from U.S. Appl. No. 16/677,385, dated Mar. 22, 2022.
Corrected Notice of Allowance from U.S. Appl. No. 16/677,385, dated Apr. 6, 2022.
Rivard et al., U.S. Appl. No. 17/518,473, filed Nov. 3, 2021.
Non-Final Office Action from U.S. Appl. No. 17/518,473, dated Dec. 9, 2022.
Final Office Action from U.S. Appl. No. 17/518,473, dated Aug. 18, 2023.
Advisory Action from U.S. Appl. No. 17/518,473, dated Nov. 1, 2023.
Rivard et al., U.S. Appl. No. 17/694,441, filed Mar. 14, 2022.
Non-Final Office Action from U.S. Appl. No. 17/694,441, dated Jan. 23, 2023.
Final Office Action from U.S. Appl. No. 17/694,441, dated Oct. 2, 2023.
Rivard et al., U.S. Appl. No. 14/547,079, filed Nov. 18, 2014.
Non-Final Office Action from U.S. Appl. No. 14/547,079, dated Nov. 7, 2016.
Non-Final Office Action from U.S. Appl. No. 14/547,079, dated Mar. 15, 2017.
Final Office Action from U.S. Appl. No. 14/547,079, dated Jul. 17, 2017.
Non-Final Office Action from U.S. Appl. No. 14/547,079, dated Nov. 9, 2017.
Notice of Allowance from U.S. Appl. No. 14/547,079, dated May 3, 2018.
Rivard et al., U.S. Appl. No. 15/975,646, filed May 9, 2018.
Non-Final Office Action from U.S. Appl. No. 15/975,646, dated Sep. 27, 2018.
Final Office Action from U.S. Appl. No. 15/975,646, dated Mar. 25, 2019.
Advisory Action from U.S. Appl. No. 15/975,646, dated Apr. 23, 2019.
Notice of Allowance from U.S. Appl. No. 15/975,646, dated Aug. 9, 2019.
Rivard et al., U.S. Appl. No. 16/666,215, filed Oct. 28, 2019.
Non-Final Office Action from U.S. Appl. No. 16/666,215, dated Apr. 2, 2021.
Notice of Allowance from U.S. Appl. No. 16/666,215, dated Oct. 8, 2021.
Rivard et al., U.S. Appl. No. 17/569,400, filed Jan. 5, 2022.
Non-Final Office Action from U.S. Appl. No. 17/569,400, dated Jan. 11, 2023.
Final Office Action from U.S. Appl. No. 17/569,400, dated Jun. 26, 2023.
Non-Final Office Action from U.S. Appl. No. 17/569,400, dated Nov. 24, 2023.
Non-Final Office Action from U.S. Appl. No. 17/569,400, dated Mar. 13, 2024.
Notice of Allowance from U.S. Appl. No. 17/569,400, dated Jul. 31, 2024.
Rivard et al., U.S. Appl. No. 17/701,484, filed Mar. 22, 2022.
Non-Final Office Action from U.S. Appl. No. 17/701,484, dated Feb. 13, 2023.
Final Office Action from U.S. Appl. No. 17/701,484, dated Jul. 24, 2023.
Final Office Action from U.S. Appl. No. 17/701,484, dated Jul. 18, 2024.
Rivard et al., U.S. Appl. No. 14/702,549, filed May 1, 2015.
Non-Final Office Action from U.S. Appl. No. 14/702,549, dated Jan. 25, 2016.
Notice of Allowance from U.S. Appl. No. 14/702,549, dated Aug. 15, 2016.
Corrected Notice of Allowance from U.S. Appl. No. 14/702,549, dated Nov. 10, 2016.
Corrected Notice of Allowance from U.S. Appl. No. 14/702,549, dated Dec. 1, 2016.
Rivard et al., U.S. Appl. No. 15/352,510, filed Nov. 15, 2016.
Notice of Allowance from U.S. Appl. No. 15/352,510, dated Oct. 17, 2017.
Corrected Notice of Allowance from U.S. Appl. No. 15/352,510, dated Jan. 8, 2018.
Corrected Notice of Allowance from U.S. Appl. No. 15/352,510, dated Jan. 29, 2018.
Rivard et al., U.S. Appl. No. 15/687,278, filed Aug. 25, 2017.
Non-Final Office Action for U.S. Appl. No. 15/687,278, dated Apr. 13, 2018.
Notice of Allowance from U.S. Appl. No. 15/687,278, dated Aug. 24, 2018.
Rivard et al., U.S. Appl. No. 15/836,655, filed Dec. 8, 2017.
Non-Final Office Action from U.S. Appl. No. 15/836,655, dated Apr. 6, 2018.
Notice of Allowance from U.S. Appl. No. 15/836,655, dated Apr. 30, 2018.
Corrected Notice of Allowance from U.S. Appl. No. 15/836,655, dated May 14, 2018.
Rivard et al., U.S. Appl. No. 15/885,296, filed Jan. 31, 2018.
Non-Final Office Action for U.S. Appl. No. 15/885,296, dated Jun. 4, 2018.
Notice of Allowance for U.S. Appl. No. 15/885,296 dated Sep. 21, 2018.

(56) References Cited

OTHER PUBLICATIONS

Corrected Notice of Allowance for U.S. Appl. No. 15/885,296 dated Oct. 16, 2018.
Rivard et al., U.S. Appl. No. 16/154,999, filed Oct. 9, 2018.
Non-Final Office Action for U.S. Appl. No. 16/154,999, dated Dec. 20, 2018.
Notice of Allowance from U.S. Appl. No. 16/154,999, dated Jun. 7, 2019.
Rivard et al., U.S. Appl. No. 16/505,278, filed Jul. 8, 2019.
Non-Final Office Action for U.S. Appl. No. 16/505,278, dated Jan. 10, 2020.
Notice of Allowance from U.S. Appl. No. 16/505,278, dated Sep. 25, 2020.
Rivard et al., U.S. Appl. No. 15/643,311, filed Jul. 6, 2017.
Non-Final Office Action from U.S. Appl. No. 15/643,311, dated Jan. 4, 2018.
Final Office Action for U.S. Appl. No. 15/643,311 dated Jul. 24, 2018.
Notice of Allowance for U.S. Appl. No. 15/643,311, dated Oct. 31, 2018.
Supplemental Notice of Allowance for U.S. Appl. No. 15/643,311, dated Dec. 11, 2018.
Rivard et al., U.S. Appl. No. 16/213,041, filed Dec. 7, 2018.
Non-Final Office Action for U.S. Appl. No. 16/213,041, dated Oct. 30, 2019.
Notice of Allowance from U.S. Appl. No. 16/213,041, dated May 29, 2020.
Supplemental Notice of Allowance from U.S. Appl. No. 16/213,041, dated Jun. 17, 2020.
Supplemental Notice of Allowance from U.S. Appl. No. 16/213,041, dated Aug. 31, 2020.
Rivard et al., U.S. Appl. No. 17/000,098, filed Aug. 21, 2020.
Non-Final Office Action for U.S. Appl. No. 17/000,098, dated Dec. 7, 2021.
Final Office Action for U.S. Appl. No. 17/000,098, dated Aug. 25, 2022.
Non-Final Office Action for U.S. Appl. No. 17/000,098, dated Apr. 11, 2023.
Notice of Allowance for U.S. Appl. No. 17/000,098, dated Jan. 25, 2024.
Corrected Notice of Allowance for U.S. Appl. No. 17/000,098, dated May 1, 2024.
Rivard et al., U.S. Appl. No. 18/646,620, filed Apr. 25, 2024.
Rivard et al., U.S. Appl. No. 15/331,733, filed Oct. 21, 2016.
Notice of Allowance from U.S. Appl. No. 15/331,733, dated Dec. 7, 2016.
Notice of Allowance from U.S. Appl. No. 15/331,733, dated Apr. 17, 2017.
Rivard et al., U.S. Appl. No. 15/815,463, filed Nov. 16, 2017.
Non-Final Office Action from U.S. Appl. No. 15/815,463, dated Mar. 21, 2019.
Notice of Allowance from U.S. Appl. No. 15/815,463, dated Jul. 10, 2019.
Rivard et al., U.S. Appl. No. 16/663,015, filed Oct. 24, 2019.
Non-Final Office Action from U.S. Appl. No. 16/663,015, dated Jul. 9, 2020.
Final Office Action from U.S. Appl. No. 16/663,015, dated Feb. 4, 2021.
Non-Final Office Action from U.S. Appl. No. 16/663,015, dated Jul. 22, 2021.
Notice of Allowance from U.S. Appl. No. 16/663,015, dated Feb. 15, 2022.
Corrected Notice of Allowance from U.S. Appl. No. 16/663,015, dated May 11, 2022.
Rivard et al., U.S. Appl. No. 17/824,773, filed May 25, 2022.
Rivard et al., U.S. Appl. No. 15/452,639, filed Apr. 4, 2018.
Non-Final Office Action from U.S. Appl. No. 15/452,639, dated May 11, 2017.
Notice of Allowance from U.S. Appl. No. 15/452,639, dated Nov. 30, 2017.
Rivard et al., U.S. Appl. No. 15/642,074, filed Jul. 5, 2017.
Non-Final Office Action from U.S. Appl. No. 15/642,074, dated Oct. 19, 2018.
Notice of Allowance from U.S. Appl. No. 15/642,074, dated Apr. 10, 2019.
Rivard et al., U.S. Appl. No. 16/518,786, filed Jul. 22, 2019.
Non-Final Office Action from U.S. Appl. No. 16/518,786, dated Jun. 29, 2020.
Notice of Allowance from U.S. Appl. No. 16/518,786, dated Nov. 2, 2020.
Corrected Notice of Allowance from U.S. Appl. No. 16/518,786, dated Nov. 20, 2020.
Rivard et al., U.S. Appl. No. 17/180,526, filed Feb. 19, 2021.
Non-Final Office Action from U.S. Appl. No. 17/180,526, dated Jul. 25, 2022.
Final Office Action from U.S. Appl. No. 17/180,526, dated Jan. 23, 2023.
Non-Final Office Action from U.S. Appl. No. 17/180,526, dated Sep. 15, 2023.
Non-Final Office Action from U.S. Appl. No. 17/824,773, dated Feb. 16, 2023.
Final Office Action from U.S. Appl. No. 17/824,773, dated Sep. 27, 2023.
Rivard et al., U.S. Appl. No. 15/976,756, filed May 10, 2018.
Non-Final Office Action for U.S. Appl. No. 15/976,756, dated Jun. 27, 2019.
Notice of Allowance from U.S. Appl. No. 15/976,756, dated Oct. 4, 2019.
Rivard et al., U.S. Appl. No. 16/215,351, filed Dec. 10, 2018.
Final Office Action from U.S. Appl. No. 16/395,792, dated Feb. 24, 2021.
Non-Final Office Action from U.S. Appl. No. 16/395,792, dated Nov. 9, 2021.
Final Office Action from U.S. Appl. No. 16/395,792, dated Apr. 26, 2022.
Feder et al., U.S. Appl. No. 17/953,238, filed Sep. 26, 2022.
Non-Final Office Action from U.S. Appl. No. 17/953,238, dated Jul. 5, 2023.
Rivard et al., U.S. Appl. No. 17/063,487, filed Oct. 5, 2020.
Non-Final Office Action from U.S. Appl. No. 17/063,487, dated Oct. 14, 2022.
Final Office Action from U.S. Appl. No. 17/063,487, dated May 19, 2023.
Rivard et al., U.S. Appl. No. 16/584,486, filed Sep. 26, 2019.
Notice of Allowance from U.S. Appl. No. 16/584,486, dated Oct. 21, 2020.
Corrected Notice of Allowance from U.S. Appl. No. 16/584,486, dated Nov. 18, 2020.
Corrected Notice of Allowance from U.S. Appl. No. 16/584,486, dated Dec. 24, 2020.
Rivard et al., U.S. Appl. No. 17/163,086, filed Jan. 29, 2021.
Non-Final Office Action for U.S. Appl. No. 17/163,086, dated Oct. 13, 2021.
Notice of Allowance from U.S. Appl. No. 17/163,086, dated Mar. 21, 2022.
Rivard et al., U.S. Appl. No. 17/857,906, filed Jul. 5, 2022.
Non-Final Office Action for U.S. Appl. No. 17/857,906, dated Feb. 9, 2023.
Final Office Action for U.S. Appl. No. 17/857,906, dated Sep. 11, 2023.
Rivard et al., U.S. Appl. No. 16/931,286, filed Jul. 16, 2020.
Non-Final Office Action for U.S. Appl. No. 16/931,286, dated May 11, 2021.
Final Office Action for U.S. Appl. No. 16/931,286, dated Dec. 29, 2021.
Notice of Allowance from U.S. Appl. No. 16/931,286, dated Jun. 7, 2022.
Rivard et al., U.S. Appl. No. 17/945,939, filed Sep. 15, 2022.
Non-Final Office Action for U.S. Appl. No. 17/945,939, dated Mar. 20, 2023.
Final Office Action for U.S. Appl. No. 17/945,939, dated Oct. 27, 2023.
Feder et al., U.S. Appl. No. 17/694,472, filed Mar. 14, 2022.

(56) References Cited

OTHER PUBLICATIONS

Non-Final Office Action from U.S. Appl. No. 17/694,472, dated May 29, 2024.
International Search Report and Written Opinion from International Application No. PCT/US15/59348, dated Feb. 2, 2016.
International Search Report and Written Opinion from International Application No. PCT/US15/59097, dated Jan. 4, 2016.
International Search Report and Written Opinion from International Application No. PCT/US2015/060476, dated Feb. 10, 2016.
International Search Report and Written Opinion from International Application No. PCT/US2015/058895, dated Apr. 11, 2016.
International Search Report and Written Opinion from International Application No. PCT/US2015/059103, dated Dec. 21, 2015.
International Search Report and Written Opinion from International Application No. PCT/US2015/059105, dated Jul. 26, 2016.
International Search Report and Written Opinion from International Application No. PCT/US2015/058896, dated Aug. 26, 2016.
International Search Report and Written Opinion from International Application No. PCT/US2015/058891, dated Aug. 26, 2016.
International Search Report and Written Opinion from International Application No. PCT/US2016/050011, dated Nov. 10, 2016.
Wan et al., "CMOS Image Sensors With Multi-Bucket Pixels for Computational Photography," IEEE Journal of Solid-State Circuits, vol. 47, No. 4, Apr. 2012, pp. 1031-1042.
Chatterjee et al., "Clustering-Based Denoising With Locally Learned Dictionaries," IEEE Transactions on Image Processing, vol. 18, No. 7, Jul. 2009, pp. 1-14.
Burger et al., "Image denoising: Can plain Neural Networks compete with BM3D?," Computer Vision and Pattern Recognition (CVPR), IEEE, 2012, pp. 4321-4328.
Kervann et al., "Optimal Spatial Adaptation for Patch-Based Image Denoising," IEEE Transactions on Image Processing, vol. 15, No. 10, Oct. 2006, pp. 2866-2878.
Foi et al., "Practical Poissonian-Gaussian noise modeling and fitting for single-image raw-data," IEEE Transactions, 2007, pp. 1-18.
International Search Report and Written Opinion from PCT Application No. PCT/US17/39946, dated Sep. 25, 2017.
European Office Communication and Exam Report from European Application No. 15856814.7, dated Dec. 14, 2017.
European Office Communication and Exam Report from European Application No. 15856267.8, dated Dec. 12, 2017.
European Office Communication and Exam Report from European Application No. 15856710.7, dated Dec. 21, 2017.
European Office Communication and Exam Report from European Application No. 15857675.1, dated Dec. 21, 2017.
European Office Communication and Exam Report from European Application No. 15856212.4, dated Dec. 15, 2017.
European Office Communication and Exam Report from European Application No. 15857386.5, dated Jan. 11, 2018.
Kim et al., "A CMOS Image Sensor Based on Unified Pixel Architecture With Time-Division Multiplexing Scheme for Color and Depth Image Acquisition," IEEE Journal of Solid-State Circuits, vol. 47, No. 11, Nov. 2012, pp. 2834-2845.
European Office Communication and Exam Report from European Application No. 15857748.6, dated Jan. 10, 2018.
Notice of Allowance from U.S. Appl. No. 19/015,114, dated Mar. 24, 2025.
Non-Final Office Action from U.S. Appl. No. 18/388,158 dated May 19, 2025.

SYSTEM AND METHOD FOR GENERATING A DIGITAL IMAGE

RELATED APPLICATIONS

The present application is a continuation of U.S. patent application Ser. No. 19/015,114 filed Jan. 9, 2025, titled "SYSTEM AND METHOD FOR GENERATING A DIGITAL IMAGE," which in turn is a continuation in part, by virtue of the removal of subject matter (that was either expressly disclosed or incorporated by reference in one or more priority applications), with the purpose of claiming priority to and including herewith the full express and incorporated disclosure of U.S. patent application Ser. No. 14/543,782 filed Nov. 17, 2014, now U.S. Pat. No. 9,509,919 issued Nov. 29, 2016, titled "SYSTEM AND METHOD FOR GENERATING A DIGITAL IMAGE," which, at the time of the aforementioned Nov. 17, 2014 filing, incorporated by reference U.S. patent application Ser. No. 14/178,305, filed Feb. 12, 2014 (abandoned in favor of the above application), entitled "SYSTEM AND METHOD FOR GENERATING A DIGITAL IMAGE" (which is incorporated by reference in its entirety).

To accomplish the above, U.S. patent application Ser. No. 19/015,114 is a continuation in part of, and claims priority to, U.S. patent application Ser. No. 18/388,158, entitled "SYSTEM AND METHOD FOR GENERATING A DIGITAL IMAGE," filed Nov. 8, 2023, which is a continuation-in-part of, and claims priority to U.S. patent application Ser. No. 17/868,536 (abandoned in favor of the above application), entitled "SYSTEM AND METHOD FOR GENERATING A DIGITAL IMAGE," filed Jul. 19, 2022, which in turn is a continuation of and claims priority to U.S. patent application Ser. No. 17/518,473 (abandoned in favor of the above application), filed Nov. 3, 2021, titled "SYSTEM AND METHOD FOR GENERATING A DIGITAL IMAGE," which in turn is a continuation of and claims priority to U.S. patent application Ser. No. 16/677,385, now U.S. Pat. No. 11,394,895, filed Nov. 7, 2019, titled "SYSTEM AND METHOD FOR GENERATING A DIGITAL IMAGE," which in turn is a continuation of and claims priority to U.S. patent application Ser. No. 16/211,931, now U.S. Pat. No. 10,491,834, filed Dec. 6, 2018, titled "SYSTEM AND METHOD FOR GENERATING A DIGITAL IMAGE," which in turn is a continuation of and claims priority to U.S. patent application Ser. No. 15/863,785, filed Jan. 5, 2018, now U.S. Pat. No. 10,178,323 titled "SYSTEM AND METHOD FOR GENERATING A DIGITAL IMAGE," which in turn is a continuation of and claims priority to U.S. patent application Ser. No. 15/289,039, filed Oct. 7, 2016, now U.S. Pat. No. 9,894,289, titled "SYSTEM AND METHOD FOR GENERATING A DIGITAL IMAGE," which in turn is a continuation of and claims priority to U.S. patent application Ser. No. 14/543,782, filed Nov. 17, 2014, now U.S. Pat. No. 9,509,919, titled "SYSTEM AND METHOD FOR GENERATING A DIGITAL IMAGE."

FIELD OF THE INVENTION

The present invention relates generally to digital photographic systems, and more specifically to a system, method, and computer program product for generating a digital image.

BACKGROUND

Traditional digital photography systems are inherently limited by the dynamic range of a capturing image sensor. One solution to such limitation is the use of high dynamic-range (HDR) photography. HDR photography involves capturing multiple exposures of a same scene, where each of the exposures is exposed differently, and then merging the multiple captures to create an image with a larger dynamic range.

SUMMARY

A system, method, and computer program product for generating a resulting image from a set of images is disclosed. The method comprises receiving an image set that includes a first image of a photographic scene based on a first set of sampling parameters and a second image of the photographic scene based on a second set of sampling parameters, and generating a resulting image based on the first image and the second image according to depth values in a selection depth map. Each distinct depth value in the selection depth map corresponds to a different image in the image set.

DETAILED DESCRIPTION

Figure 1A:
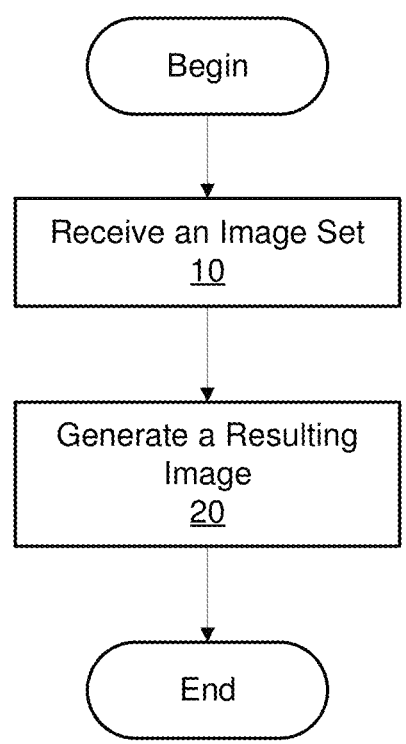
FIG. 1A illustrates a flow chart of a method for generating a resulting image from an image set comprising two or more images sampled under ambient illumination and/or strobe illumination, in accordance with one embodiment.

Embodiments of the present invention enable a digital photographic system to generate a digital image (or simply "image") of a photographic scene subjected to strobe illumination. Exemplary digital photographic systems include, without limitation, digital cameras and mobile devices such as smart phones that are configured to include a digital camera module and a strobe unit. A given photographic scene is a portion of an overall scene sampled by the digital photographic system.

Two or more images are sequentially sampled by the digital photographic system to generate an image set. Each image within the image set is generated in conjunction with different strobe intensity, different exposure parameters, or a combination thereof. Exposure parameters may include sensor sensitivity ("ISO" parameter), exposure time (shutter speed), aperture size (f-stop), and focus distance. In certain embodiments, one or more exposure parameters, such as aperture size, may be constant and not subject to determination. For example, aperture size may be constant based on a given lens design associated with the digital photographic system. At least two of the images comprising the image set are sampled in conjunction with a strobe unit, such as a light-emitting diode (LED) strobe unit, configured to contribute illumination to the photographic scene.

In one embodiment, exposure parameters are initially determined and held constant for each image in the image set. The exposure parameters may be initially determined based on ambient lighting conditions. If insufficient ambient lighting is available, such as for extremely dark scenes, then exposure parameters may be determined based on a mid-range strobe intensity. For example, mid-range strobe intensity may be selected as fifty-percent of a maximum strobe intensity for the strobe unit. The strobe unit is configured to modulate strobe intensity to provide a range of illumination contribution among the images within the image set. For example, the image set may comprise ten images, each with monotonically increasing illumination from the strobe unit. The first of ten images within the image set may be relatively under-exposed with respect to strobe illumination, while the tenth image may be over-exposed with respect to strobe illumination. However, one or more images between the first image and the tenth image will likely be appropriately-exposed with respect to strobe illumination. An image with appropriate illumination may be selected automatically or manually selected by a user. The image with appropriate illumination is then a resulting image for the photographic scene.

In another embodiment, images within the image set are sampled according to varying exposure parameters while the strobe unit is enabled to illuminate the photographic scene. One or more of the exposure parameters may be varied among sequential images comprising the image set. For example, exposure time may be increased (or decreased) among sequential images within the image set. Alternatively, sensor sensitivity may be increased (or decreased) among sequential images within the image set. Furthermore, two or more of the exposure parameters may be varied together among sequential images comprising the image set. For example, exposure time may be decreased while sensor sensitivity is increased. The net effect may preserve overall exposure, while decreasing blur as strobe intensity increases and exposure time decreases. As strobe intensity increases, sensor sensitivity may be increased. Because subject illumination in the photographic scene increases as the strobe intensity increases, increasing sensor sensitivity in sequential images will not likely introduce substantial additional image noise.

Sequential images may be sampled rapidly relative to motion and changes within the photographic scene. For example, the sequential images may be sampled at a rate of at least five sampled per second. In high performance systems, the images may be sampled at greater than fifty samples per second. With an inter-image time of less than two-hundred milliseconds, each image within the image set will depict substantially identical subject matter in common photographic scenarios. In one embodiment, the strobe unit is configured to modulate strobe intensity in time-synchronization with respect to image sampling. For example, the strobe unit may be configured to maintain a specified first strobe intensity during an exposure time for a first image in the image set and maintain a second strobe intensity during an exposure time of a second image in the image set. A transition from the first strobe intensity to the second strobe intensity is synchronized in time with completion of sampling the first image and initiating sampling of the second image.

In one embodiment, an image is selected from the image set based on exposure metrics generated for each image within the image set. In another embodiment, an image is selected by a user. An image may be recommended to the user based on the exposure metrics, but the user may select a different image based on individual choice. The user may view each image in the image set and select the image through a viewer system, configured to present the image set as a sequence of images that may be browsed using a continuous position control, such as a slider control.

FIG. 1A illustrates a flow chart of a method 1 for generating a resulting image from an image set comprising two or more images sampled under ambient illumination and/or strobe illumination, in accordance with one embodiment. Although method 1 is described in conjunction with the systems of FIGS. 2A-3B, persons of ordinary skill in the art will understand that any system that performs method 1 is within the scope and spirit of embodiments of the present invention. In one embodiment, a digital photographic system, such as digital photographic system 300 of FIG. 3A, is configured to perform method 1. The digital photographic system 300 may be implemented within a digital camera, such as digital camera 202 of FIG. 2A, or a mobile device, such as mobile device 204 of FIG. 2B.

Method 1 begins at step 10, where the digital photographic system receives an image set. The image set may include a plurality of images including at least a first image and a second image. In one embodiment, the first image may be captured by the digital photographic system based on a first set of sampling parameters, and the second image may be captured by the digital photographic system based on a second set of sampling parameters. The set of sampling parameters may include, but is not limited to, a shutter speed, an aperture setting, a strobe setting (i.e., a flash setting), a strobe intensity, an image sensor sensitivity (e.g., ISO setting), and the like. The images in the image set may include one or more images captured with ambient light (i.e., without a flash) and/or one or more images captured with strobe illumination (i.e., with a flash).

At step 20, a resulting image is generated based on the first image and the second image according to depth values in a selection depth map. Each distinct depth value in the selection depth map corresponds to a different image in the image set. For example, a first image captured with ambient light may correspond to a minimum value (e.g., distinct value of 0) in the selection depth map. A second image captured with strobe illumination may correspond to a higher value (e.g., distinct value of 1) in the selection depth map. Each different image may be assigned to a distinct depth. Additional images captured with strobe illumination may correspond to even higher distinct values in the selection depth map and so forth. The image set may consist entirely of images captured with ambient illumination (e.g., images captured without flash but with increasing exposure time/decreasing shutter speed, etc.), entirely of images captured with strobe illumination (e.g., images captured with increasing strobe intensity, etc.), or some combination of the two. Exemplary image sets may include tens or hundreds of images. Other image sets may include just two images, or more than two images.

As used herein, images captured with ambient illumination may comprise images captured while a strobe unit is disabled. In contrast, images captured with strobe illumination may comprise images captured while a strobe unit is enabled for at least a portion of the exposure time period such that the captured image data includes color information that includes light from the strobe unit reflected off at least one object in the photographic scene.

In one embodiment, the selection depth map includes a two-dimensional (2D) array of depth values and a location of a particular depth value in the 2D array corresponds to a particular pixel in the resulting image. In other words, the selection depth map may include an array having the same number of elements as the resolution of the images in the image set. The array may have a number of rows equal to the vertical resolution of the images in the image set and a number of columns equal to the horizontal resolution of the images in the image set.

Alternatively, the array may have fewer elements than the resolution of each image in the image set and a particular depth value for a pixel in the resulting image is interpolated from elements of the array. For example a particular depth value may be calculated using a bilinear interpolation of array elements.

In another embodiment, the resulting image may be displayed in a user interface associated with a viewer application. For example, a digital photographic system may include an LCD display and a viewer application configured to display a user interface on the LCD display. The viewer application may display a resulting image and enable a user to modify the selection depth map to blend a plurality of images in the image set to generate the resulting image. In one embodiment, the viewer application may detect user input associated with the user interface that indicates a selection path within the resulting image. For example, the user may use an input device such as a mouse or stylus to draw a selection path over the resulting image. Alternatively, if the display device includes a touch-sensitive interface, the user may use touch input or multi-touch input to draw the selection path over the resulting image. The selection path may comprise a set of points relative to the pixel locations of the resulting image. The set of points may be connected to determine a plurality of pixels that intersect with the selection path. The selection path may intersect the same pixel more than once and may cross itself based on the user input.

In one embodiment, a selection region is selected based on the selection path. For example, a surface that includes all points in the selection path may be selected as the selection region. The points may include all points covered by stroking a geometric shape, such as a circle, along the selection path. Further, in another embodiment, a source image in the set of images may be analyzed to find edges in the source image. Any technically feasible edge detection algorithm may be used to find edges in the source image. Once edges are detected in the source image, a surface that includes all points in the selection path may be selected as the selection region, wherein the surface edges correspond to the predetermined edges in the source image. In one embodiment, a nearest edge is selected for each point in the selection path to generate a set of nearest edges in the source image. The set of nearest edges are then analyzed to determine a closed surface that includes all of the edges in the set of nearest edges, where the closed surface is then selected as the selection region. Alternatively, the closed surface may define a selection affinity boundary with a tapering region of influence.

Depth values in the selection depth map corresponding to the selection region are then adjusted based on the selection path. For example, in one embodiment, a depth value for a particular pixel is incremented each time the selection path overlaps with that pixel. In other words, as a user draws the selection path over the resulting image, the depth values in the selection depth map will be accumulated based on the intersection of the selection path with those pixels in the resulting image. In another embodiment, depth values in the selection depth map corresponding to the selection region based on a tapering region of influence around the selection path. In other words, a window function may increase (or decrease) depth values for pixels close to the selection path, but not intersected by the selection path, as well as pixels intersected by the selection path. The amount that a depth value is incremented (or decremented) may be based on the distance of that pixel from the selection path, with pixels closer to or intersected by the selection path being incremented by a greater amount than pixels further away from the selection path. Such adjusting of the selection depth map may be visualized similar to an airbrush tool in a Paint program. In such embodiments, the depth values may be incremented by fractional depth values that indicate a blend (e.g., alpha blend, etc.) between two source images in the image set. In one input mode, depth values are increased, while in another input mode, depth values are decreased.

Figure 1B:
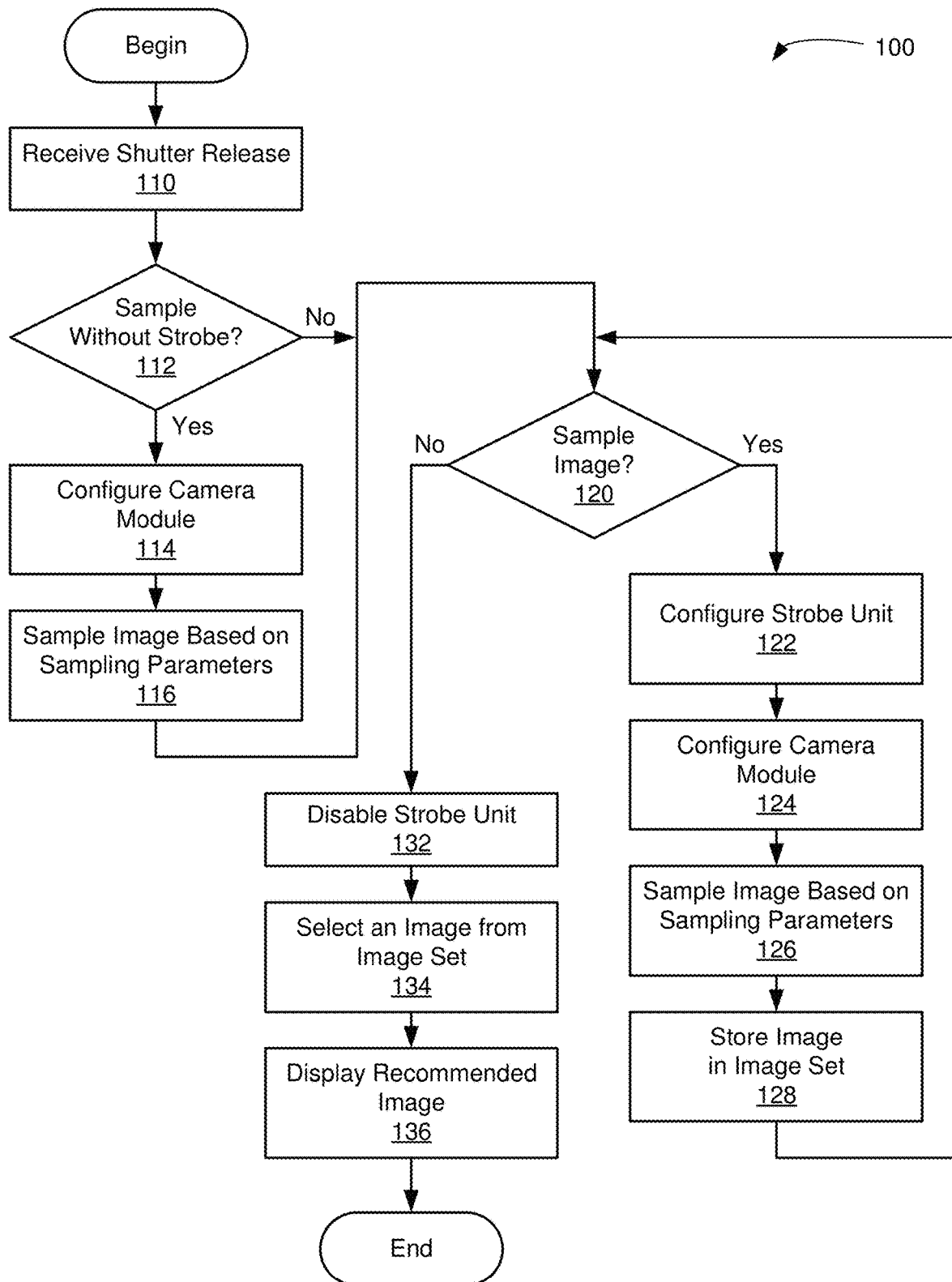
FIG. 1B illustrates a flow chart of a method for generating an image set comprising two or more images sampled under strobe illumination, in accordance with one embodiment.

FIG. 1B illustrates a flow chart of a method 100 for generating an image set comprising two or more images sampled under strobe illumination, in accordance with one embodiment. Although method 100 is described in conjunction with the systems of FIGS. 2A-3B, persons of ordinary skill in the art will understand that any system that performs method 100 is within the scope and spirit of embodiments of the present invention. In one embodiment, a digital photographic system, such as digital photographic system 300 of FIG. 3A, is configured to perform method 100. The digital photographic system 300 may be implemented within a digital camera, such as digital camera 202 of FIG. 2A, or a mobile device, such as mobile device 204 of FIG. 2B.

Method 100 begins in step 110, where the digital photographic system receives a shutter release command. The shutter release command may be generated explicitly by a user pressing a physical button or virtual button, or the shutter release command may be generated by a timer, motion sensor, voice control, remote control, or any other technically feasible mechanism.

If, in step 112, one or more images should be sampled without strobe illumination, then method 100 proceeds to step 114. In certain configurations, one or more images may be sampled without strobe illumination and added to the image set. An image sampled without strobe illumination is referred to herein as an ambient image. For certain photographic scenes, an ambient image may represent a better choice for a resulting image than other images within the image set sampled with strobe illumination. In certain implementations, whether to sample an ambient image is a design decision that applies to all image sets. In other implementations, a decision to sample an ambient image is made by a user and indicated through a user interface (UI) control. In still other implementations, a decision to sample an ambient image is made automatically based on photographic scene illumination conditions; for example, if the photographic scene is sufficiently dark, then no ambient image is sampled.

In step 114, the digital photographic system configures a camera module, such as camera module 330, to sample an ambient image according to ambient illumination conditions. Configuring the camera module may include determining exposure parameters for a current photographic scene and transmitting the exposure parameters to the camera module. In certain embodiments, the camera module determines exposure parameters for the photographic scene, such as in response to a command to meter a scene. Sampling parameters include the exposure parameters and strobe parameters, which include strobe intensity and may include strobe color. The strobe unit is disabled in this step and corresponding strobe parameters may be set to reflect that the strobe unit is disabled.

In step 116, the digital photographic system samples one or more ambient images based on the sampling parameters. In one embodiment, the one or more ambient images are sampled in conjunction with an exposure parameter sweep, such as an exposure time sweep. The one or more ambient images may be stored within the image set or combined to generate one or more high-dynamic range (HDR) images, which may be stored within the image set. In certain embodiments, the one or more HDR images are stored within the image set, but the one or more ambient images are not.

Returning to step 112, if one or more images should not be sampled without strobe illumination, then the method 100 proceeds to step 120.

If, in step 120, an image should be sampled, then the method 100 proceeds to step 122. A given image set should comprise at least two images sampled with strobe illumination. An image should be sampled if another image is needed to complete a given image set. In one embodiment, the image set comprises a fixed number of images, and another image should be sampled until the fixed number of images has been sampled. In other embodiments, the image set comprises a variable number of images, the number of images being determined adaptively based on exposure of sampled images comprising the image set. For example, the number of images may continue to increase, up to a maximum number of images, until an image having proper exposure is sampled in conjunction with varying the sampling parameters. Once the image having proper exposure is sampled, another image need not be sampled.

In step 122, the digital photographic system configures the strobe unit based on strobe parameters. Configuring the strobe unit may include enabling the strobe unit to generate illumination according to the strobe parameters. The strobe parameters specify a strobe intensity function that defines strobe intensity as a function corresponding to the images within the image set. In one embodiment, the strobe intensity function defines a predetermined strobe intensity for sequential images within the image set. In another embodiment, the strobe intensity function adaptively generates strobe intensity corresponding to a given image based on at least one previously sampled image or a previously determined exposure.

In certain embodiments, the strobe parameters specify a strobe illumination color, which may be specified as a ratio of red, green, and blue intensity, a color temperature, a color hue, or any other technically feasible color specification. When enabled, the strobe unit is configured to generate strobe illumination according to the specified strobe illumination color. In one embodiment, an ambient illumination color measurement is performed to determine which color to specify as a strobe illumination color. Any technically feasible technique may be implemented to perform the ambient illumination color measurement, including, without limitation, scene color averaging techniques, illuminator color detection techniques, and the like. Measurement data comprising image frames may be collected by a digital camera module. By causing the strobe unit to generate strobe illumination that is consistent in color with ambient illumination, subjects within the photographic scene that are substantially illuminated by the strobe illumination may appear to have proper and consistent color relative to other objects in the scene that are instead substantially illuminated by ambient illumination sources.

In step 124, the digital photographic system configures the camera module to be ready to sample an image according to exposure parameters, which may be determined once and applied to each image within the image set sampled with strobe illumination, or determined per image within the image set based on an exposure parameter function for the image set. Configuring the camera module may include writing registers within the camera module according to the exposure parameters.

The digital camera module includes an image sensor with a sensor sensitivity ranging from low-sensitivity (an ISO value of 100 or less) for generally bright photographic scenes to high-sensitivity (an ISO value of 1600 or more) for generally dark photographic scenes. Exposure time may range from one millisecond or less to more than a second. Determining exposure parameters typically comprises finding a combination of at least sensor sensitivity and exposure time that is estimated to be appropriate for a given intensity distribution, absolute overall scene brightness, or any combination thereof. The camera module may adaptively sample multiple image frames in finding the combination. As sensitivity is increased and/or exposure time is increased, image noise also increases. Image quality degradation due to noise typically establishes a combination of maximum exposure time and maximum sensitivity that should not be exceeded. If sufficient ambient illumination is not available, the digital camera module is unable to sample a usable image, and in some cases may simply generate a dark noise field. A certain implementation or design of a digital camera module may have better low-light performance than another implementation or design, and therefore a determination of whether sufficient ambient illumination is available is implementation-dependent.

In one embodiment, the exposure parameters are determined based on ambient illumination. Any technically feasible technique may be implemented to determine the exposure parameters. Persons skilled in the art will understand that such techniques are well-known in the art and, in certain scenarios, depend on a specific implementation of a digital photographic system.

In another embodiment, the exposure parameters are determined based on ambient illumination if sufficient ambient illumination is available or determined based on metering strobe illumination if sufficient ambient illumination is not available. The metering strobe illumination is provided by the strobe unit (or a similar unit), configured to provide mid-range strobe intensity while the exposure parameters are being determined. Alternatively, the strobe unit may be configured to provide a range of strobe intensity to provide a larger search space for determining exposure parameters. Any technically feasible technique may be implemented to determine whether sufficient ambient illumination is available, including, but not limited to, techniques that are associated with a particular implementation of a given digital camera module.

In step 126, the digital photographic system causes the digital camera module to sample an image based on current sampling parameters. In certain embodiments, a new set of sampling parameters may be determined based on the sampled image to be applied to sampling a subsequent image. For example, if the sampled image is under exposed, the new set of sampling parameters may provide for increased exposure time or an increased ISO value.

In step 128, the digital photographic system stores the image in the image set. The image set may be stored within NV memory 316, volatile memory 318, or the image set may be stored to a remote storage system, such as through wireless unit 340. Each image within the image set may be referred to herein as a source image.

Returning to step 120, if the last image for the image set has been sampled, then the method 100 proceeds to step 132, where the digital photographic system disables the strobe unit. In step 134, the digital photographic system evaluates images comprising the image set to select a recommended image from the image set having appropriate exposure. In one embodiment, step 134 comprises method 102 of FIG. 1C. In step 136, the digital photographic system displays the recommended image. As discussed below in FIGS. 5A through 5C, a user may select a different image within the image set than the recommended image.

Figure 1C:
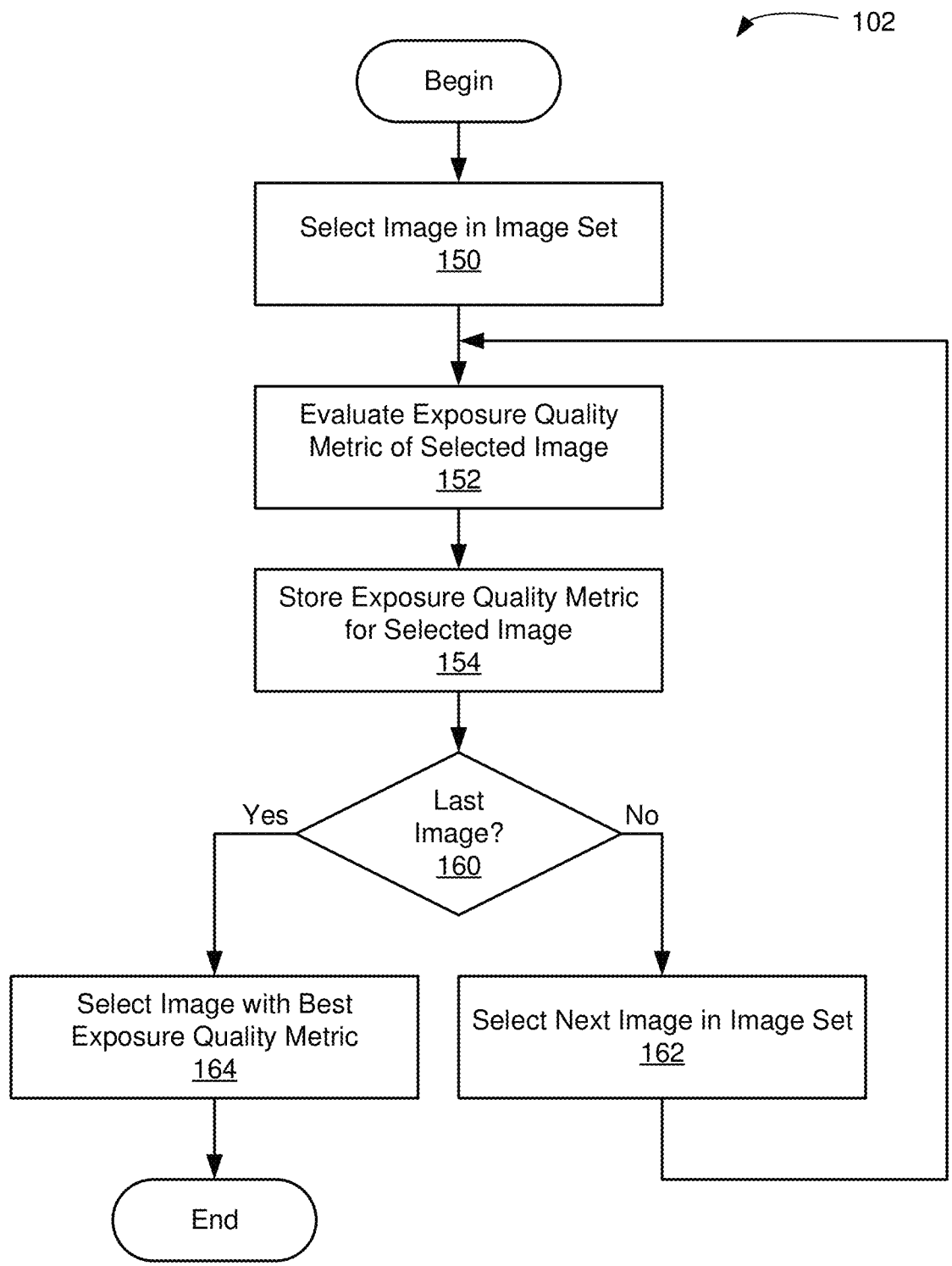
FIG. 1C illustrates a flow chart of a method for selecting one image from an image set based on exposure quality, in accordance with one embodiment.

In an alternative embodiment, an exposure quality metric, described below in FIG. 1C, is evaluated and stored in step 128 for a corresponding image sampled in step 126. In step 134, a recommended image is selected from the image set based on at least one exposure quality metric associated with each image in the image set. For example, if the exposure quality metric is defined to be a cost function that assigns an increasing cost penalty to increasingly undesirable exposures, then the recommended image is selected to have the lowest corresponding cost penalty (exposure quality metric) among the images in the image set.

FIG. 1C illustrates a flow chart of a method 102 for selecting one image from an image set based on exposure quality, in accordance with one embodiment. Although method 102 is described in conjunction with the systems of FIGS. 2A-3B, persons of ordinary skill in the art will understand that any system that performs method 102 is within the scope and spirit of embodiments of the present invention. In one embodiment, a digital photographic system, such as digital photographic system 300 of FIG. 3A, is configured to perform method 102. The digital photographic system may be implemented within a digital camera, such as digital camera 202 of FIG. 2A, or a mobile device, such as mobile device 204 of FIG. 2B.

Method 102 begins in step 150, where the digital photographic system selects an image in the image set of FIG. 1C. In one embodiment, the image set is organized as an ordered sequence of images, and the selected image comprises a first image of the ordered sequence of images. In step 152, the digital photographic system evaluates exposure quality of the selected image. In one embodiment, a cost function that assigns a high cost penalty to over-exposed pixels within the selected image may be implemented to evaluate an exposure quality metric. The cost function may assign a constant cost penalty to each over-exposed pixel or a progressively increasing cost function based on a count for over-exposed pixels within the selected image. Any other technically feasible technique for evaluating an exposure quality metric may also be implemented without departing the scope and spirit of the present invention.

In step 154, the digital photographic system stores the exposure quality metric associated with the selected image. If, in step 160, the selected image is not the last image within the image set to be selected and evaluated, then the method proceeds to step 162, where the digital photographic system selects a next image in the image set before proceeding back to step 152.

Returning to step 160, if the selected image is the last image within the image set to be selected and evaluated, then the method proceeds to step 164, where the digital photographic system selects an image within the image set having the best exposure quality metric. For example, if the exposure quality metric is defined to be a cost function configured to assign an increasingly higher cost to increasingly undesirable exposures, then an image is selected to have the lowest corresponding cost (exposure quality metric) among the images in the image set. The selected image in this step may comprise a recommended image.

Figure 2A:
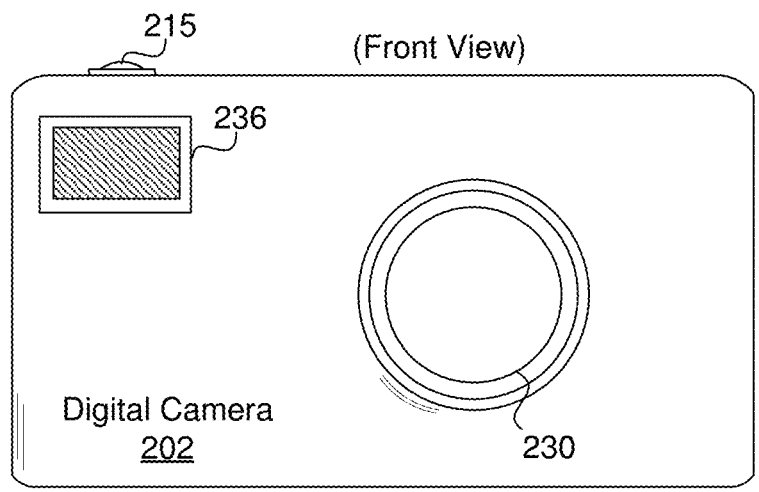
FIG. 2A illustrates a digital camera, configured to implement one or more aspects of the present invention.
Figure 3A:
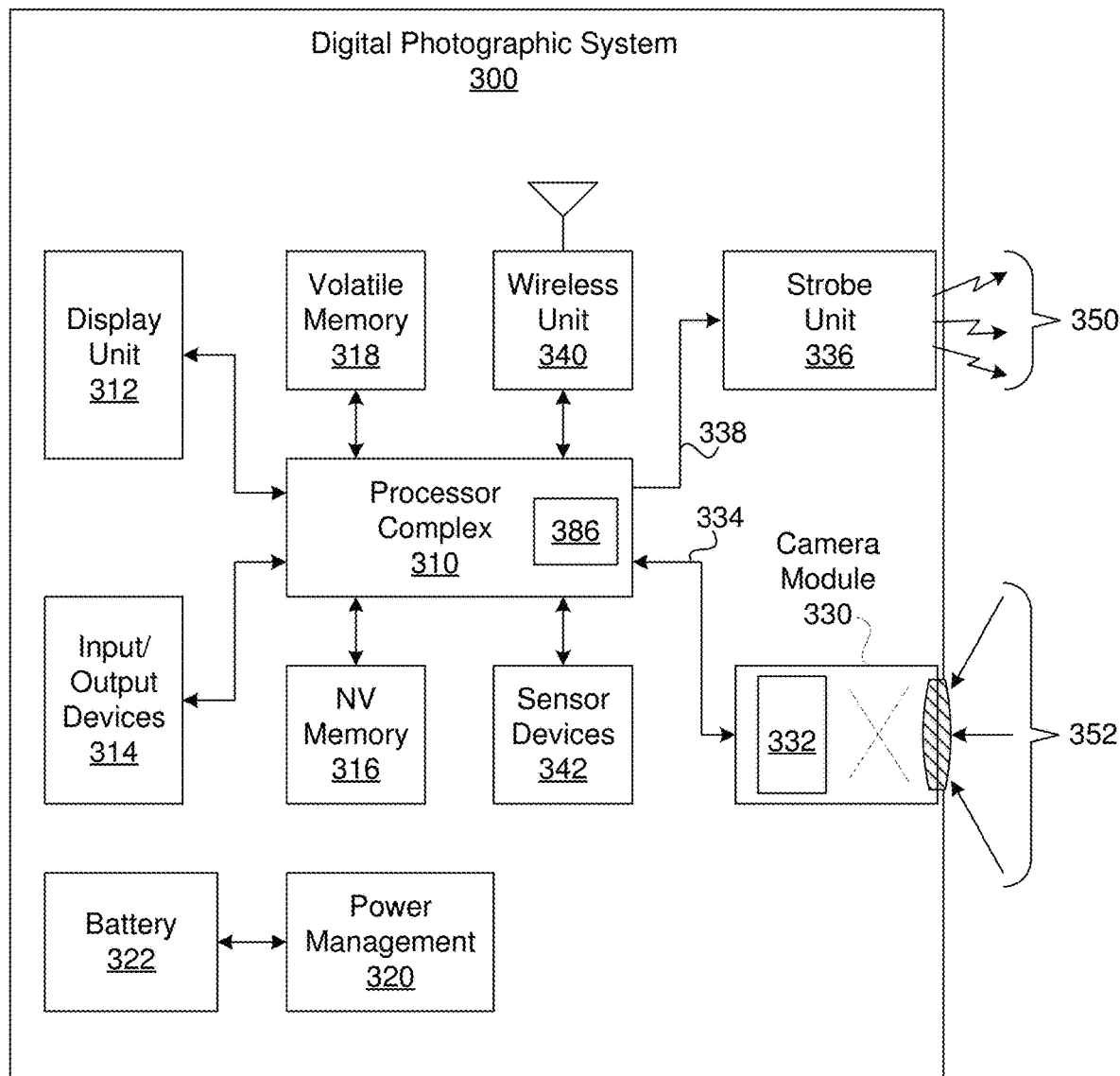
FIG. 3A illustrates a digital photographic system, configured to implement one or more aspects of the present invention.

FIG. 2A illustrates a digital camera 202, configured to implement one or more aspects of the present invention. Digital camera 202 includes a digital photographic system, such as digital photographic system 300 of FIG. 3A, configured to generate an image set by sampling a photographic scene as described in conjunction with method 100 of FIG. 1B. A digital camera unit within the digital photographic system is coupled to a lens 230, through which each image comprising the image set is sampled.

Digital camera 202 includes a strobe unit 236, and may include a shutter release button 215 for triggering a photographic sample event, whereby digital camera 202 samples two or more images comprising an image set. Any other technically feasible shutter release command may trigger the photographic sample event, such as a timer trigger or remote control receiver configured to generate a shutter release command. Embodiments of the present invention advantageously enable a user to photograph a scene using a single shutter release command, and subsequently select an image sampled according to a strobe intensity that best satisfies user aesthetic requirements for the photographic scene. In contrast, a conventional digital camera typically samples a single image illuminated by strobe illumination per shutter release trigger, commonly forcing the user to either manually photograph the photographic scene multiple times, or to suffer poor image quality resulting over-exposure or under-exposure.

Figure 2B:
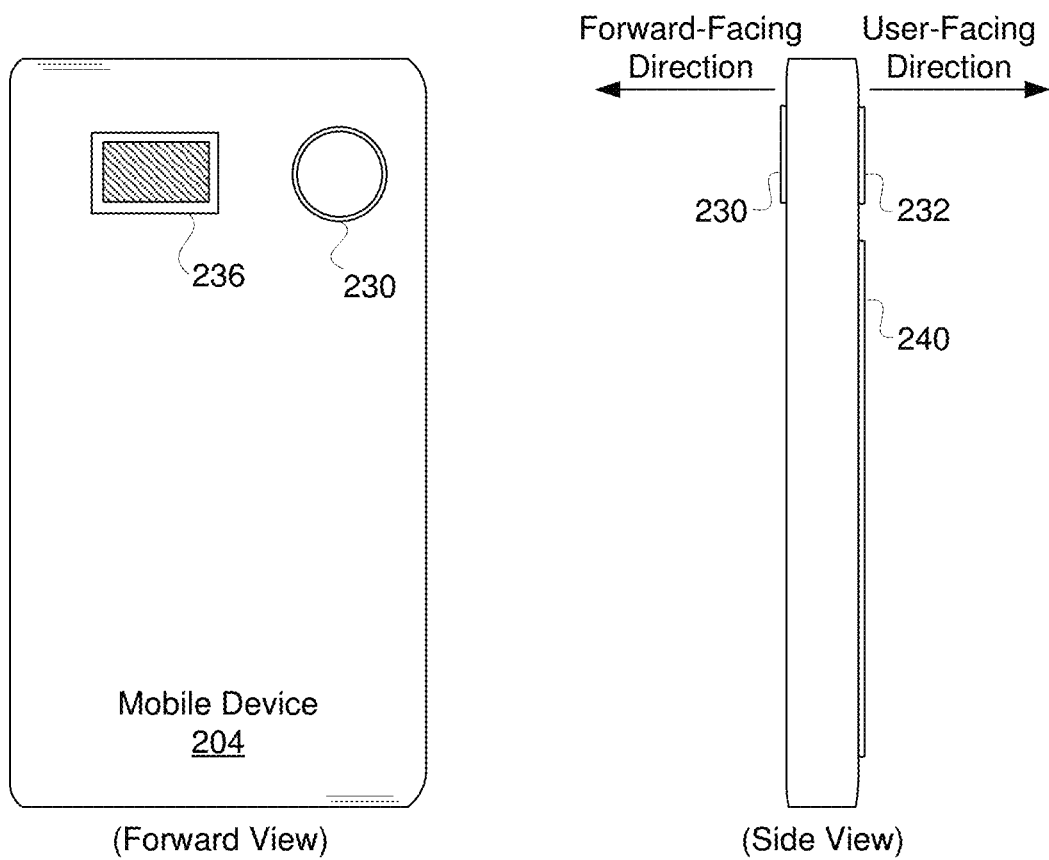
FIG. 2B illustrates a mobile device, configured to implement one or more aspects of the present invention.

FIG. 2B illustrates a mobile device 204, configured to implement one or more aspects of the present invention. Mobile device 204 includes a digital photographic system, such as digital photographic system 300 of FIG. 3A, configured to generate an image set by sampling a scene as described in conjunction with method 100 of FIG. 1B. A shutter release command may be generated through a mechanical button or a virtual button, which may be activated by a touch gesture on a touch entry display system 240 within mobile device 204.

In one embodiment, the touch entry display system 240 is disposed on the opposite side of mobile device 204 relative to the lens 230. In certain embodiments, the mobile device 204 includes a user-facing digital camera coupled to lens 232 and a user-facing strobe unit. The user-facing digital camera and user-facing strobe unit are configured to sample an image set in accordance with method 100 of FIG. 1B.

FIG. 3A illustrates a digital photographic system 300, configured to implement one or more aspects of the present invention. Digital photographic system 300 includes a processor complex 310 coupled to a camera module 330 and a strobe unit 336. Digital photographic system 300 may also include, without limitation, a display unit 312, a set of input/output devices 314, non-volatile memory 316, volatile memory 318, a wireless unit 340, and sensor devices 342, each coupled to processor complex 310. In one embodiment, a power management subsystem 320 is configured to generate appropriate power supply voltages for each electrical load element within digital photographic system 300. A battery 322 may be configured to supply electrical energy to power management subsystem 320. Battery 322 may implement any technically feasible energy storage system, including primary or rechargeable battery technologies. In one embodiment, lens 230 of FIGS. 2A and 2B is coupled to camera module 330, and strobe unit 236 comprises strobe unit 336.

In one embodiment, strobe unit 336 is integrated into digital photographic system 300 and configured to provide strobe illumination 350 during an image sample event performed by digital photographic system 300. In an alternative embodiment, strobe unit 336 is implemented as an independent device from digital photographic system 300 and configured to provide strobe illumination 350 during an image sample event performed by digital photographic system 300. Strobe unit 336 may comprise one or more LED devices. In certain embodiments, two or more strobe units are configured to synchronously generate strobe illumination in conjunction with sampling an image.

In one embodiment, strobe unit 336 is directed through a strobe control signal 338 to either emit strobe illumination 350 or not emit strobe illumination 350. The strobe control signal 338 may implement any technically feasible signal transmission protocol. Strobe control signal 338 may indicate a strobe parameter, such as strobe intensity or strobe color, for directing strobe unit 336 to generate a specified intensity and/or color of strobe illumination 350. As shown, strobe control signal 338 may be generated by processor complex 310. Alternatively, strobe control signal 338 may be generated by camera module 330 or by any other technically feasible system element.

In one usage scenario, strobe illumination 350 comprises at least a portion of overall illumination in a photographic scene being photographed by camera module 330. Optical scene information 352, which may include strobe illumination 350 reflected from objects in the photographic scene, is focused as an optical image onto an image sensor 332, within camera module 330. Image sensor 332 generates an electronic representation of the optical image. The electronic representation comprises spatial color intensity information, which may include different color intensity samples, such as for red, green, and blue light. The spatial color intensity information may also include samples for white light. Alternatively, the color intensity samples may include spatial color intensity information for cyan, magenta, and yellow light. Persons skilled in the art will recognize that other and further sets of spatial color intensity information may be implemented. The electronic representation is transmitted to processor complex 310 via interconnect 334, which may implement any technically feasible signal transmission protocol.

Input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, input/output devices 314 include a capacitive touch input surface coupled to display unit 312.

Non-volatile (NV) memory 316 is configured to store data when power is interrupted. In one embodiment, NV memory 316 comprises one or more flash memory devices. NV memory 316 may be configured to include programming instructions for execution by one or more processing units within processor complex 310. The programming instructions may implement, without limitation, an operating system (OS), UI modules, image processing and storage modules, one or more modules for sampling an image set through camera module 330, one or more modules for presenting the image set through display unit 312. The programming instructions may also implement one or more modules for merging images or portions of images within the image set, aligning at least portions of each image within the image set, or a combination thereof. One or more memory devices comprising NV memory 316 may be packaged as a module configured to be installed or removed by a user. In one embodiment, volatile memory 318 comprises dynamic random access memory (DRAM) configured to temporarily store programming instructions, image data such as data associated with an image set, and the like, accessed during the course of normal operation of digital photographic system 300.

Sensor devices 342 may include, without limitation, an accelerometer to detect motion and/or orientation, an electronic gyroscope to detect motion and/or orientation, a magnetic flux detector to detect orientation, a global positioning system (GPS) module to detect geographic position, or any combination thereof.

Wireless unit 340 may include one or more digital radios configured to send and receive digital data. In particular, wireless unit 340 may implement wireless standards known in the art as "WiFi" based on Institute for Electrical and Electronics Engineers (IEEE) standard 802.11, and may implement digital cellular telephony standards for data communication such as the well-known "3G" and "4G" suites of standards. Wireless unit 340 may further implement standards and protocols known in the art as LTE (long term evolution). In one embodiment, digital photographic system 300 is configured to transmit one or more digital photographs, sampled according to techniques taught herein, to an online or "cloud-based" photographic media service via wireless unit 340. The one or more digital photographs may reside within either NV memory 316 or volatile memory 318. In such a scenario, a user may possess credentials to access the online photographic media service and to transmit the one or more digital photographs for storage and presentation by the online photographic media service. The credentials may be stored or generated within digital photographic system 300 prior to transmission of the digital photographs. The online photographic media service may comprise a social networking service, photograph sharing service, or any other network-based service that provides storage and transmission of digital photographs. In certain embodiments, one or more digital photographs are generated by the online photographic media service based on an image set sampled according to techniques taught herein. In such embodiments, a user may upload source images comprising an image set for processing by the online photographic media service.

In one embodiment, digital photographic system 300 comprises a plurality of camera modules 330. Such an embodiment also includes at least one strobe unit 336 configured to illuminate a photographic scene, sampled as multiple views by the plurality of camera modules 330. The plurality of camera modules 330 may be configured to sample a wide angle view (greater than forty-five degrees of sweep among cameras) to generate a panoramic photograph. The plurality of camera modules 330 may also be configured to sample two or more narrow angle views (less than forty-five degrees of sweep among cameras) to generate a stereoscopic photograph.

Display unit 312 is configured to display a two-dimensional array of pixels to form an image for display. Display unit 312 may comprise a liquid-crystal display, an organic LED display, or any other technically feasible type of display. In certain embodiments, display unit 312 is able to display a narrower dynamic range of image intensity values than a complete range of intensity values sampled over a set of two or more images comprising the image set. Here, images comprising the image set may be merged according to any technically feasible HDR blending technique to generate a synthetic image for display within dynamic range constraints of display unit 312. In one embodiment, the limited dynamic range specifies an eight-bit per color channel binary representation of corresponding color intensities. In other embodiments, the limited dynamic range specifies a twelve-bit per color channel binary representation.

Figure 3B:
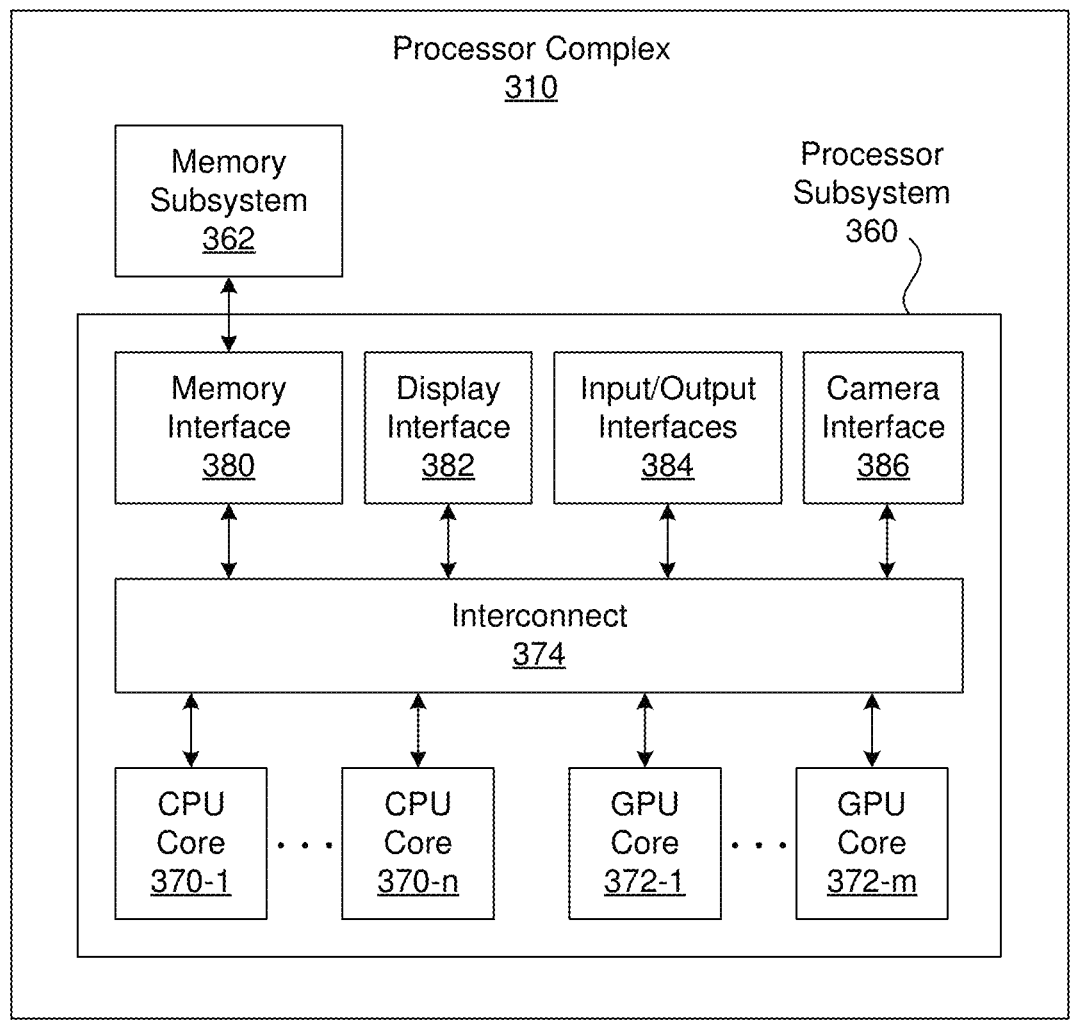
FIG. 3B illustrates a processor complex within the digital photographic system, in accordance with one embodiment.

FIG. 3B illustrates a processor complex 310 within digital photographic system 300 of FIG. 3A, according to one embodiment of the present invention. Processor complex 310 includes a processor subsystem 360 and may include a memory subsystem 362. In one embodiment, processor complex 310 comprises a system on a chip (SoC) device that implements processor subsystem 360, and memory subsystem 362 comprising one or more DRAM devices coupled to processor subsystem 360. In one implementation of the embodiment, processor complex 310 comprises a multi-chip module (MCM) encapsulating the SoC device and the one or more DRAM devices.

Processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within memory subsystem 362, volatile memory 318, NV memory 316, or any combination thereof. Each of the one or more CPU cores 370 may be configured to retrieve and store data via interconnect 374 and memory interface 380. Each of the one or more CPU cores 370 may include a data cache, and an instruction cache. Two or more CPU cores 370 may share a data cache, an instruction cache, or any combination thereof. In one embodiment, a cache hierarchy is implemented to provide each CPU core 370 with a private cache layer, and a shared cache layer.

Processor subsystem 360 may further include one or more graphics processing unit (GPU) cores 372. Each GPU core 372 comprises a plurality of multi-threaded execution units that may be programmed to implement graphics acceleration functions. GPU cores 372 may be configured to execute multiple thread programs according to well-known standards such as OpenGL™, OpenCL™, CUDA™, and the like. In certain embodiments, at least one GPU core 372 implements at least a portion of a motion estimation function, such as a well-known Harris detector or a well-known Hessian-Laplace detector. Such a motion estimation function may be used for aligning images or portions of images within the image set.

Interconnect 374 is configured to transmit data between and among memory interface 380, display interface unit 382, input/output interfaces unit 384, CPU cores 370, and GPU cores 372. Interconnect 374 may implement one or more buses, one or more rings, a cross-bar, a mesh, or any other technically feasible data transmission structure or technique. Memory interface 380 is configured to couple memory subsystem 362 to interconnect 374. Memory interface 380 may also couple NV memory 316, volatile memory 318, or any combination thereof to interconnect 374. Display interface unit 382 is configured to couple display unit 312 to interconnect 374. Display interface unit 382 may implement certain frame buffer functions such as frame refresh. Alternatively, display unit 312 may implement frame refresh. Input/output interfaces unit 384 is configured to couple various input/output devices to interconnect 374.

In certain embodiments, camera module 330 is configured to store exposure parameters for sampling each image in an image set. When directed to sample an image set, the camera module 330 samples the image set according to the stored exposure parameters. A software module executing within processor complex 310 may generate and store the exposure parameters prior to directing the camera module 330 to sample the image set.

In other embodiments, camera module 330 is configured to store exposure parameters for sampling an image in an image set, and the camera interface unit 386 within the processor complex 310 is configured to cause the camera module 330 to first store exposure parameters for a given image comprising the image set, and to subsequently sample the image. In one embodiment, exposure parameters associated with images comprising the image set are stored within a parameter data structure. The camera interface unit 386 is configured to read exposure parameters from the parameter data structure for a given image to be sampled, and to transmit the exposure parameters to the camera module 330 in preparation of sampling an image. After the camera module 330 is configured according to the exposure parameters, the camera interface unit 386 directs the camera module 330 to sample an image. Each image within an image set may be sampled in this way. The data structure may be stored within the camera interface unit 386, within a memory circuit within processor complex 310, within volatile memory 318, within NV memory 316, or within any other technically feasible memory circuit. A software module executing within processor complex 310 may generate and store the data structure.

In one embodiment, the camera interface unit 386 transmits exposure parameters and commands to camera module 330 through interconnect 334. In certain embodiments, the camera interface unit 386 is configured to directly control the strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In this context, synchronization applies to coordinating at least method steps 122, 124, and 126 of method 100. That is, synchronizing the steps of configuring the camera module 330 prior to sampling an image, configuring the strobe unit 336 to generate appropriate strobe illumination, and directing the camera module 330 to sample a photographic scene subjected to strobe illumination.

Additional set-up time or execution time associated with each step may reduce overall sampling performance. Therefore, a dedicated control circuit, such as the camera interface unit 386, may be implemented to substantially minimize set-up and execution time associated with each step and any intervening time between steps.

In other embodiments, a software module executing within processor complex 310 directs the operation and synchronization of camera module 330 and the strobe unit 336, with potentially reduced performance.

In one embodiment, camera interface unit 386 is configured to accumulate statistics while receiving image data from the camera module 330. In particular, the camera interface unit 386 may accumulate exposure statistics for a given image while receiving image data for the image through interconnect 334. Exposure statistics may include an intensity histogram, a count of over-exposed pixels, a counter of under-exposed pixels, an intensity-weighted sum of pixel intensity, or any combination thereof. The camera interface unit 386 may present the exposure statistics as memory-mapped storage locations within a physical or virtual address space defined by a processor, such as a CPU core 370, within processor complex 310.

In certain embodiments, camera interface unit 386 accumulates color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image. In one embodiment, camera interface unit 386 accumulates spatial color statistics for performing color-matching between or among images, such as between or among an ambient image and one or more images sampled with strobe illumination. As with the exposure statistics, the color statistics may be presented as memory-mapped storage locations within processor complex 310.

In one embodiment, camera module 330 transmits strobe control signal 338 to strobe unit 336, enabling strobe unit 336 to generate illumination while the camera module 330 is sampling an image. In another embodiment, camera module 330 samples an image illuminated by strobe unit 336 upon receiving an indication from camera interface unit 386 that strobe unit 336 is enabled. In yet another embodiment, camera module 330 samples an image illuminated by strobe unit 336 upon detecting strobe illumination within a photographic scene via a rapid rise in scene illumination.

Figure 4A:
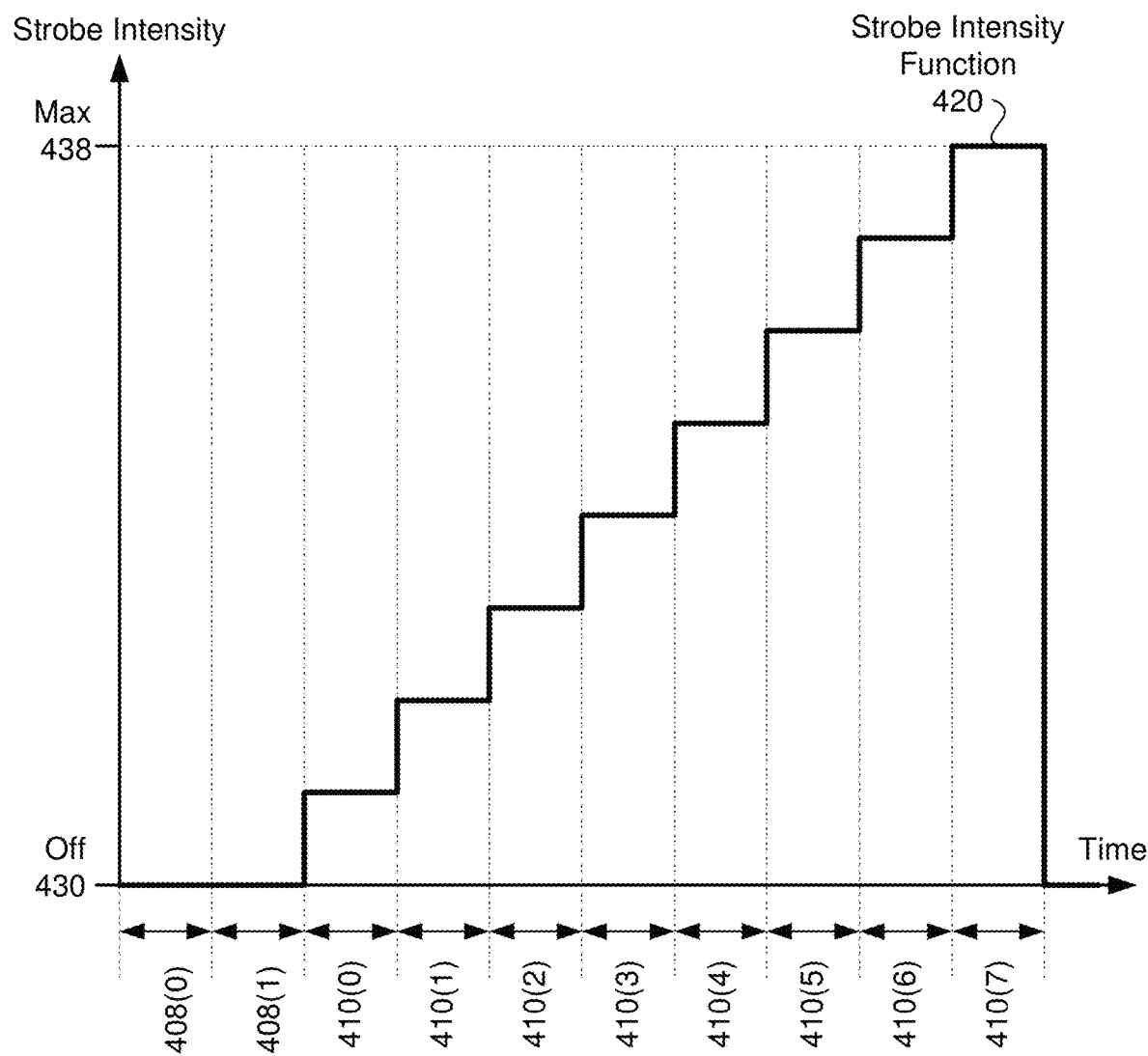
FIG. 4A illustrates a linear profile for a strobe intensity function associated with sampling an image set, in accordance with one embodiment.

FIG. 4A illustrates a linear profile for a strobe intensity function 420 associated with sampling an image set, in accordance with one embodiment. The strobe intensity function 420 represents average strobe intensity during an exposure time for an image sampled within a corresponding time interval 410. Strobe intensity may vary between off 430 and a maximum intensity 438. The maximum intensity 438 is a characteristic of a given implementation of a strobe unit, such as strobe unit 336 of FIG. 3A. Strobe intensity function 420 is depicted herein as scaled according to the maximum intensity 438.

As shown, the strobe intensity function 420 includes a set of increasing strobe intensity values up to and including maximum intensity 438. An image comprising the image set may be sampled during each time interval 410 under strobe illumination. An image, such as an ambient image, may also be sampled during a time interval 408 prior to time interval 410(0). In one embodiment, sequential images comprising the image set are sampled in sequential time intervals 410. While each time interval 408, 410 is shown to be of substantially equal duration, each time interval 408, 410 may vary.

In one embodiment, steps 122, 124, 126, and 128 of method 100 are performed for each time interval 410. Steps 132, 134, and 136 may be performed subsequent to time interval 410(7), or more generally, subsequent to a final time interval for a given image set.

Figure 4B:
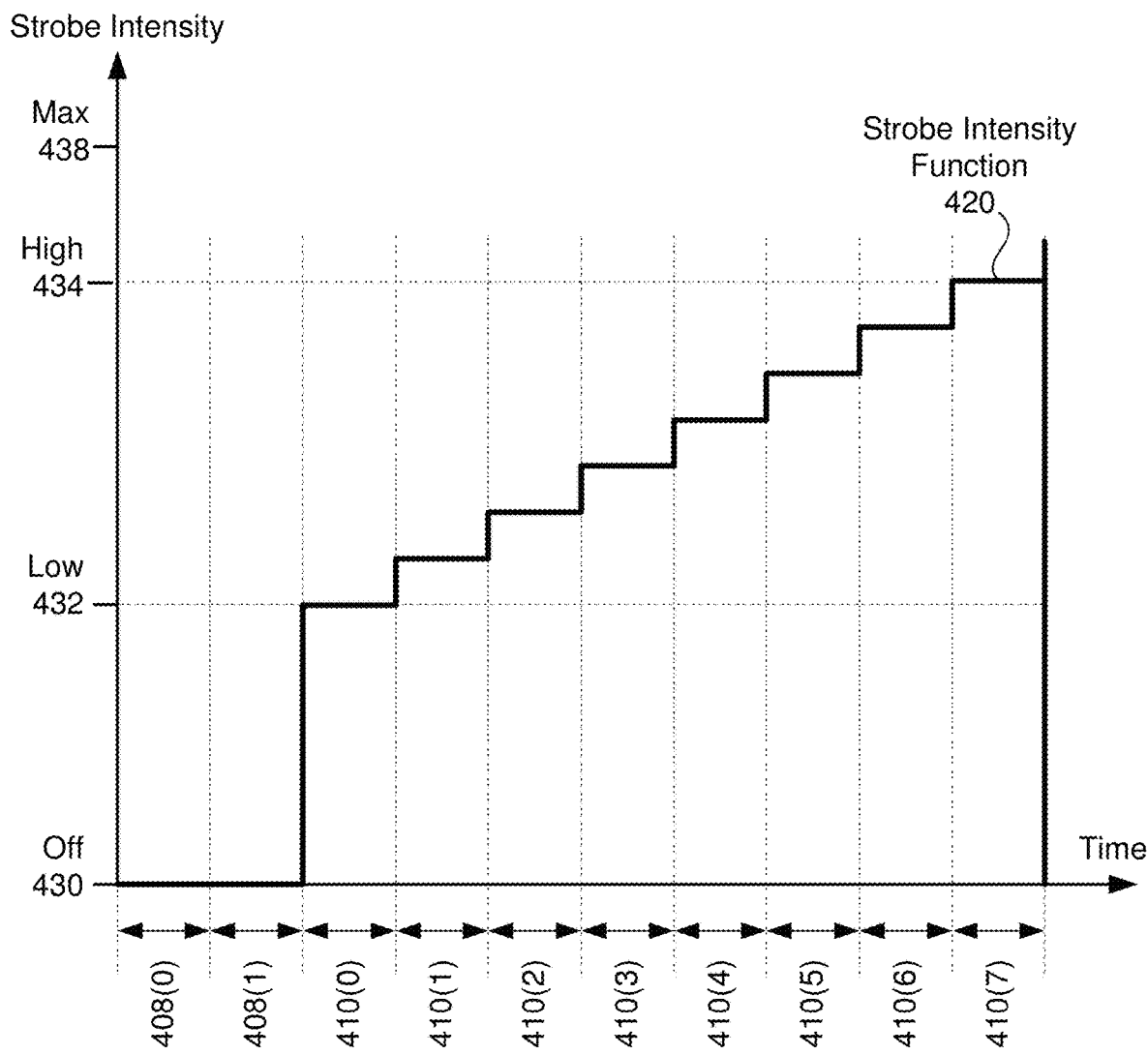
FIG. 4B illustrates a range-limited profile for a strobe intensity function associated with sampling an image set, in accordance with one embodiment.

FIG. 4B illustrates a range-limited profile for a strobe intensity function 420 associated with sampling an image set, in accordance with one embodiment. As shown, the range-limited profile modifies the strobe intensity function 420 relative to FIG. 4A by limiting the total range of strobe intensity between a low intensity value 432 and a high intensity value 434. By limiting the strobe intensity range, finer strobe intensity resolution within a range estimated to be appropriate for a given photographic scene may be available within images comprising the image set. The low intensity value 432 and the high intensity value 434 may be determined using any technically feasible technique, such as through a metering-strobe technique illustrated below in FIG. 4H. In certain operating modes, such as a portrait photographic mode, the high intensity value 434 is constrained based on ambient illumination within a photographic scene.

Constraining the high intensity value 434 based on ambient illumination may avoid excessive strobe intensity, which may be unpleasant to persons being subjected to the strobe illumination. The low intensity value 432 may then be determined to provide an appropriate range of strobe intensity for images within the image set.

Figure 4C:
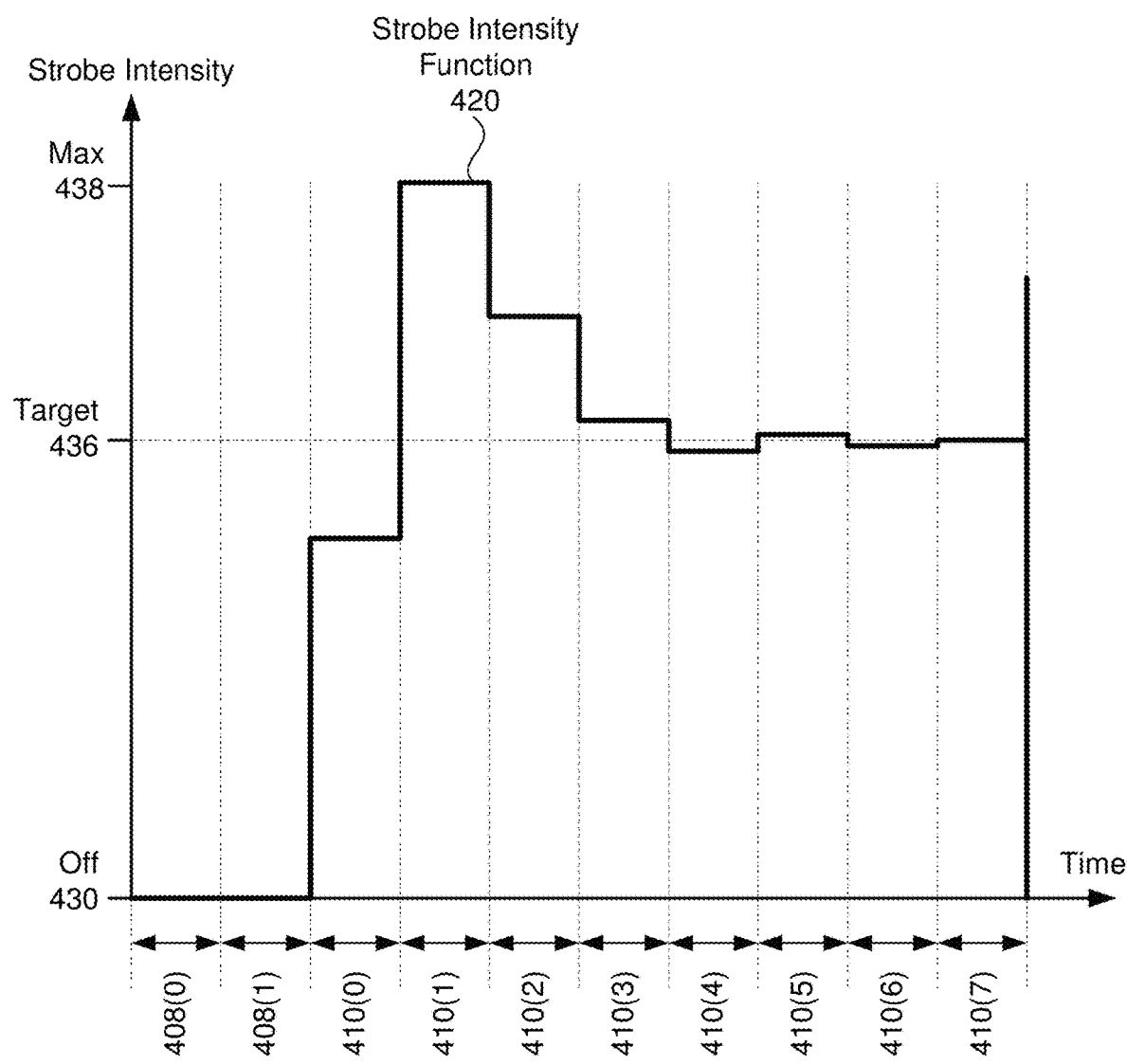
FIG. 4C illustrates an adaptive profile for a strobe intensity function associated with sampling an image set, in accordance with one embodiment.

FIG. 4C illustrates an adaptive profile for a strobe intensity function 420 associated with sampling an image set, in accordance with one embodiment. As shown, the adaptive profile modifies the strobe intensity function 420 relative to FIG. 4A by adaptively determining a subsequent strobe intensity value based on at least one previously sampled image. By adaptively determining a subsequent strobe intensity value for sequentially sampled images, a final image may be sampled having a target intensity value 436 that provides an estimated proper strobe exposure for the final image. In one embodiment, adaptively determining a subsequent strobe intensity value is performed during step 122 of method 100.

Estimating proper strobe exposure may be performed using any technically feasible techniques, including techniques that attempt to minimize over-exposed pixels while maximizing the strobe intensity. As shown, the strobe intensity function 420 represent an exemplary binary-style search performed to minimize over-exposed pixels in sequential time intervals 410 to converge on a target intensity value 436 that provides a minimum of over-exposed pixels while maximizing strobe intensity.

In certain embodiments, camera interface unit 386 is configured to generate exposure statistics, which are analyzed to adaptively determine a subsequent strobe intensity. For example, strobe intensity function 420 may follow a binary search profile, with strobe intensity modulated based on a count of over-exposed pixels and/or under-exposed pixels. Alternatively, the strobe intensity may be modulated according to the binary search profile based on an intensity histogram, which indicates general over-exposure, general under-exposure, and median intensity.

In one embodiment, images comprising the image set are ordered sequentially in sorted order according to strobe intensity. The images within the image set may then be viewed according to a monotonic strobe intensity, which may provide a more intuitive depiction of the strobe intensity range. Any technically feasible technique may be implemented to order the images according to monotonic strobe intensity. For example, image order within the image set may be represented as a sorted list of strobe intensity, whereby each element of the sorted list includes a reference to a corresponding image. Sequentially referencing images within the image set may therefore be performed by sequentially accessing images referred to by list elements. In one embodiment, certain images that are excessively over-exposed or under-exposed may be discarded from the image set. In general, images within a given image set may be ordered according to a monotonic parameter sequence, such as an increasing strobe intensity sequence, regardless of a particular profile for strobe intensity function 420.

Figure 4D:
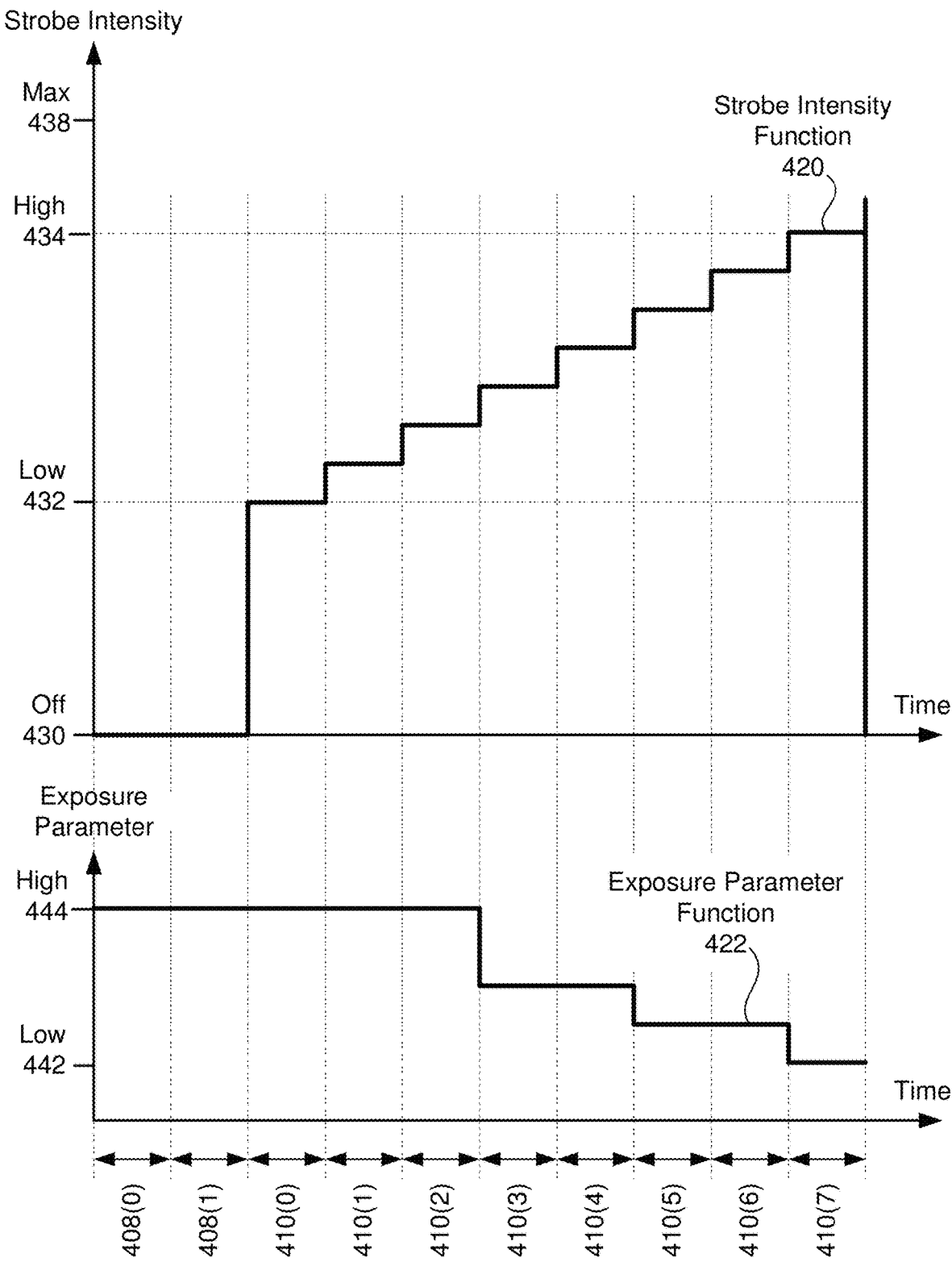
FIG. 4D illustrates a range-limited profile for a strobe intensity function and a monotonic profile for an exposure parameter function associated with sampling a set of digital photographs, in accordance with one embodiment.

FIG. 4D illustrates a range-limited profile for a strobe intensity function 420 and a monotonic profile for an exposure parameter function 422 associated with sampling a set of digital photographs, in accordance with one embodiment. As shown, the range-limited profile for strobe intensity function 420 of FIG. 4B is executed in conjunction with exposure parameter function 422. The exposure parameter function 422 may represent any exposure parameter over time intervals 408 and 410. In one embodiment, the exposure parameter function 422 specifies exposure time varying between a high value 444 (longer exposure) to a low value 442 (shorter exposure).

The high value 444 and the low value 442 may each be selected using any technically feasible technique. In one embodiment, the high value 444 is selected to over-expose an ambient photographic scene, metered during time interval 408(0), by a predetermined amount. For example, the high value 444 may be selected over-expose the ambient photographic scene by one conventional photographic exposure stop. Similarly, the low value 442 may be selected to under-expose the ambient photographic scene by a predetermined amount, such as one conventional photographic exposure stop. Regions within the photographic scene pre-dominantly illuminated by ambient illumination will be over-exposed in time interval 410(0), under-exposed in time interval 410(7), and properly-exposed mid-way between time intervals 410(0) and 410(7). Sequential images within the image set corresponding to time intervals 410(0) through 410(7) will advantageously provide a range of exposure variation for both ambient-illuminated regions and strobe-illuminated regions.

In certain embodiments, two exposure parameters may be varied together in sequential time intervals. For example, exposure time may be reduced, while increasing sensor sensitivity to provide a trade-off between sensor image noise and blur due to motion in sequential images comprising the image set.

Figure 4E:
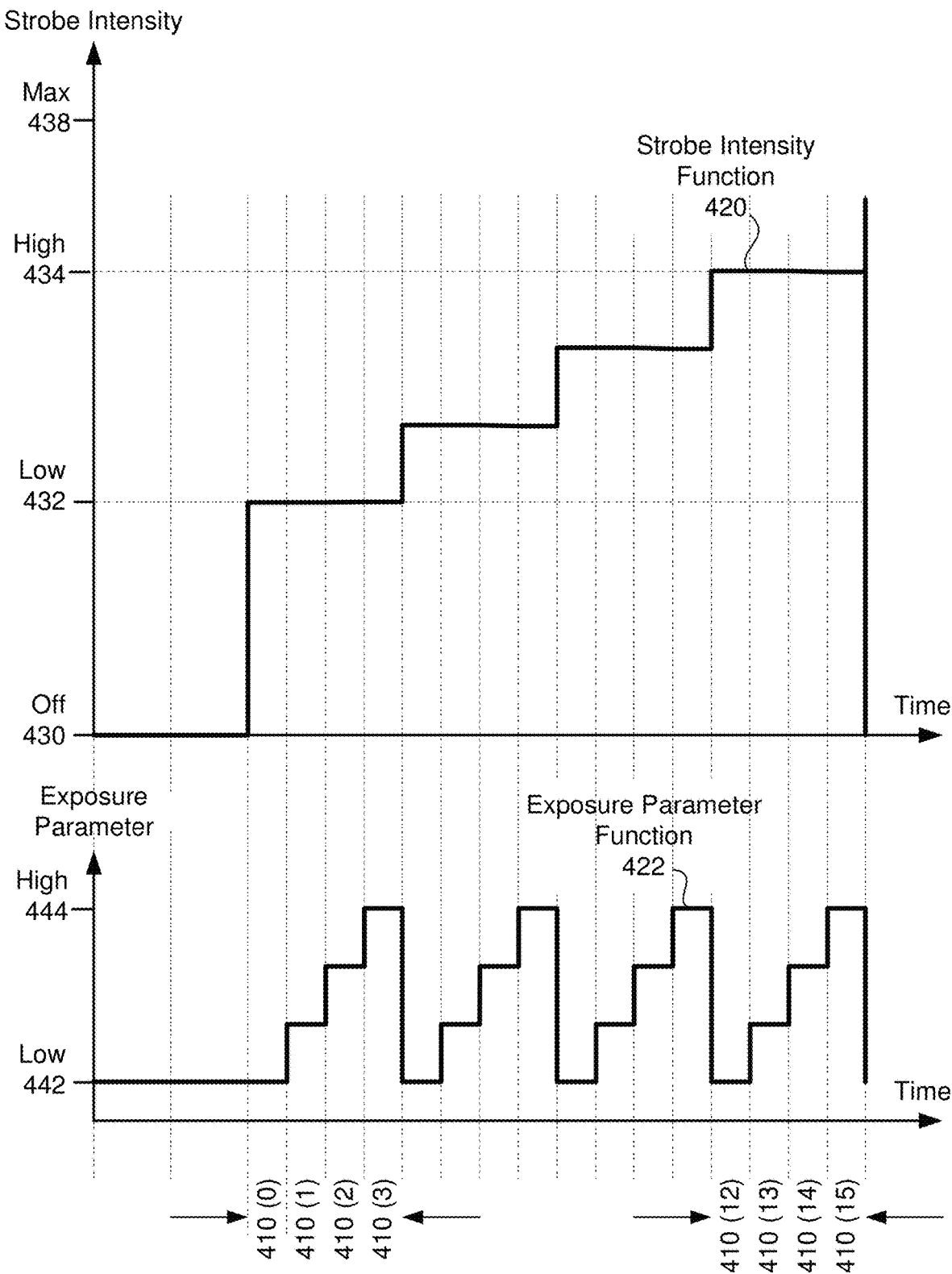
FIG. 4E illustrates a range-limited profile for a strobe intensity function and a non-monotonic profile for an exposure parameter function associated with sampling a set of digital photographs, in accordance with one embodiment.

FIG. 4E illustrates a range-limited profile for a strobe intensity function 420 and a non-monotonic profile for an exposure parameter function 422 associated with sampling a set of digital photographs, in accordance with one embodiment. As shown, the range-limited profile for strobe intensity function 420 and exposure parameter function 422 of FIG. 4D are both modified to provide a two-dimensional sampling of both strobe intensity and an exposure parameter. For each strobe intensity value ranging between low intensity value 432 and high intensity value 434, an image is sampled over each of four different exposure parameter values, as indicated by exposure parameter function 422. Images within the image set may be displayed based on a combination of strobe intensity function 420 and exposure parameter function 422, each separately selected. In this way, an image may be selected from the image set based on substantially separately varying strobe exposure and ambient exposure.

Figure 4F:
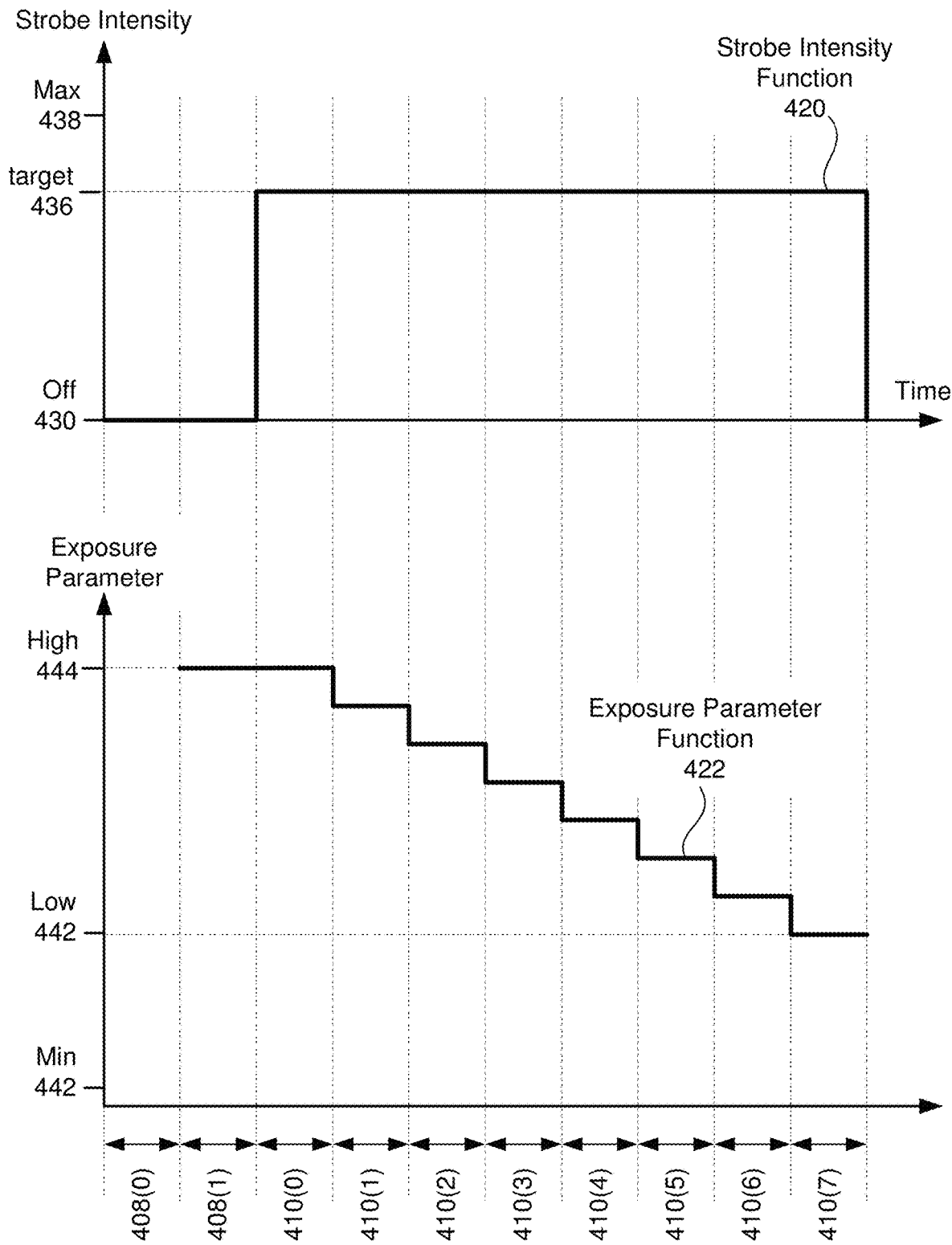
FIG. 4F illustrates a constant intensity profile for a strobe intensity function and a monotonic profile for exposure parameter function associated with sampling a set of digital photographs, in accordance with one embodiment.

FIG. 4F illustrates a constant intensity profile for a strobe intensity function 420 and a monotonic profile for exposure parameter function 422 associated with sampling a set of digital photographs, in accordance with one embodiment. A shown, the strobe intensity profile indicates a substantially constant strobe intensity of target 436, which may be determined using any technically feasible technique to sample images having proper exposure for regions within a photographic scene predominately illuminated by strobe illumination. The value of target 436 may be determined for an exposure parameter between low value 442 and high value 444 to ensure at least one of the images sampled during time intervals 410 may have proper exposure with respect to strobe illumination.

Figure 4G:
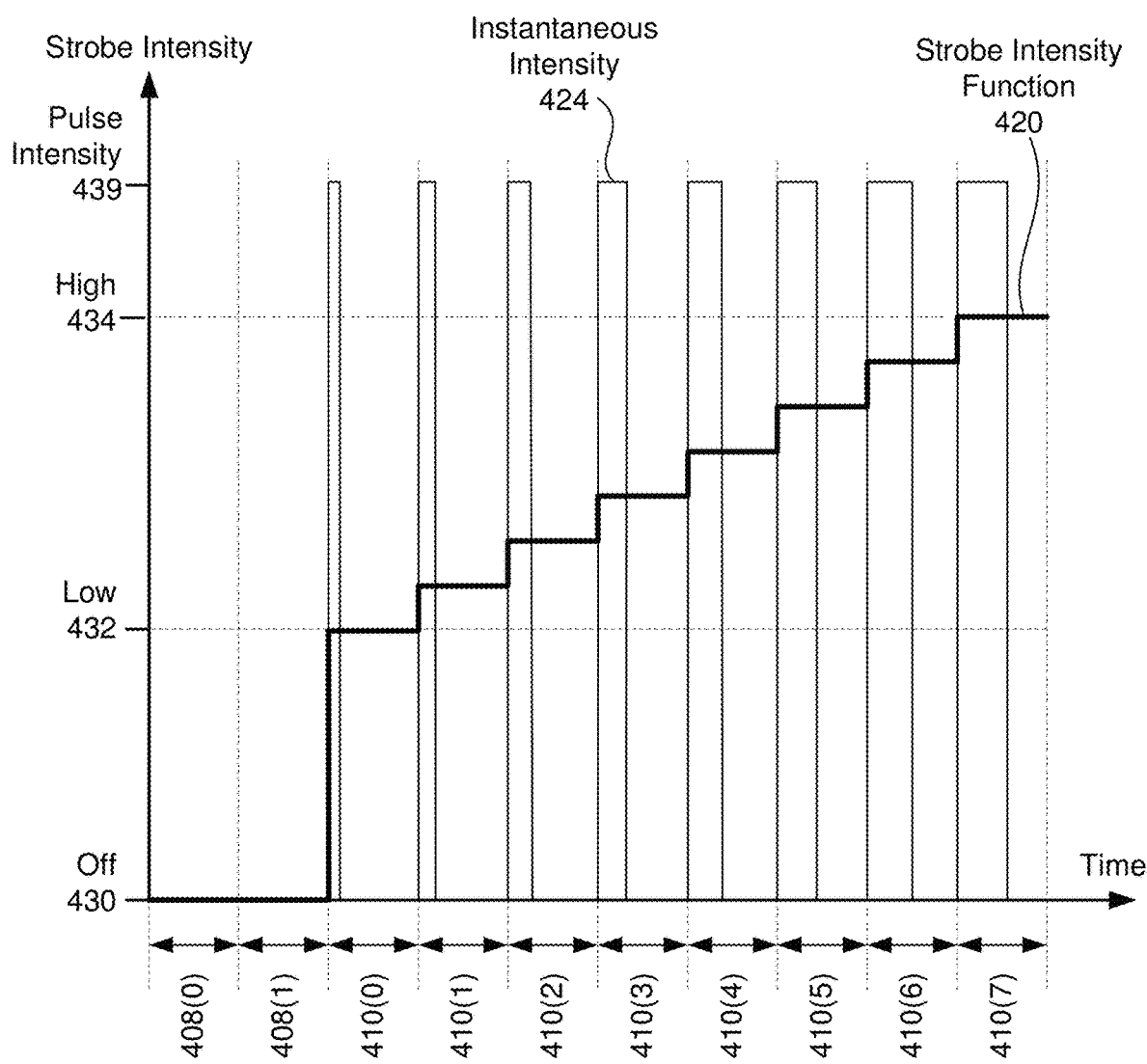
FIG. 4G illustrates a range-limited profile for a strobe intensity function based on variable width pulses, in accordance with one embodiment.

FIG. 4G illustrates a range-limited profile for a strobe intensity function 420 based on variable width pulses, in accordance with one embodiment. An instantaneous intensity 424 illustrates instantaneous strobe intensity as a function of time, while the strobe intensity function 420 represents average strobe intensity during an exposure time for an image sampled within a corresponding time interval 410. Average strobe intensity corresponds to total accumulated instantaneous intensity 424 during a corresponding time interval 410. As shown, the value of strobe intensity function 420 for a given time interval 410 is proportional to a pulse width of a pulse having pulse intensity 439. In one embodiment, each pulse comprising the instantaneous intensity 424 is positioned in time to be within an exposure time for a corresponding image being sampled.

In one embodiment, the strobe unit 336 of FIG. 3A comprises a gas-discharge strobe, such as a xenon tube strobe, and pulse intensity 439 represents the instantaneous intensity of the gas-discharge strobe while actively firing. In one embodiment, time interval 410 represents less than a fifty-millisecond interval.

While a single pulse is shown here in conjunction with achieving a particular average strobe intensity, alternative embodiments may implement strobe intensity averaging over multiple pulses per time interval 410. For example, an LED illuminator device may implement pulse-width modulation (PWM), or other average energy modulation techniques, to achieve a specified average strobe intensity. In such embodiments, multiple pulses should be generated during an associated exposure time. In general, an arbitrary function for instantaneous intensity 424 may be implemented to achieve an average strobe intensity during a given associated exposure time during a corresponding time interval 410. For example, a smooth ramp may be implemented as a function for instantaneous intensity 424, the smooth ramp providing increasing average strobe intensity for during sequential, equal time intervals 410. In certain embodiments, strobe intensity is controlled by controlling a current source configured to drive an illuminator device. In other embodiments, strobe intensity is controlled using a feedback loop that adjusts current driving the illuminator device to match measured optical strobe intensity generated by the strobe unit.

Figure 4H:
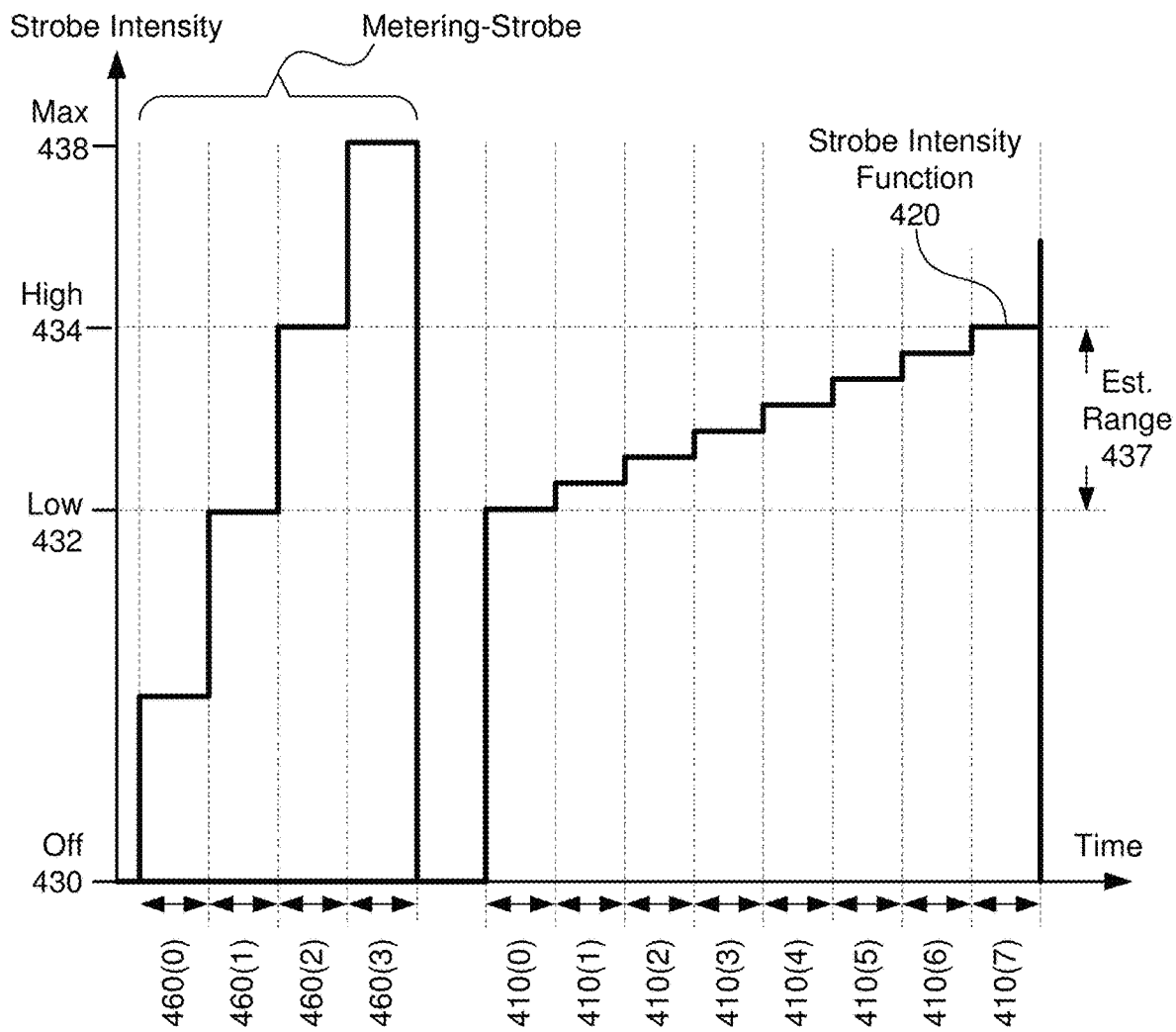
FIG. 4H illustrates determining a range for a range-limited profile, in accordance with one embodiment.

FIG. 4H illustrates determining an intensity range for a range-limited profile, in accordance with one embodiment. Determining the range comprises sampling strobe exposure for a photographic scene subjected strobe illumination during metering-strobe time intervals 460. Strobe intensity is varied during time intervals 460 to estimate the low intensity value 432, below which the photographic scene is underexposed with respect to strobe illumination, and the high value, above which the photographic scene is over-exposed with respect to strobe illumination.

In one embodiment, the maximum intensity 438 is constrained based on ambient illumination rather than strobe unit capacity. In darker settings, the maximum intensity 438 is constrained to an intensity that a person will not find unpleasant. In brighter settings, the maximum intensity 438 may instead be constrained by strobe unit capacity.

In certain embodiments, a digital photographic system is configured to continuously sample ambient images within a circular buffer, and to identify a subset of the ambient images within the circular buffer to be stored as identified ambient images within the image set based on time proximity to a shutter release command. Upon receiving the shutter release command, the identified ambient images are associated with time intervals 408 of FIGS. 4A through 4H, as though sampled according to steps 110 through 116 of method 100 of FIG. 1B. Method 100 may proceed to step 120 upon identifying the ambient images.

Figure 5A:
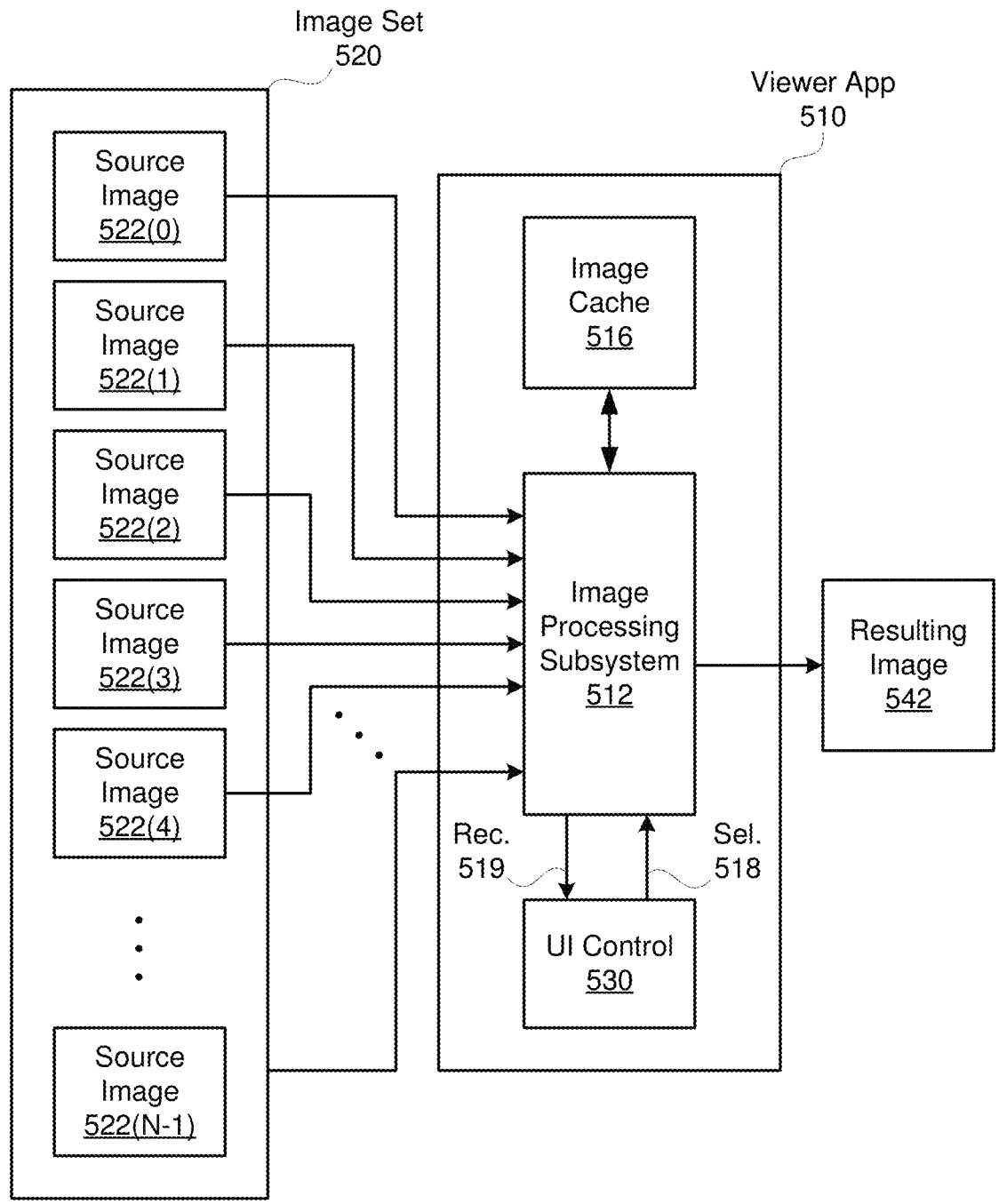
FIG. 5A illustrates a viewer application configured to generate a resulting image based on an image set, in accordance with one embodiment.

FIG. 5A illustrates a viewer application 510 configured to generate a resulting image 542 based an image set 520, in accordance with one embodiment. The image set 520 includes two or more source images 522, which may be generated by performing method 100 of FIG. 1B.

In one embodiment, the resulting image 542 represents a source image 522 that is selected from the image set 520. The source image 522 may be selected according to any technically feasible technique. For example, a given source image 522 may be selected automatically based on based on exposure quality, as described previously in method 100 and in method 102 of FIG. 1C. Alternatively, a given source image 522 may be selected manually through a UI control 530, discussed in greater detail below in FIG. 5B. The UI control 530 generates a selection parameter 518 that indicates the manual selection. An image processing subsystem 512 is configured to generate the resulting image 542 by either instantiating the selected source image 522 or marking the selected source image 522 within the image set 520 as the resulting image 542. In certain embodiments, the image processing subsystem 512 automatically selects a source image and transmits a corresponding recommendation 519 to the UI control 530. The recommendation 519 indicates, through the UI control 530, which source image was automatically selected. A user may keep the recommendation or select a different source image to be the resulting image 542 using the UI control 530.

In an alternative embodiment, viewer application 510 is configured to combine two or more source images 522 to generate a resulting image 542. The two or more source images 522 may be mutually aligned by the image processing subsystem 512 prior to being combined. Selection parameter 518 may include a weight assigned to each of two source images 522. The weight may be used to perform a transparency/opacity blend (known as an alpha blend) between two source images 522.

In certain embodiments, source image 522(0) is sampled under exclusively ambient illumination, with the strobe unit off. Source image 522(0) is generated to be white-balanced, according to any technically feasible white balancing technique. Source images 522(1) through 522(N−1) are sampled under strobe illumination, which may be of a color that is discordant with respect to ambient illumination. Source images 522(1) through 522(N−1) may be white-balanced according to the strobe illumination color. Discordance in strobe illumination color may cause certain regions to appear incorrectly colored with respect to other regions in common photographic settings. For example, in a photographic scene with foreground subjects predominantly illuminated by white strobe illumination and white-balanced accordingly, background subjects that are predominantly illuminated by incandescent lights may appear excessively orange or even red. In one embodiment, spatial color correction is implemented within image processing subsystem 512 to match the color of regions within a selected source image 522 to that of source image 522(0). Spatial color correction implements regional color-matching to ambient-illuminated source image 522(0). The regions may range in overall scene coverage from individual pixels, to blocks of pixels, to whole frames. In one embodiment, each pixel in a color-corrected image includes a weighted color correction contribution from at least a corresponding pixel and an associated block of pixels.

In certain implementations, viewer application 510 includes an image cache 516, configured to include a set of cached images corresponding to the source images 522, but rendered to a lower resolution than source images 522. The image cache 516 provides images that may be used to readily and efficiently generate or display resulting image 542 in response to real-time changes to selection parameter 518. In one embodiment, the cached images are rendered to a screen resolution of display unit 312. When a user manipulates the UI control 530 to select a source image 522, a corresponding cached image may be displayed on the display unit 312. Caching source images 522 may advantageously reduce power consumption associated with rendering a given source image 522 for display. Caching source images 522 may also improve performance by eliminating a rendering process needed to resize a given source image 522 for display each time UI control 530 detects that a user has selected a different source image 522.

Figure 5B:
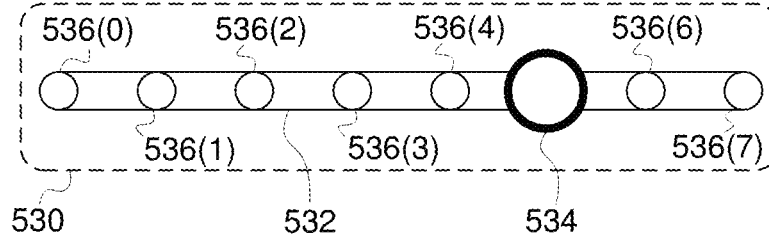
FIG. 5B illustrates an exemplary user interface associated with a viewer application, in accordance with one embodiment.

FIG. 5B illustrates an exemplary user interface associated with the viewer application 510 of FIG. 5A, in accordance with one embodiment. The user interface comprises an application window 540 configured to display the resulting image 542 based on a position of the UI control 530. The viewer application 510 may invoke the UI control 530, configured to generate the selection parameter 518 based on a position of a control knob 534. The recommendation 519 may determine an initial position of the control knob 534, corresponding to a recommended source image 522 within the image set 520. In one embodiment, the UI control 530 comprises a linear slider control with a control knob 534 configured to slide along a slide path 532. A user may position the control knob 534 by performing a slide gesture. For example, the slide gesture may include touching the control knob 534 in a current position, and sliding the control knob 534 to a new position. Alternatively, the user may touch along the slide path 532 to move the control knob 534 to a new position defined by a location of the touch.

In one embodiment, positioning the control knob 534 into a discrete position 536 along the slide path 532 causes the selection parameter 518 to indicate selection of a corresponding source image 522. For example, a user may move control knob 534 into discrete position 536(3), to indicate that source image 522(3) is selected. The UI control 530 then generates selection parameter 518 to indicate that source image 522(3) is selected. The image processing subsystem 512 responds to the selection parameter 518 by generating the resulting image 542 based on source image 522(3). The control knob 534 may be configured to snap to a closest discrete position 536 when released by a user withdrawing their finger.

In an alternative embodiment, the control knob 534 may be positioned between two discrete positions 536 to indicate that resulting image 542 should be generated based on two source images 522 corresponding to the two discrete positions 536. For example, if the control knob 534 is positioned between discrete position 536(3) and discrete position 536(4), then the image processing subsystem 512 generates resulting image 542 from source images 522(3) and 522(4). In one embodiment, the image processing subsystem 512 generates resulting image 542 by aligning source images 522(3) and 522(4), and performing an alpha-blend between the aligned images according to the position of the control knob 534. For example, if the control knob 534 is positioned to be one quarter of the distance from discrete position 536(3) to discrete position 536(4) along slide path 532, then an aligned image corresponding to source image 522(4) may be blended with twenty-five percent opacity over a fully opaque aligned image corresponding to source image 522(3).

In one embodiment, UI control 530 is configured to include a discrete position 536 for each source image 522 within a given image set 520 being viewed. Each image set 520 stored within the digital photographic system 300 of FIG. 3A may include a different number of source images 522, and UI control 530 may be configured to establish discrete positions 536 to correspond to the source images 522 for a given image set 520.

In certain embodiments, the viewer application 510 may implement two or more independent UI controls. For example, the viewer application 510 may implement a first UI control to select a source image 522 according to strobe intensity, and a second UI control to select a source image 522 according to ambient exposure. The first UI control may select among different values of strobe intensity function 420 illustrated in FIG. 4E, while the second UI control may select among different values of exposure parameter function 422. In this way, the viewer application 510 may enable a user to independently adjust exposure with respect to strobe intensity and exposure after an image set has been sampled. In one embodiment, another independent UI control is implemented to select among source images 522 sampled under different strobe illumination colors.

Figure 5C:
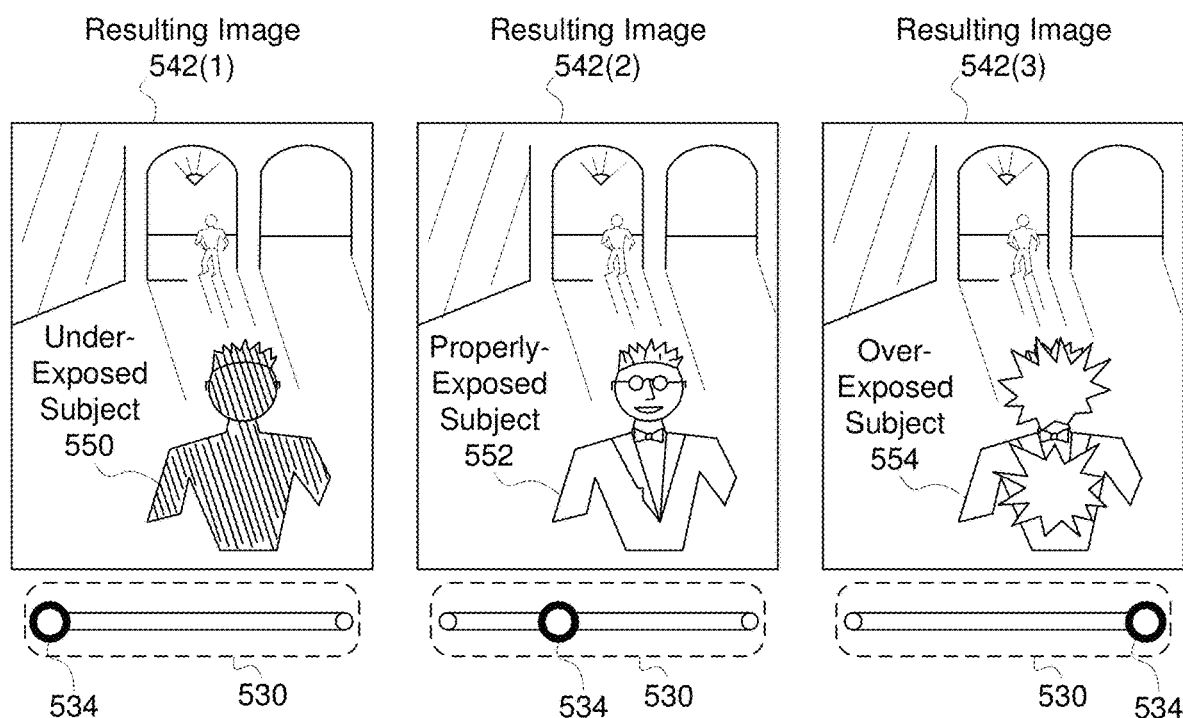
FIG. 5C illustrates a resulting image with differing levels of strobe exposure, in accordance with one embodiment.

FIG. 5C illustrates a resulting image 542 with differing levels of strobe exposure, in accordance with one embodiment. In this example, control knob 534 is configured to select source images 522 of FIG. 5A sampled under increasing strobe intensity from left to right. When the control knob 534 is in the left-most position, the selected source image 522 may correspond to an image captured within time interval 410(0) of FIG. 4A, 4B, 4C, 4D, 4G, or 4H. With respect to FIG. 4E, the left-most control knob position may select a source image captured within time intervals 410(0) through 410(3), with a specific source image 522 selected through a second UI control configured to select according to an exposure parameter. When the control knob 534 is in the right-most position, the selected source image 522 may correspond to an image captured within time interval 410(7) of FIG. 4A, 4B, 4D, 4G, or 4H. In the right-most position, the selected source image 522 may correspond to time interval 410(1) of FIG. 4C, or time intervals 410(12) through 410(15) of FIG. 4E.

As shown, resulting image 542(1) includes an under-exposed subject 550 sampled under insufficient strobe intensity, resulting image 542(2) includes a properly-exposed subject 552 sampled under appropriate strobe intensity, and resulting image 542(3) includes an over-exposed subject 554 sampled under excessive strobe intensity. A determination of appropriate strobe intensity is sometimes subjective, and embodiments of the present invention advantageously enable a user to subjectively select an image having a desirable or appropriate strobe intensity after a picture has been taken, and without loss of image quality or dynamic range. In practice, a user is able to take what is apparently one photograph by asserting a single shutter-release. The single shutter-release causes the digital photographic system 300 of FIG. 3A to sample multiple images in rapid succession, where each of the multiple images is sampled under varying strobe intensity. In one embodiment, time intervals 410 of less than two-hundred milliseconds are defined herein to establish rapid succession. A resulting image set 520 enables the user to advantageously select a resulting image later, such as after a particular photographic scene of interest is no longer available. This is in contrast to prior art solutions that conventionally force a user to manually take different photographs and manually adjust strobe intensity over the different photographs. This manual prior art process typically introduces substantial inter-image delay, resulting in a loss of content consistency among sampled images.

Figure 5D:
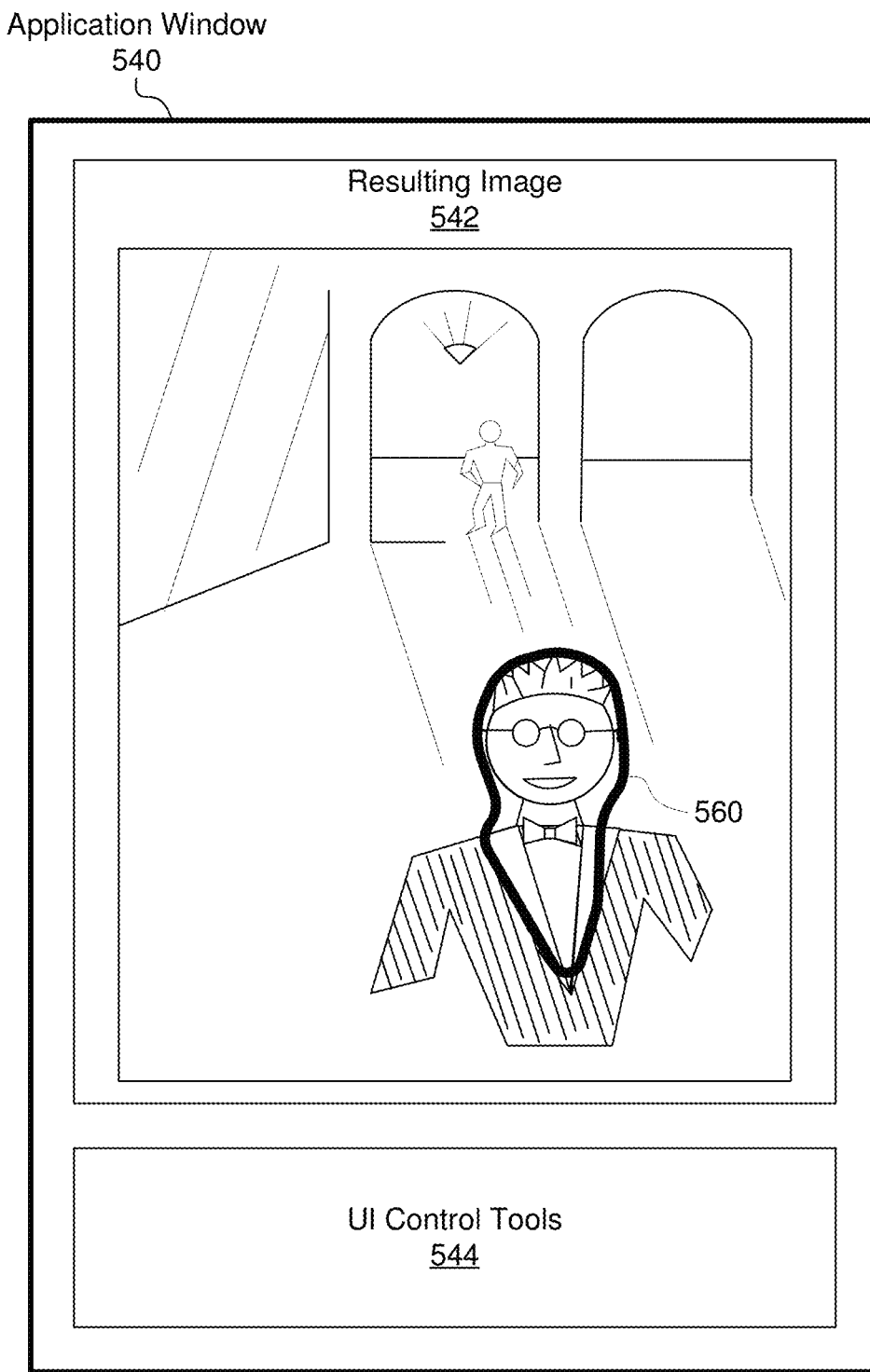
FIG. 5D illustrates a resulting image generated from source images and a selection depth map, in accordance with one embodiment.

FIG. 5D illustrates a resulting image 542 generated from source images 522 and a selection depth map, in accordance with one embodiment. The source images 522 comprising an image set 520 are conceptually stacked in increasing depth, where depth corresponds to strobe intensity for a given source image 522. Increasing depth therefore corresponds to increasing (or decreasing) strobe intensity. The selection depth map includes depth samples organized as a two-dimensional array that corresponds to pixels or regions comprising resulting image 542. A depth value in this context acts similarly to selection parameter 518, but just for a corresponding pixel or region. In certain embodiments, the source images 522 are aligned within the stack.

As shown, selection region 560 encompasses a portion of a foreground subject. Outside the selection region 560, pixel data may be taken from source image 522(0) and represented in the resulting image 542, where source image 522(0) corresponds to a minimum depth value. Inside the selection region 560, pixel data may be taken from source images 522(1) through 522(N−1), based on depth values for a given pixel or region in a selection depth map corresponding to the resulting image 542. Depth information comprising the selection depth map may be generated using any technically feasible technique. One technique is illustrated below in FIGS. 5E and 5F, where swiping over a region multiple times, using a input device such as a mouse or stylus or touch input (such as with a touch-sensitive display), increases depth values associated with the region. In one embodiment, UI control tools 544 include a UI control that sets a minimum depth (minimum strobe intensity) for the selection depth map. UI control tools 544 may also include a UI control to clear the selection depth map.

Figure 5E:
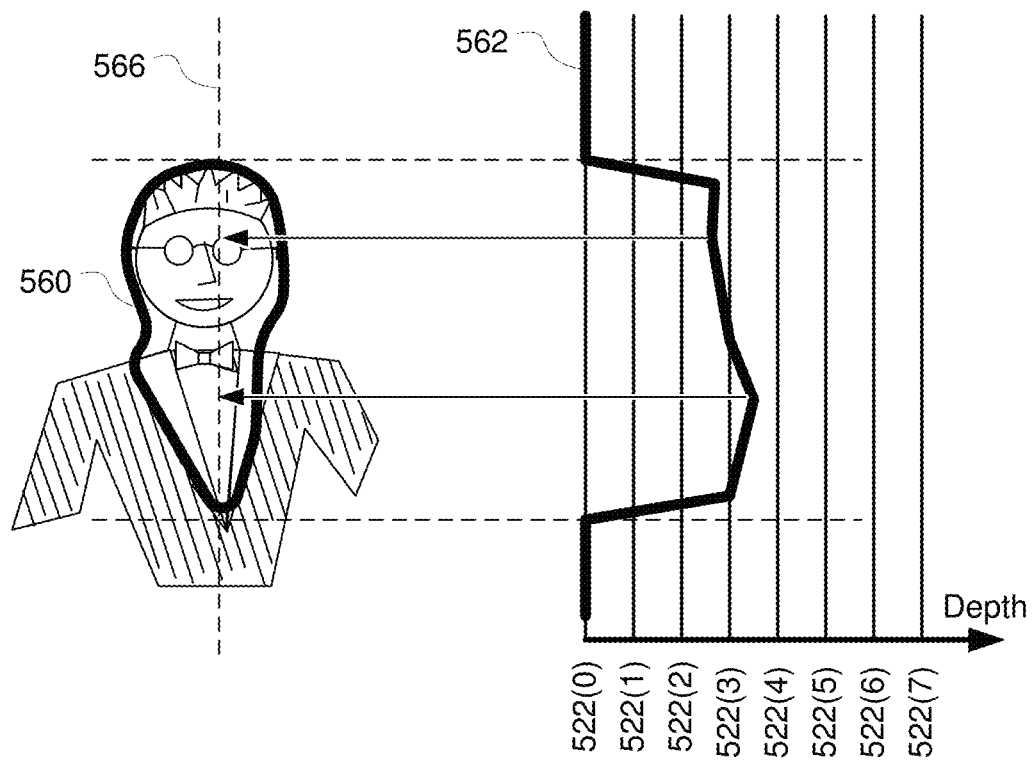
FIG. 5E illustrates a selection depth map relative to a stack of source images, in accordance with one embodiment.

FIG. 5E illustrates a selection depth map relative to a stack of source images 522, in accordance with one embodiment. Depth values for the selection region 560 along an intersecting plane 566 are shown as a depth profile 562. The depth profile 562 corresponds to sequentially organized source images 522(0) through 522(7) comprising a stack. A greater depth value along the depth profile 562 indicates a corresponding selection of a source image 522. A fractional depth value may indicate selection of two source images 522 and a blend between two source images 522.

Figure 5F:
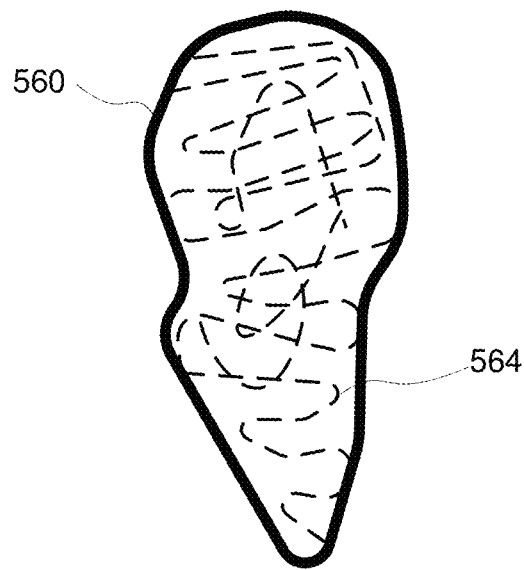
FIG. 5F illustrates specifying a selection depth map, in accordance with one embodiment.

FIG. 5F illustrates specifying a selection depth map, in accordance with one embodiment. As shown, a selection path 564 defines the selection region 560. In one embodiment, a touch-input device is configured to track selection path 564, which may be drawn by a user on the touch-input device. In one embodiment, a depth value for a given region is assigned a value that reflects an accumulation of selection path 564 intersections with the region. For example, a depth value for each pixel in the selection region 560 that intersects with the selection path 564 may be increased by one a specified increment each time the selection path 564 intersects that particular pixel. The specified increment may correspond to a fractional depth value (e.g., 0.25 of a distinct depth increment) separating discrete depths associated with distinct images. So, if the selection path 564 intersects a particular pixel in the selection region 560 three times, the depth value for that pixel may be increased by three specified increments. In one embodiment, the selection path 564 intersects a pixel if the selection path 564 crosses any edge of the pixel. In another embodiment, the selection path 564 intersects a pixel if the selection path crosses any edge of a pixel within n number of pixels from that pixel (i.e., the selection path may intersect with pixels within a certain distance from the selection path). Depth values may accumulate according to any technically feasible technique.

In another embodiment, the selection region 560 is defined by the selection path 564. For example, a closed surface that includes all points in the selection path 564 may be selected as the selection region 560. Further, a closed surface is determined based on the selection path 564 and a set of pre-determined edges in the resulting image 542 and selected as the selection region 560. Once the selection region 560 has been defined, depth values for pixels in the selection region 560 may be incremented uniformly based on the selection path 564. For example, a length of the selection path 564 may be determined by accumulating a distance between points in the selection path 564. Then, all depth values for pixels in the selection region 560 may be incremented by a uniform value calculated as the length of the selection path 564 divided by a normalization factor. In other words, the longer the selection path 564, the greater the increase in depth value for the selection region 560. The normalization factor may be selected such that each incremental step in depth values requires a significant increase in the length of the selection path 564. Such embodiments, enable a user to adjust the depth of a particular region uniformly such that the entire region comprises pixel data from a single image in the image stack.

In one embodiment, depth values around the selection path 564 may accumulate according to a tapering region of influence about the selection path 564 to generate a field of depth samples resembling the effect of an air brush. For example, a window function may be specified that determines a value to increase the depth value corresponding to a pixel based on the distance of that pixel from the selection path 564. For example, pixels intersected by the selection path 564 may be increased by three units of depth value, pixels within one pixel width from the selection path 564, but not intersected by the selection path 564, may be increased by two units of depth value, pixels within two pixel widths from the selection path 564 may be increased by one unit of depth value, and pixels greater than three units of depth value from the selection path 564 may not be increased at all. In another embodiment, the depth values may be fractional depth values. In these embodiments, the window function may return values to increase the depth value of between 0 and 1, where 1 is returned for pixels that are intersected by the selection path 564 and values between [0,1) being returned for pixels not intersected by the selection path 564. The effect of the tapering window function using fractional depth values would be to blend one image associated with a lower depth value with another image associated with a higher depth value around the selection path 564 in order to have a soft transition between the two source images.

One advantage of the present invention is that a user may photograph a scene using a single shutter release command, and subsequently select an image sampled according to a strobe intensity that best satisfies user aesthetic requirements for the photographic scene. The one shutter release command causes a digital photographic system to rapidly sample a sequence of images with a range of strobe intensity and/or color. For example, twenty or more full-resolution images may be sampled within one second, allowing a user to capture a potentially fleeting photographic moment with the advantage of strobe illumination. Embodiments of the present invention advantageously enable a given digital photographic system to capture a nearly optimal image, among images within an image set, given implementation-specific limitations and/or capabilities of the digital photographic system. Furthermore, a user may select an image from the image set according to their subjective aesthetic assessment. Another advantage of the present invention is that a user may easily specify spatially varying contributions of different images within the image set (e.g., the sequence of images) through a simple UI control.

While various embodiments have been described above with respect to a digital camera 202 and a mobile device 204, any device configured to perform the methods 1, 100, or 102 of FIG. 1A, 1B, or 1C is within the scope and spirit of the present invention. In certain embodiments, two or more digital photographic systems implemented in respective devices are configured to sample corresponding image sets in mutual time synchronization. A single shutter release command may trigger the two or more digital photographic systems.

While the foregoing is directed to embodiments of the present invention, other and further embodiments of the invention may be devised without departing from the basic scope thereof, and the scope thereof is determined by the claims that follow.

What is claimed is:

1. An apparatus, comprising:
    an image sensor;
    a strobe;
    a display;
    a touch interface;
    one or more non-transitory memories;
    at least one processor in communication with the image sensor, the strobe, the display, the touch interface, and the one or more non-transitory memories, wherein instructions are stored in the one or more non-transitory memories and configured to be executed by the at least one processor, to cause the apparatus to:
    emit, utilizing the strobe, a first illumination for a first time interval based on a first set of one or more strobe parameters including a first strobe intensity;
    sample, utilizing the image sensor, a first image of a photographic scene during at least a portion of the first time interval based on a first set of one or more exposure parameters;
    emit, utilizing the strobe, a second illumination for a second time interval based on a second set of one or more strobe parameters including a second strobe intensity;
    sample, utilizing the image sensor, a second image of the photographic scene during at least a portion of the second time interval based on a second set of one or more exposure parameters;
    emit, utilizing the strobe, a third illumination for a third time interval based on a third set of one or more strobe parameters including a third strobe intensity, such that the first time interval, the second time interval, and the third time interval are different;
    sample, utilizing the image sensor, a third image of the photographic scene during at least a portion of the third time interval based on a third set of one or more exposure parameters;
    generate a resulting image by combining at least portions of at least two images including at least one of: the first image, the second image, or the third image; and
    store the resulting image.

2. The apparatus of claim 1, wherein the apparatus is configured such that the first set of one or more exposure parameters, the second set of one or more exposure parameters, and the third set of one or more exposure parameters, each include at least one of: an exposure time or an exposure sensitivity.

3. The apparatus of claim 1, wherein the apparatus is configured such that the first set of one or more exposure parameters, the second set of one or more exposure parameters, and the third set of one or more exposure parameters, each include an exposure time and an exposure sensitivity.

4. The apparatus of claim 1, wherein the apparatus is configured such that the second strobe intensity is the same as the third strobe intensity.

5. The apparatus of claim 1, wherein the apparatus is configured such that the second strobe intensity is different than the first strobe intensity.

6. The apparatus of claim 1, wherein the apparatus is configured such that the third strobe intensity is different than the first strobe intensity.

7. The apparatus of claim 1, wherein the apparatus is configured such that the first strobe intensity, the second strobe intensity, and the third strobe intensity, are not equal.

8. The apparatus of claim 1, wherein the apparatus is configured such that the first set of one or more strobe parameters includes a first strobe color, the second set of one or more strobe parameters includes a second strobe color, and the third set of one or more strobe parameters includes a third strobe color.

9. The apparatus of claim 8, wherein the apparatus is configured such that the first strobe color, the second strobe color, and the third strobe color are equal.

10. The apparatus of claim 8, wherein the apparatus is configured such that at least two of: the first strobe color, the second strobe color, and the third strobe color, are not equal.

11. The apparatus of claim 8, wherein the apparatus is configured such that the first strobe color is set based on a measured ambient illumination color.

12. The apparatus of claim 11, wherein the apparatus is configured such that the measured ambient illumination color is based on color statistics accumulated while the at least one processor receives image data from the image sensor.

13. The apparatus of claim 1, wherein the apparatus is configured such that the first set of one or more exposure parameters is determined based on ambient illumination.

14. The apparatus of claim 1, wherein the at least one processor executes the instructions in the one or more non-transitory memories, to further cause the apparatus to:
    display, utilizing the display, a user interface slider control;
    detect, by the touch interface, a slide gesture directed to the slider control; and
    in response to detecting the slide gesture, display, utilizing the display, an alteration of the resulting image.

15. The apparatus of claim 1, wherein the at least one processor executes the instructions in the one or more non-transitory memories, to further cause the apparatus to: select the resulting image from an image set by evaluating exposure quality metric values for images in the image set and selecting the image with a best exposure quality metric value.

16. The apparatus of claim 1, wherein the apparatus is configured such that the resulting image is generated by performing a white-balance correction.

17. The apparatus of claim 1, wherein the apparatus is configured such that the resulting image is generated by performing a white-balance correction on the resultant image.

18. The apparatus of claim 1, wherein the apparatus is configured such that the resulting image is generated by performing a white-balance correction on the at least portions of the at least two images.

19. The apparatus of claim 1, wherein the apparatus is configured such that the first image, the second image, and the third image are stored in an image set from which a flash image is identified.

20. The apparatus of claim 1, wherein the at least one processor executes the instructions in the one or more non-transitory memories, to further cause the apparatus to:
    sample, utilizing the image sensor, an ambient image of the photographic scene for a fourth time interval based on a fourth set of one or more exposure parameters and without the strobe emitting illumination, such that the resulting image is generated by combining at least a portion of the ambient image and at least a portion of a flash image including at least one of: the first image, the second image, or the third image.

21. The apparatus of claim 20, wherein the apparatus is configured such that the flash image is processed by performing white-balance correction on the flash image, and the ambient image is processed by performing white-balance correction on the ambient image.

22. The apparatus of claim 20, wherein the apparatus is configured such that the fourth time interval occurs after the first, second, and third intervals.

23. The apparatus of claim 20, wherein the apparatus is configured such that the flash image is identified based on at least one of the first image, the second image, or the third image, by selecting one of the first image, the second image, or the third image.

24. The apparatus of claim 20, wherein the apparatus is configured such that the flash image is generated, by combining at least a portion of one of the first image, the second image, or the third image, with at least a portion of another one of the first image, the second image, or the third image.

25. The apparatus of claim 20, wherein the apparatus is configured such that a first strobe color of the first set of one or more strobe parameters, a second strobe color of the second set of one or more strobe parameters, and a third strobe color of the third set of one or more strobe parameters are equal to a measured ambient illumination color.

26. The apparatus of claim 20, wherein the apparatus is configured such that the first set of one or more exposure parameters and the fourth set of one or more exposure parameters are determined based on ambient illumination.

27. The apparatus of claim 1, wherein the apparatus is configured such that the first time interval includes only a subset of a first exposure interval during which componentry of the image sensor captures an exposure of light.

28. The apparatus of claim 1, wherein the apparatus is configured such that the first time interval includes an entirety of a first exposure interval during which componentry of the image sensor captures an exposure of light.

29. The apparatus of claim 1, wherein the apparatus is configured such that the first time interval occurs only during a first exposure interval during which componentry of the image sensor captures an exposure of light.

30. The apparatus of claim 1, wherein the apparatus is configured such that a first exposure interval during which componentry of the image sensor captures an exposure of light, occurs during a subset of the first time interval.

31. The apparatus of claim 1, wherein the apparatus is configured such that a first exposure interval during which componentry of the image sensor captures an exposure of light, occurs during an entirety of the first time interval.

32. The apparatus of claim 1, wherein the apparatus is configured such that a first exposure interval during which componentry of the image sensor captures an exposure of light, occurs only during the first time interval.

33. The apparatus of claim 1, wherein the apparatus is configured such that the first image is sampled during only a subset of the first time interval.

34. The apparatus of claim 1, wherein the apparatus is configured such that the first image is sampled during an entirety of the first time interval.

35. The apparatus of claim 1, wherein the apparatus is configured such that the first image is sampled only during the first time interval.

36. The apparatus of claim 1, wherein the apparatus is configured such that the first time interval, the second time interval, and the third time interval are successive time intervals with no overlap therebetween.

37. The apparatus of claim 1, wherein the apparatus is configured such that the first time interval, the second time interval, and the third time interval are successive time intervals with a non-zero time therebetween.

38. The apparatus of claim 1, wherein the apparatus is configured such that the first time interval, the second time interval, and the third time interval are different, by each having different durations.

39. The apparatus of claim 1, wherein the apparatus is configured such that the first time interval, the second time interval, and the third time interval are different, by each having a common duration while starting at different times.

40. The apparatus of claim 1, wherein the apparatus is configured such that the first time interval, the second time interval, and the third time interval are different, by each starting at different times.

41. The apparatus of claim 1, wherein the apparatus is configured such that the second strobe intensity is greater than the first strobe intensity, and the third strobe intensity is greater than the second strobe intensity.

42. The apparatus of claim 1, wherein the apparatus is configured such that the first set of one or more exposure parameters, the second set of one or more exposure parameters, and the third set of one or more exposure parameters are equal.

43. The apparatus of claim 1, wherein the apparatus is configured such that the first set of one or more exposure parameters, the second set of one or more exposure parameters, and the third set of one or more exposure parameters are not equal.

44. An apparatus, comprising:
strobe means for emitting a first illumination for a first time interval based on a first set of one or more strobe parameters including a first strobe intensity, a second illumination for a second time interval based on a second set of one or more strobe parameters including a second strobe intensity, and a third illumination for a third time interval based on a third set of one or more strobe parameters including a third strobe intensity, such that the first time interval, the second time interval, and the third time interval are different; image sensor means for sampling a first image of a photographic scene during at least a portion of the first time interval based on a first set of one or more exposure parameters, a second image of the photographic scene during at least a portion of the second time interval based on a second set of one or more exposure parameters, and a third image of the photographic scene during at least a portion of the third time interval based on a third set of one or more exposure parameters; and means for generating a resulting image by combining at least portions of at least two images including at least one of: the first image, the second image, or the third image, such that the resulting image is stored.

* * * * *